(12) United States Patent
Li et al.

(10) Patent No.: US 11,683,393 B2
(45) Date of Patent: Jun. 20, 2023

(54) FRAMEWORK FOR COMPUTING IN RADIO ACCESS NETWORK (RAN)

(71) Applicant: Intel Corporation, Santa Clara, CA (US)

(72) Inventors: Qian Li, Beaverton, OR (US); Geng Wu, Portland, OR (US); Zongrui Ding, Portland, OR (US); Xiaopeng Tong, Beijing (CN); Gabriel Arrobo Vidal, Hillsboro, OR (US); Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 17/014,937

(22) Filed: Sep. 8, 2020

(65) Prior Publication Data
US 2020/0404069 A1    Dec. 24, 2020

Related U.S. Application Data

(60) Provisional application No. 62/899,086, filed on Sep. 11, 2019.

(51) Int. Cl.
| *H04L 67/59* | (2022.01) |
| *H04L 67/289* | (2022.01) |
| *H04W 8/24* | (2009.01) |
| *G06F 9/48* | (2006.01) |
| *H04W 76/10* | (2018.01) |

(52) U.S. Cl.
CPC .......... *H04L 67/59* (2022.05); *G06F 9/4862* (2013.01); *H04L 67/289* (2013.01); *H04W 8/24* (2013.01); *H04W 76/10* (2018.02)

(58) Field of Classification Search
CPC .... H04L 67/2861; H04L 67/289; H04W 8/24; H04W 76/10; G06F 9/4862; G06F 9/5072; G06F 2209/509
See application file for complete search history.

(56) References Cited

U.S. PATENT DOCUMENTS

| 2014/0287754 A1* | 9/2014 | Goldhamer | H04W 36/22 455/436 |
| 2018/0368055 A1* | 12/2018 | Chae | H04W 48/20 |
| 2019/0014499 A1* | 1/2019 | Chae | H04L 41/0823 |
| 2019/0098080 A1* | 3/2019 | Bermudez | H04L 67/1029 |
| 2020/0036808 A1* | 1/2020 | Yu | H04L 67/10 |

* cited by examiner

*Primary Examiner* — Afshawn M Towfighi
(74) *Attorney, Agent, or Firm* — Schwabe, Williamson & Wyatt, P.C.

(57) ABSTRACT

The present disclosure provides embodiments in which computing (e.g., edge computing) is part of base station (BS) capability. These embodiments may enable conducting computing offloading between a user equipment (UE) and BS in the radio access network (RAN), for example, compute in the RAN, and deliver "true" edge computing user experience. Other embodiments may be described and claimed.

21 Claims, 22 Drawing Sheets

FRAMEWORK FOR COMPUTING IN RADIO ACCESS NETWORK (RAN)

CROSS REFERENCE TO RELATED APPLICATION

The present application claims priority to U.S. Provisional Patent Application No. 62/899,086, which was filed Sep. 11, 2019, titled "FRAMEWORK FOR COMPUTING IN THE RADIO ACCESS NETWORK (RAN), the disclosure of which is hereby incorporated by reference.

FIELD

Embodiments relate generally to the technical field of wireless communications.

BACKGROUND

Edge computing has been gaining increasing momentum thanks to driving factors such as applications and use cases with extreme computing and performance requirements; advances of information technology and pervasive of computing and storage across network nodes; and advances in communication technologies both in the access networks and in the backhaul networks. Edge computing is expected to deliver better user experience as compared to computing locally in the user device or computing remotely in the center cloud.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 15-1 and 15-2 illustrate example system architectures of a 5GC, in accordance with various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Edge computing has been gaining increasing momentum thanks to driving factors such as applications and use cases with extreme computing and performance requirements; advances of information technology and pervasive of computing and storage across network nodes; and advances in communication technologies both in the access networks and in the backhaul networks.

Figure 1:
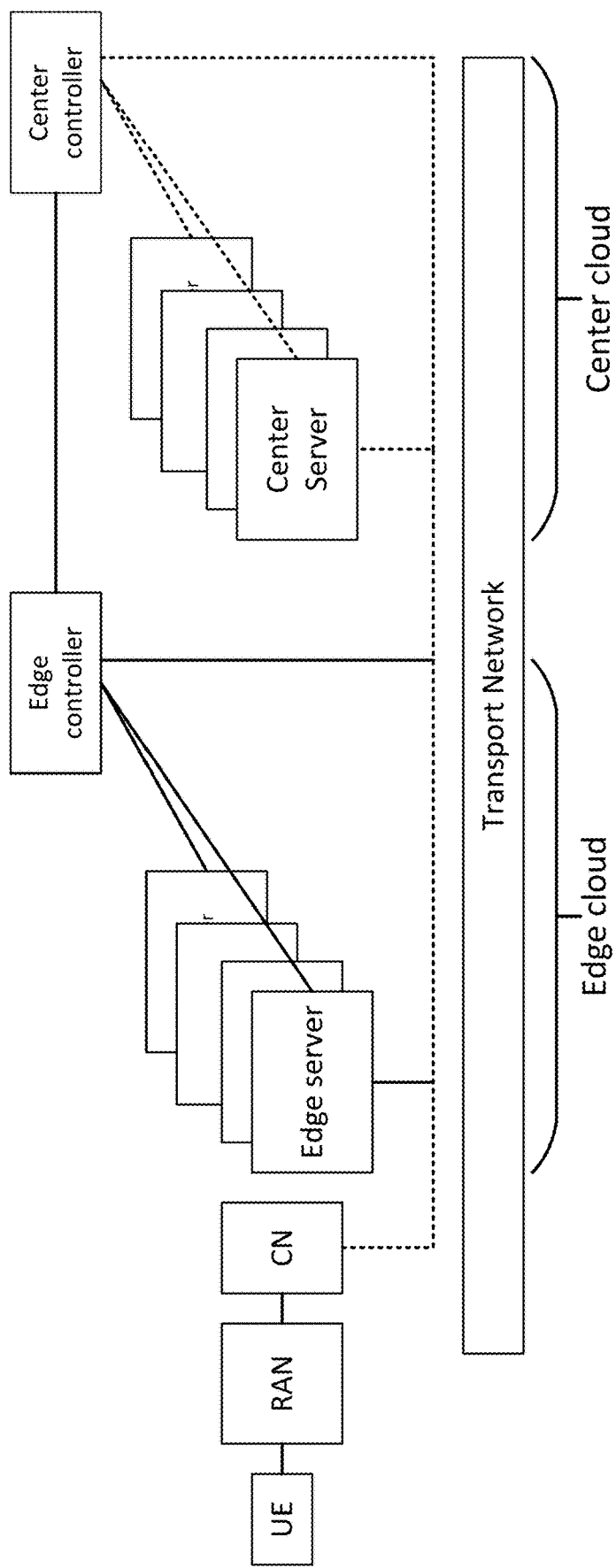
FIG. 1 illustrates an example of a current cloud computing system landscape.

Edge computing is expected to deliver better user experience as compared to computing locally in the user device or computing remotely in the center cloud. However, today's edge cloud is mostly an extension of center cloud as showed in FIG. 1. FIG. 1 illustrates an example of a current cloud computing system landscape. In this setup, the main difference between the edge cloud and the center cloud is their locations in the backbone network, for example, the edge cloud being located at the edge of backbone network and the center cloud being located deep in the backbone network.

In this context, today's edge cloud is not a "true" edge system/network. In order to do workload migration between user device and edge cloud, the traffic will go through several network nodes and protocol layers.

Figure 2:
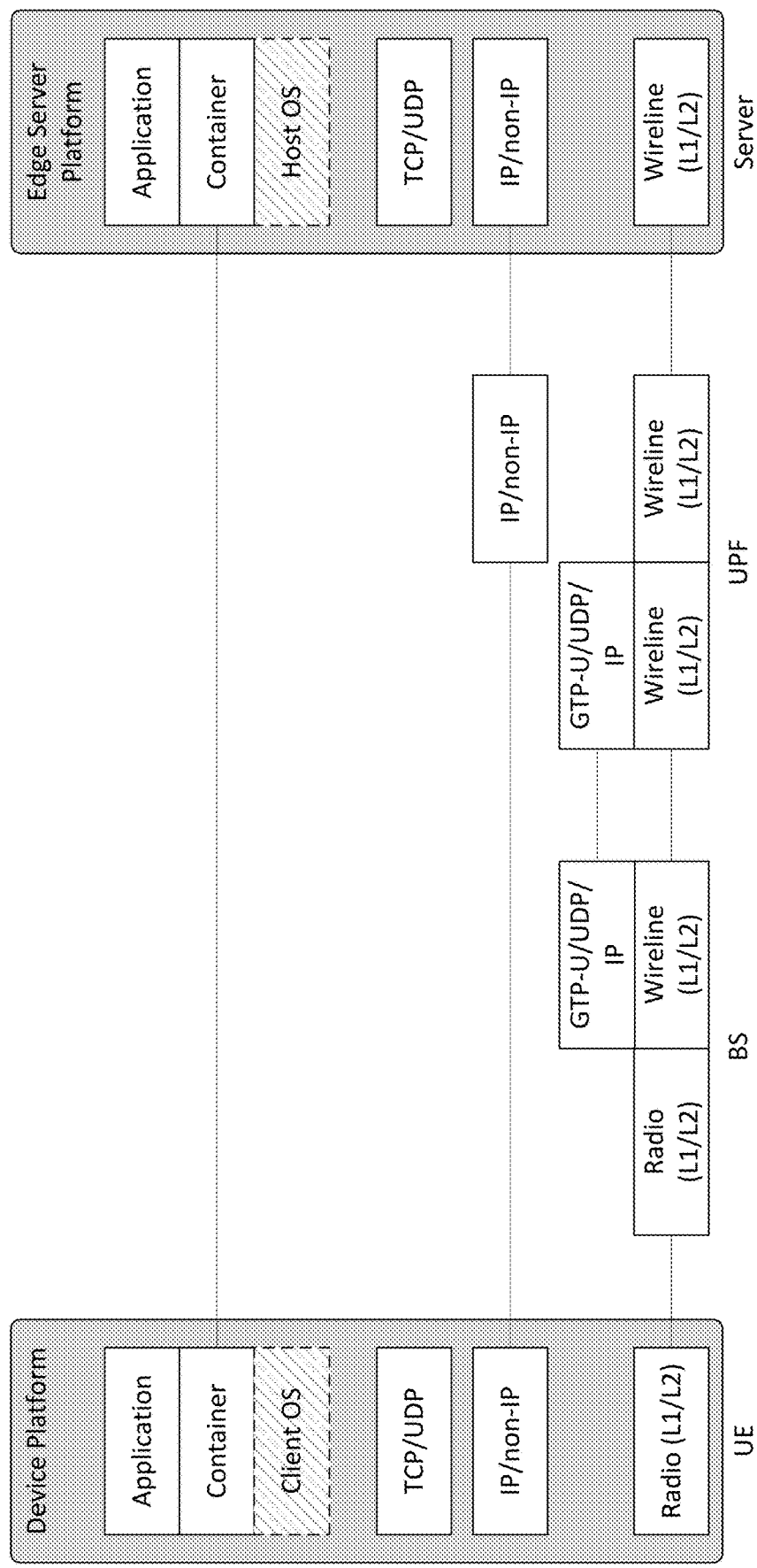
FIG. 2 shows an example end-to-end (E2E) protocol stack between a user equipment (UE) and an edge server using container-based workload migration.

FIG. 2 shows an example end-to-end (E2E) protocol stack between UE and edge server using container-based workload migration. As shown by FIG. 2, today's edge server is located in a data network (DN) beyond a cellular core network, where the container is transported using TCP/IP protocol. IP connections need to be established between UE and UPF of the CN and between the UPF and edge server. The IP packets between UE and UPF are tunneled through GTP-U tunnel between BS and UPF and transported via radio link between UE and BS. With this scheme, delays and processing complexities come from PDU session management; processing delays in each network node, including BS, UPF, routers within CN and between CN and edge server; and computing offloading service discovery and establishment procedures between UE and edge server at the system or application layer at above TCP layer.

The present disclosure provides embodiments in which computing (e.g., edge computing) is part of BS capability. Here, the BS may refer to a network access node (e.g., NANs 1031, 1032, and/or 1033 of FIG. 10, RAN node 1431 of FIG. 14, or the like). These embodiments will enable conducting computing offloading between UE (e.g., endpoints 1011, 1021 of FIG. 10 or the like) and BS in the RAN, for example, compute in the RAN, and deliver "true" edge computing user experience. To enable computing in the RAN, multiple aspects are provided herein, including network architecture, computing/communication procedures, CP/UP protocol stacks, mobility, interaction with other parts of the network (e.g., core network, cloud in data network, etc.), operational issues such as charging, security mechanism, QoS mechanism, authentication and identity management, etc. The present disclosure discusses the following aspects of the example embodiments: compute in the RAN system framework; network architecture and protocol stack to enable compute in the RAN; mechanisms to enable workload migration between UE and BS's computing function; and eployment of functions into the BSs.

Currently, there are no existing solutions on addressing direct computing offloading between UE and BS. Embodiments herein enable computing workload migration and orchestration that may be directly done over the radio with close interaction with platform (a.k.a., Communication for Computing/AI). More specifically, computing workload, executables, and/or instructions are sent over L2 UP or CP over the radio. Additionally, part of the orchestration function and system computing capability is exposed to UE via L2 CP over the radio (e.g., service, capability discovery, etc.). Moreover, computing is treated as another dimension of resource in addition to spectrum, time, and/or spatial resource dimensions. Such embodiments enable tight integration between computation and communication for enhanced system performance and user experience.

For purposes of the present disclosure, a cellular system with base stations (BS) having both communication functions and computation functions is/are considered. The communication functions include, for example, RF, L1 processing functions, L2 processing functions, control and scheduling functions, etc. The computation functions include, for example, computation resources such as CPUs, GPUs, NNPUs (neural network processing units), memories, etc.; computation platforms such as operating system, virtualization platform, containerization platform, etc.; and applications.

Figure 3:
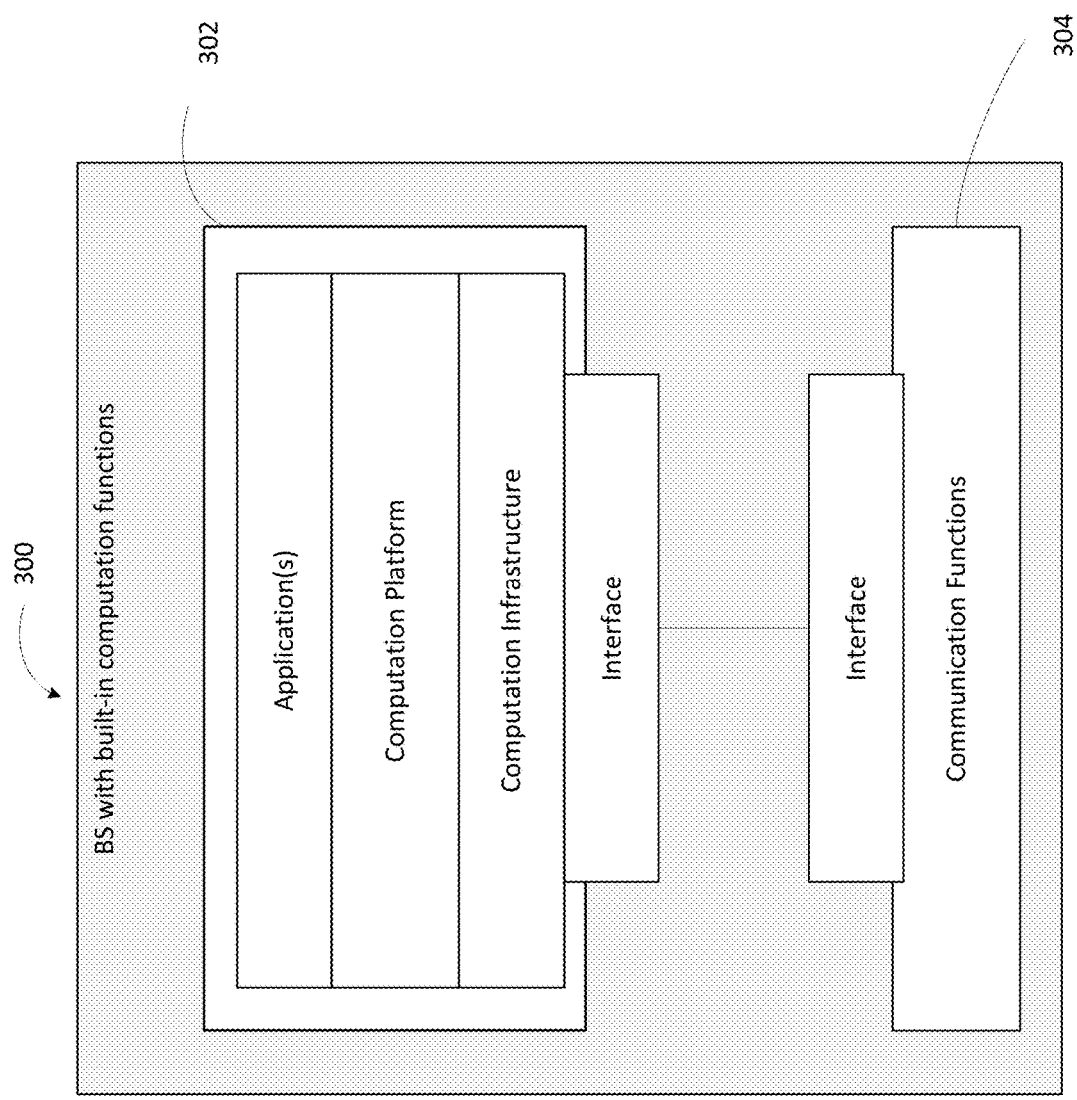
FIG. 3 illustrates a base station (BS) with built-in computation functions, in accordance with various embodiments.

In various embodiments, the interface connecting the communication and computation systems/functions in a BS has a security mechanism in place. FIG. 3 illustrates a BS 300 with built-in computation functions 302 including application(s), a computation platform (e.g., including OS, virtualization platform, containerization platform, etc.), and computation infrastructure (e.g., CPUs, GPUs, NNPs, memories, etc.), and communication functions 304 (e.g., including RF, L1 processing units, L2 processing units, control/scheduling units, etc.).

In some embodiments, the functions in the BS could be physically co-located or distributed across multiple systems/device. FIG. 4A shows one example implementation, where the BS includes a central unit (CU) and one or more distributed units (DUs), the CU includes the computation functions (e.g., computation functions 302 of FIG. 3), and the communication functions (e.g., computation functions 302 of FIG. 3) are split between the CU and the one or more DUs. In this example, the control plane (CP) of the access stratum (AS) (e.g., RRC), and the access stratum upper L2 user plane (UP) protocol stacks/entities of the (e.g., SDAP and PDCP layers) are included with the CU, the DU(s) include the lower L2 UP stacks (e.g., RLC and MAC layers), L1 (e.g., PHY layer), and RF elements (e.g., RF circuitry and the like).

Figure 4B:
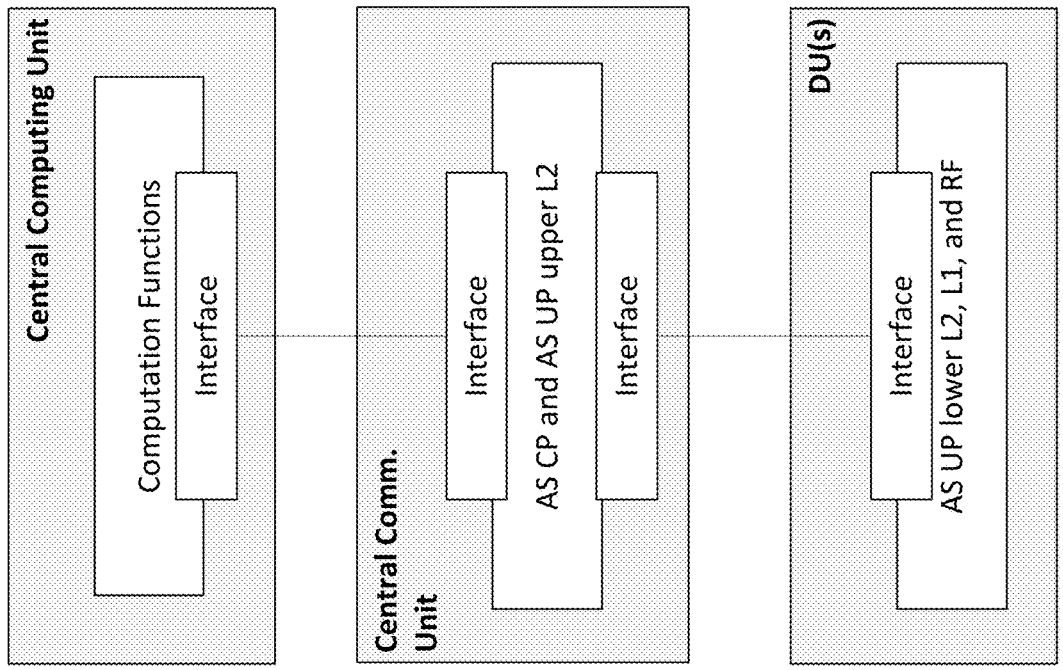
FIGS. 4A and 4B illustrate example implementations of a BS in accordance with various embodiments.
Figure 4A:
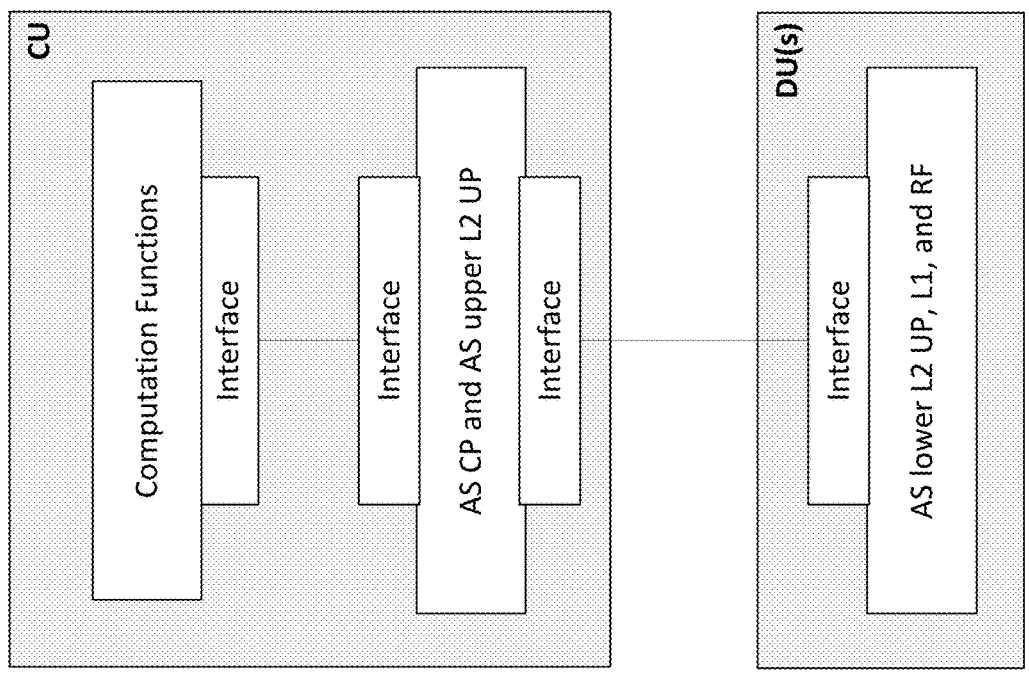

FIG. 4B shows another example implementation, where the BS includes a central computing unit, a central communication unit, and one or more DUs. The central computing unit includes the computation functions (e.g., computation functions 302 of FIG. 3), and the communication functions (e.g., computation functions 302 of FIG. 3) are split between the central communication unit and the DU(s). In this example, the central communication unit includes CP of the AS (e.g., RRC) and upper L2 UP stacks of the AS (e.g., SDAP and PDCP layers), and the DUs include the lower L2 UP entities (e.g., RLC, MAC layers), L1, and RF elements. Additionally or alternatively, the central comm. unit may be further divided into a CP part and a UP part, where the AS CP is located in the CP part and the AS UP upper L2 entities are located in the UP part. Additionally or alternatively, the DU(s) could be further split where RF and/or some parts of the lower L2 and L1 functions are in a remote location.

With build-in computing resources and functions in the BS, computation workload can be migrated between the UE and BS within the RAN. Usages of computation workload migration in the RAN include, for example, migration of the UE's computing workload to the BS (e.g., blockchain computing workloads, etc.), and migration of the center cloud's computing workload(s) to the BS for client-server type applications. (e.g., online gaming including VR/AR, etc.).

The workload migration related control plane and data plane messages between the UE's computing functions and the BS's computing function can be directly communicated via L2 of the AS. This is in contrast to existing edge computing solutions where the edge computing server is in the data network beyond core network and computing related control plane and data plane messages are transmitted over protocols such as TCP/IP between the UE and the edge server.

Figure 5:
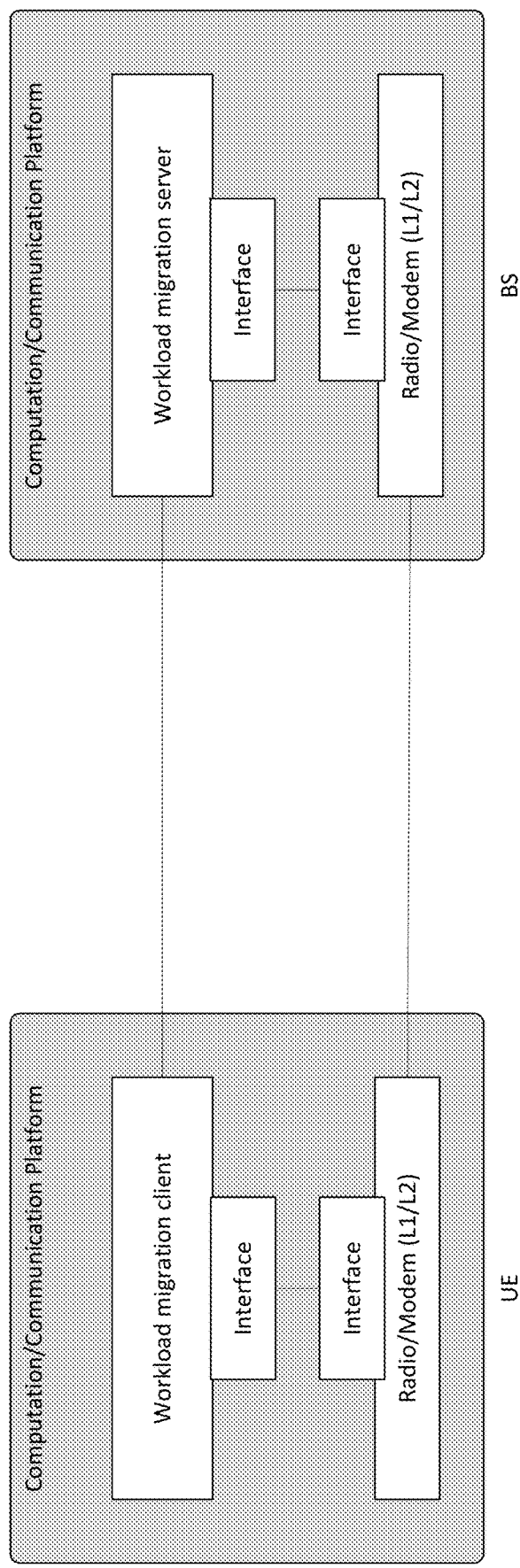
FIG. 5 illustrates an example system protocol stack for computing workload migration between a UE and a BS in accordance with various embodiments.

FIG. 5 illustrates an example system protocol stack for computing workload migration between a UE and a BS according to various embodiments. In this example, the CP and data plane (DP) messages between the workload migration client at the UE side and the workload migration server at the BS side are transmitted via L1/L2 radio protocols (e.g., RRC, SDAP, PDCP, RLC, MAC, and PHY). Several techniques can be used for workload migration, such as using containers, virtual machines, serverless computing etc.

Figure 6:
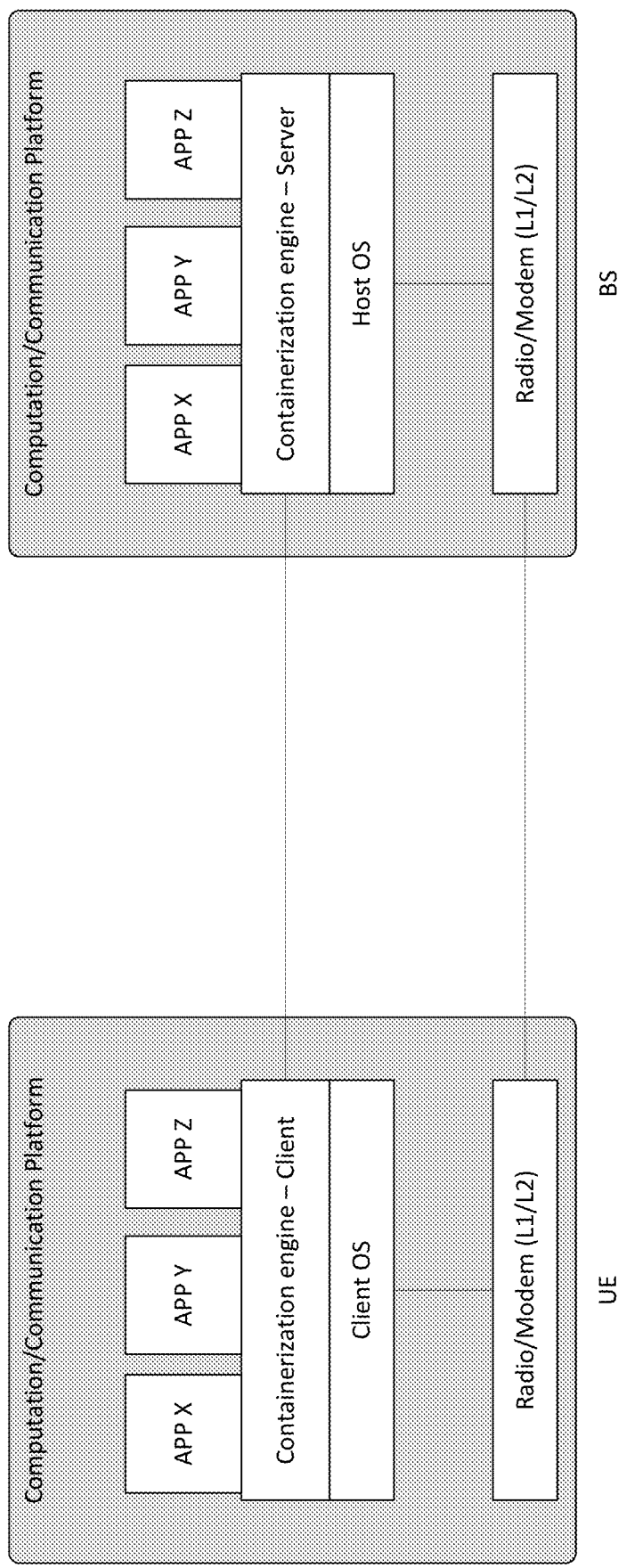
FIG. 6 shows an example system protocol stack with computing workload migration based on containerization techniques, in accordance with various embodiments.

FIG. 6 shows an example system protocol stack with computing workload migration based on containerization techniques. In this example, containerization techniques are used for workload migration. The workload migration engine in the client side and the server side can be located above the OS, as a part of OS, below the OS, or in the radio modem.

For computation workload migration between the UE and the BS within the RAN, the workload migration CP/UP traffic terminates between the UE and the BS. This is in contrast to normal cellular traffic where the termination points are at the UE and the UPF (PSA) in the core network. To support computing workload migration within the RAN, the underlying communication link may need to be aware of the workload migration traffic and have dedicated procedures/resources to enable the traffic termination between the UE and the BS. In particular, the radio link may need to enable the following messages/IEs: messages/IEs for computing service and capability discovery between the UE and the BS; messages/IEs for the UE initiated radio link resource establishment for computing workload migration; and/or messages/IEs for the BS initiated radio link resource establishment for computing workload migration.

Figure 7:
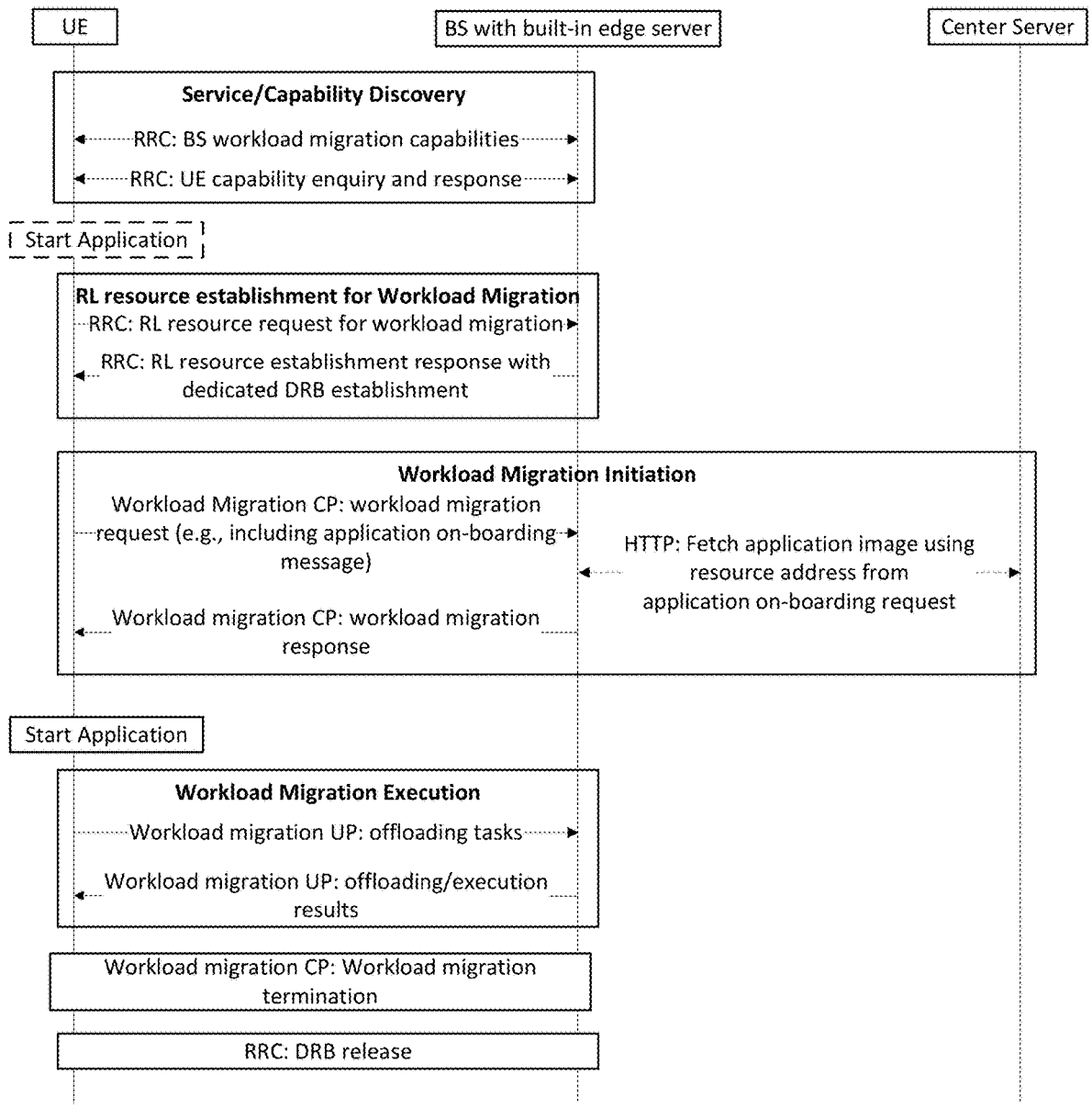
FIG. 7 shows an example procedure for workload migration within the RAN, in accordance with various embodiments.

FIG. 7 shows an example procedure for workload migration within the RAN. The procedure of FIG. 7 may operate as follows:

Step 1: service/capability discovery. The BS provides its capabilities supporting workload migration and/or other related computing capabilities. In embodiments, the BS workload migration capabilities may be included a suitable RRC message and/or in SI, such as in a broadcasted SIB or an on-demand SIB. This SI can either be broadcasted to all the UEs or be provided to specific UEs upon request. The UEs can also report their capabilities supporting workload migration and/or other related computing capabilities (e.g., operating system, computing hardware type, supported applications, etc.) in a UE capability report/IE. The UE capability report can be provided on a per-BS enquiry basis in a suitable RRC message.

After the workload migration capabilities are exchanged, the UE may start or initialize execution of an application. Prior to, during, or after execution of this application, the UE may determine or identify a need for computational offloading.

Step 2: Radio Link (RL) resource establishment for workload migration. This may be UE or BS initiated radio resource establishment for workload migration. For the UE initiated radio resource establishment, the UE sends an RRC message for radio resource establishment request, and the BS decides to accept or reject the request. If accepted, the BS will establish a radio resource (e.g., a dedicated data radio bearer) and provide the UE with the radio resource information in a suitable response message. If rejected, the BS will send a rejection response with a reason code or the like. The BS initiated radio resource establishment may operate in a reverse fashion as the UE initiation radio resource establishment procedure.

Step 3: Workload migration initiation. Message sent via dedicated DRB. This step can be UE initiated or BS initiated using messages between workload migration functions at the UE and the BS. The messages are communicated using the radio resource(s) established in Step 2. The example of FIG. 7 shows the UE initiated workload migration embodiment where a workload migration request is sent from the UE to the BS (Workload Migration CP), and includes, for example, an application on-boarding message and/or other like information. The workload migration request message is used to inform the BS of workload migration related information and to allow the BS to prepare for the computational offloading and/or to prepare for execution of relevant computational offloading tasks. For client-server type applications, the workload migration request message may contain information regarding the server side application, such as the application image address in the center cloud or the like. The BS could then download the application from the center cloud using the application image address. For example, the BS may send a suitable HTTP message to fetch the application image if needed based on the HTTP/resource address provided in the application on-boarding request. For UE's local workload migration, the request message may contain information on the workload, execution requirements (e.g., expected execution latency), etc. The BS may decide to accept or reject the request, and sends a workload migration response message (e.g., Workload migration CP) indicating the acceptance or rejection of the request. If accepted, the BS sends acceptance response to the UE, which may contain instructions for the UE to prepare workload migration. If rejected, the BS sends a rejection response with reason code or the like.

Step 4: Workload migration execution. In this step, the source (e.g., UE or BS) sends offloading tasks to the recipient (e.g., BS or UE) for computational offloading. The offloading tasks may include, for example, executable code (program code), execution instruction(s), and/or data. The recipient executes the workload (offloading tasks) and sends the offloading results back to the source. The traffic is transported using the radio resource(s) established in Step 2.

After the computational offloading is complete, the workload migration session is terminated and the DRB is released using suitable RRC message(s).

Figure 8:
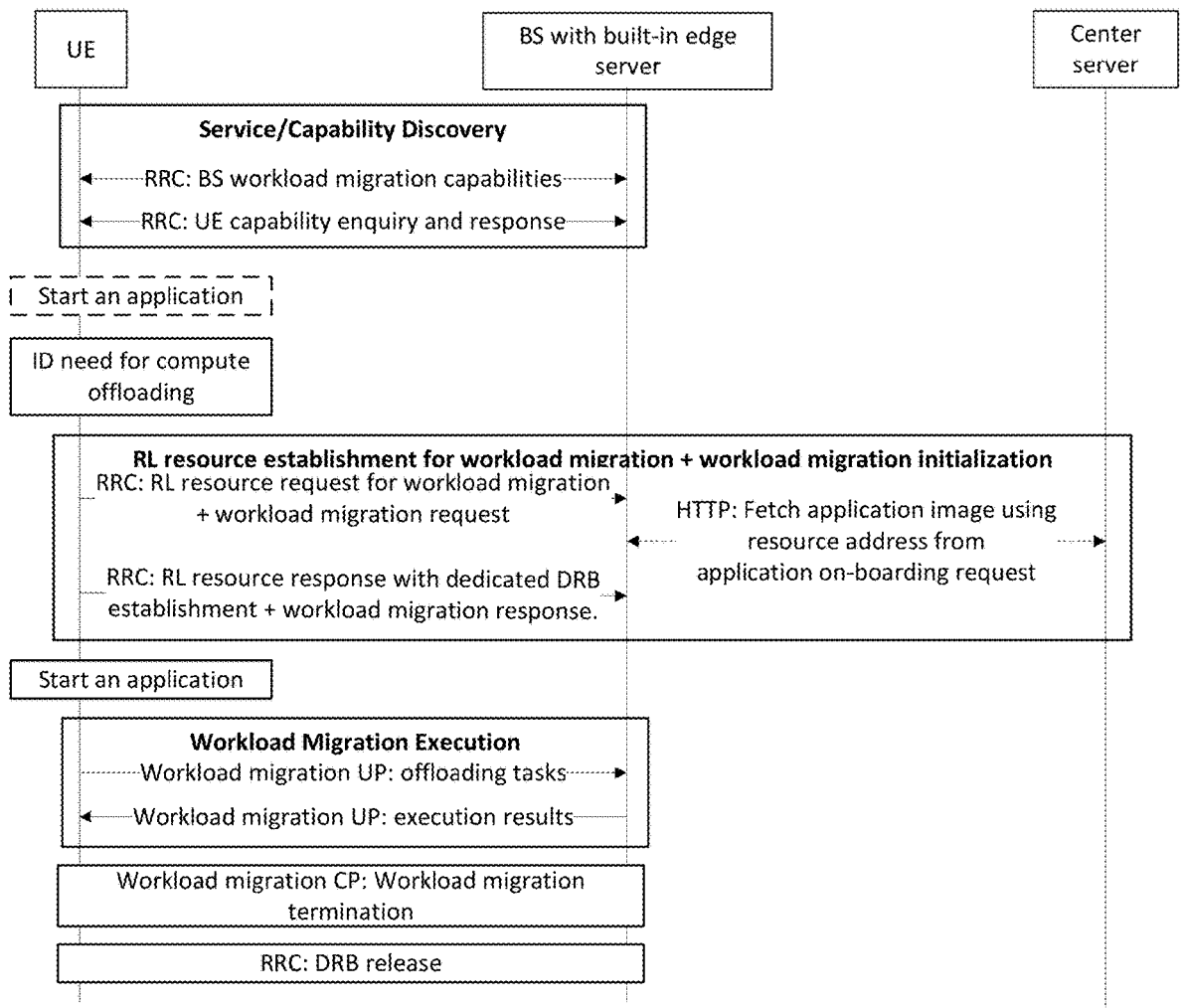
FIG. 8 illustrates another example workload migration procedure in the RAN with workload migration request and response piggyback in RRC message(s), according to various embodiments.

FIG. 8 illustrates another example workload migration procedure in the RAN with workload migration request and response piggyback in RRC message(s), according to various embodiments. In the procedure of FIG. 8, the RL resource establishment step and the workload migration initiation step are combined, for example, the workload migration request/response are sent together with radio link resource request/response RRC messages. As shown by FIG. 8, the RL resource request for workload migration is piggybacked with the workload migration request, and the RL resource response including information for a dedicated DRB is piggybacked with a workload migration response.

Figure 9:
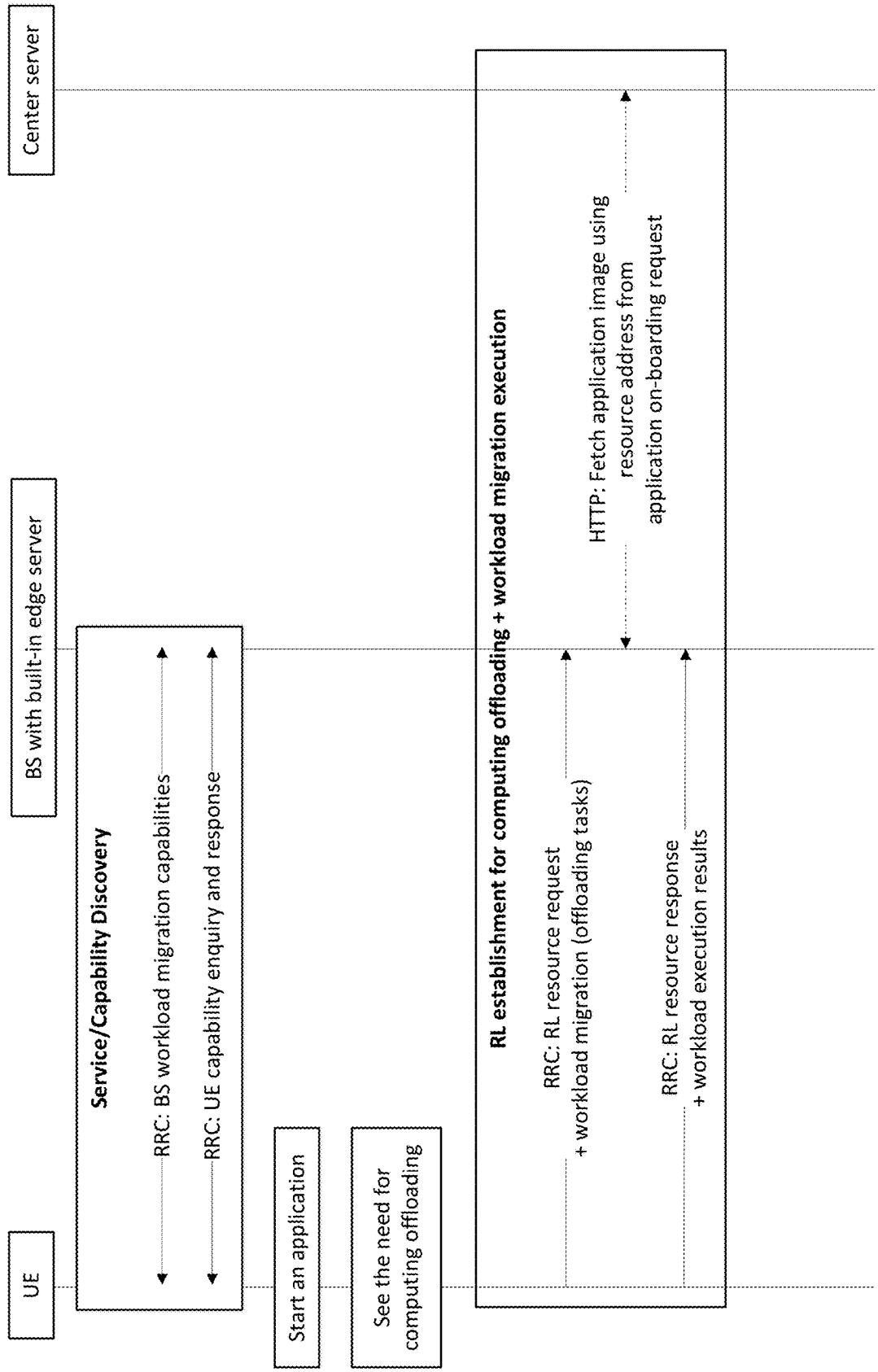
FIG. 9 illustrates another workload migration procedure in the RAN with workload migration execution and response piggyback in RRC message, according to various embodiments.

FIG. 9 illustrates another workload migration procedure in the RAN with workload migration execution and response piggyback in RRC message, according to various embodiments. In the procedure of FIG. 9, the radio link resource establishment step, the workload migration initiation step, and the workload migration execution step are combined (e.g., the executable codes, executable images, execution instructions, data are sent piggybacked with the radio link resource request message; and the execution results are send piggybacked with the radio link resource response message). In this example, an RRC message from the UE to the BS includes an RL resource request, piggybacked with offloading tasks (e.g., workload migration executables (program code), instructions, data, etc.), and another RRC message from the BS to the UE includes the RL resource response piggybacked with the workload execution results. This option does not require dedicated DRB establishment. The computing workload migration message and data are communicated via SRB. This option may apply to use cases that require low latency, or where the workload migration payload is relatively small.

Edge Computing Aspects

Figure 10:
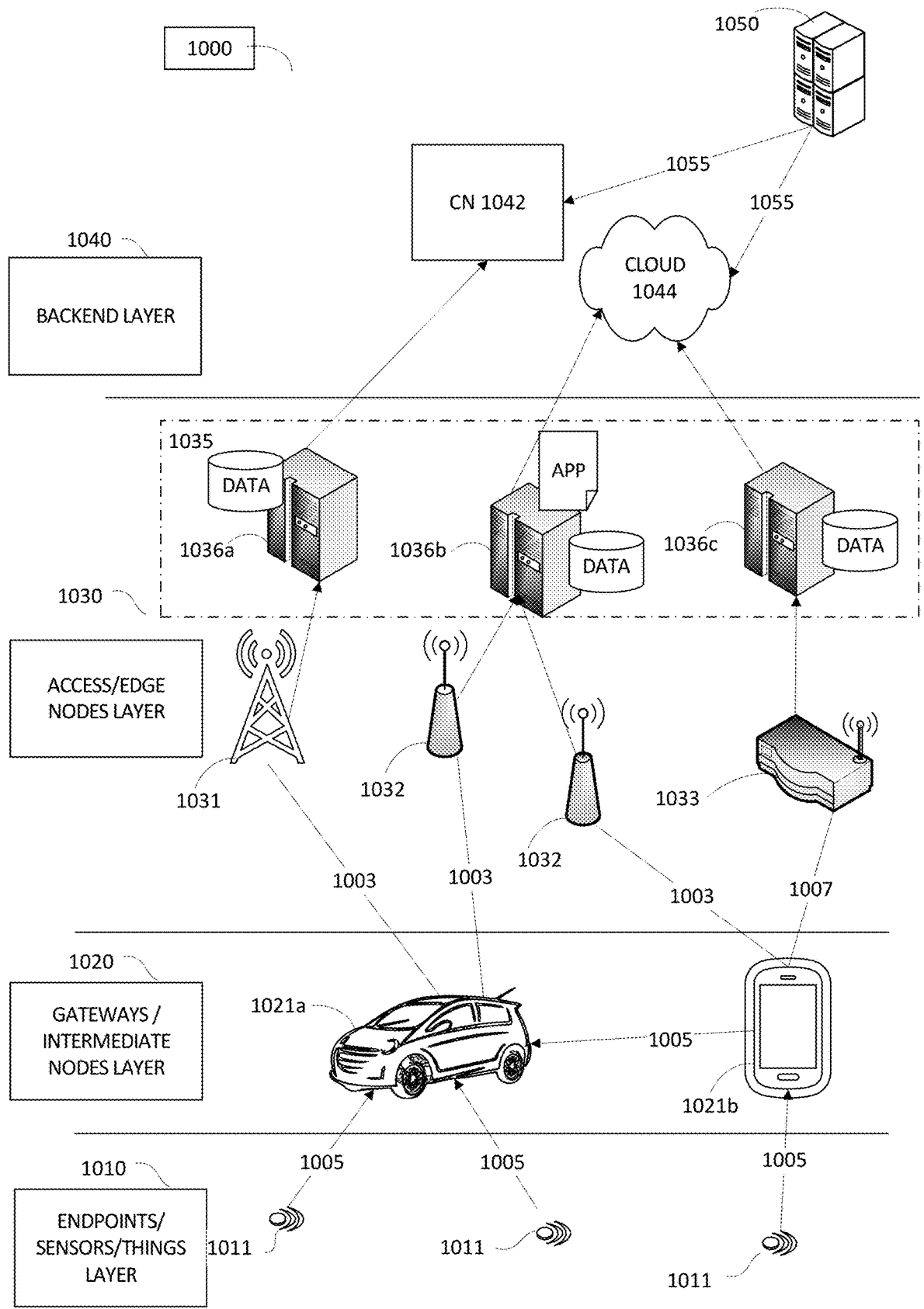
FIG. 10 illustrates an example edge computing environment in accordance with various embodiments.

FIG. 10 illustrates an example edge computing environment 1000 in accordance with various embodiments. FIG. 10 specifically illustrates the different layers of communication occurring within the environment 1000, starting from endpoint sensors or things layer 1010 (e.g., operating in an Internet of Things (IoT) network topology) comprising one or more IoT devices 1011 (also referred to as edge endpoints 1010 or the like); increasing in sophistication to gateways or intermediate node layer 1020 comprising one or more user equipment (UEs) 1021a and 1021b (also referred to as intermediate nodes 1020 or the like), which facilitate the collection and processing of data from endpoints 1010; increasing in processing and connectivity sophistication to access node layer 1030 (or "edge node layer 1030") comprising a plurality of network access nodes (NANs) 1031, 1032, and 1033 (collectively referred to as "NANs 1031-1033" or the like) and a plurality of edge compute nodes 1036a-c (collectively referred to as "edge compute nodes 1036" or the like) within an edge computing system 1035; and increasing in connectivity and processing sophistication to a backend layer 1010 comprising core network (CN) 1042 and cloud 1044. The processing at the backend layer 1010 may be enhanced by network services as performed by a remote application server 1050 and/or other cloud services. Some or all of these elements may be equipped with or otherwise implement some or all aspects of the LPP embodiments discussed infra.

The environment 1000 is shown to include end-user devices, such as intermediate nodes 1020 and endpoints 1010, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1031, 1032, and/or 1033. The NANs 1031-1033 are arranged to provide network connectivity to the end-user devices via respective links 1003, 1007 between the individual NANs and the one or more UEs 1011, 1021.

As examples, the communication networks and/or access technologies may include cellular technology such as LTE, MuLTEfire, and/or NR/5G (e.g., as provided by Radio Access Network (RAN) node 1031 and/or RAN nodes 1032), WiFi or wireless local area network (WLAN) technologies (e.g., as provided by access point (AP) 1033 and/or RAN nodes 1032), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1020 include UE 1021a and UE 1021b (collectively referred to as "UE 1021" or "UEs 1021"). In this example, the UE 1021a is illustrated as a vehicle UE, and UE 1021b is illustrated as a smartphone (e.g., handheld touchscreen mobile computing device connectable to one or more cellular networks). However, these UEs 1021 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1010 include UEs 1011, which may be IoT devices (also referred to as "IoT devices 1011"), which are uniquely identifiable embedded computing devices (e.g., within the Internet infrastructure) that comprise a network access layer designed for low-power IoT applications utilizing short-lived UE connections. The IoT devices 1011 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1011 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1011 can utilize technologies such as M2M or MTC for exchanging data with an MTC server (e.g., a server 1050), an edge server 1036 and/or edge computing system 1035, or device via a PLMN, ProSe or D2D communication, sensor networks, or IoT networks. The M2M or MTC exchange of data may be a machine-initiated exchange of data.

The IoT devices 1011 may execute background applications (e.g., keep-alive messages, status updates, etc.) to facilitate the connections of the IoT network. Where the IoT devices 1011 are, or are embedded in, sensor devices, the IoT network may be a WSN. An IoT network describes an interconnecting IoT UEs, such as the IoT devices 1011 being connected to one another over respective direct links 1005. The IoT devices may include any number of different types of devices, grouped in various combinations (referred to as an "IoT group") that may include IoT devices that provide one or more services for a particular user, customer, organizations, etc. A service provider (e.g., an owner/operator of server 1050, CN 1042, and/or cloud 1044) may deploy the IoT devices in the IoT group to a particular area (e.g., a geolocation, building, etc.) in order to provide the one or more services. In some implementations, the IoT network may be a mesh network of IoT devices 1011, which may be termed a fog device, fog system, or fog, operating at the edge of the cloud 1044. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1044 to Things (e.g., IoT devices 1011). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 1030) and/or a central cloud computing service (e.g., cloud 1044) for performing heavy computations or computationally burdensome tasks. On the other hand, edge cloud computing consolidates human-operated, voluntary resources, as a cloud. These voluntary resource may include, inter-alia, intermediate nodes 1020 and/or endpoints 1010, desktop PCs, tablets, smartphones, nano data centers, and the like. In various implementations, resources in the edge cloud may be in one to two-hop proximity to the IoT devices 1011, which may result in reducing overhead related to processing data and may reduce network delay.

In some embodiments, the fog may be a consolidation of IoT devices 1011 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 1044. The fog operating at the edge of the cloud 1044 may overlap or be subsumed into an edge network 1030 of the cloud 1044. The edge network of the cloud 1044 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1036 or edge devices). The Fog layer resides on top of the edge layer and is a consolidation of networking devices such as the intermediate nodes 1020 and/or endpoints 1010 of FIG. 10.

Data may be captured, stored/recorded, and communicated among the IoT devices 1011 or, for example, among the intermediate nodes 1020 and/or endpoints 1010 that have direct links 1005 with one another as shown by FIG. 10. Analysis of the traffic flow and control schemes may be implemented by aggregators that are in communication with the IoT devices 1011 and each other through a mesh network. The aggregators may be a type of IoT device 1011 and/or network appliance. In the example of FIG. 10, the aggregators may be edge nodes 1030, or one or more designated intermediate nodes 1020 and/or endpoints 1010. Data may be uploaded to the cloud 1044 via the aggregator, and commands can be received from the cloud 1044 through gateway devices that are in communication with the IoT devices 1011 and the aggregators through the mesh network. Unlike the traditional cloud computing model, in some implementations, the cloud 1044 may have little or no computational capabilities and only serves as a repository for archiving data recorded and processed by the fog. In these implementations, the cloud 1044 centralized data storage system and provides reliability and access to data by the computing resources in the fog and/or edge devices. Being at the core of the architecture, the Data Store of the cloud 1044 is accessible by both Edge and Fog layers of the aforementioned edge-fog network.

As mentioned previously, the access networks provide network connectivity to the end-user devices 1020, 1010 via respective NANs 1031-1033. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for IEEE 802.16 (e.g., WMAN, WiMAX, etc.) implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 1031, 1032. This virtualized framework allows the freed-up processor cores of the NANs 1031, 1032 to perform other virtualized applications, such as virtualized applications for LPP embodiments discussed herein.

The UEs 1021, 1011 may utilize respective connections (or channels) 1003, each of which comprises a physical communications interface or layer. The connections 1003 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 1011, 1021 and the NANs 1031-1033 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1011, 1021 and NANs 1031-1033 may operate using LAA, enhanced LAA (eLAA), and/or further eLAA (feLAA) mechanisms. The UEs 1021, 1011 may further directly exchange communication data via respective direct links 1005, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 1011, 1021 are capable of measuring various signals or determining/identifying various signal/channel characteristics. Signal measurement may be performed for cell selection, handover, network attachment, testing, and/or other purposes. The measurements collected by the UEs 1011, 1021 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RS SI), Reference Signal Received Quality (RSRQ), GNSS timing of cell frames for UE positioning for E-UTRAN or 5G/NR (e.g., a timing between a NAN 1031-1033 reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0, 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 1031-1033.

The UE 1021*b* is shown to be configured to access an access point (AP) 1033 via a connection 1007. In this example, the AP 1033 is shown to be connected to the Internet without connecting to the CN 1042 of the wireless system. The connection 1007 can comprise a local wireless connection, such as a connection consistent with any IEEE 802.11 protocol, wherein the AP 1033 would comprise a wireless fidelity (WiFi®) router. In embodiments, the UEs 1021 and IoT devices 1011 can be configured to communicate using suitable communication signals with each other or with any of the AP 1033 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1031 and 1032 that enable the connections 1003 may be referred to as "RAN nodes" or the like. The RAN nodes 1031, 1032 may comprise ground stations (e.g., terrestrial access points) or satellite stations providing coverage within a geographic area (e.g., a cell). The RAN nodes 1031, 1032 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1031 is embodied as a NodeB, evolved NodeB (eNB), or a next generation NodeB (gNB), and the RAN nodes 1032 are embodied as relay nodes, distributed units, or Road Side Unites (RSUs). Any other type of NANs can be used.

Any of the RAN nodes 1031, 1032 can terminate the air interface protocol and can be the first point of contact for the UEs 1021 and IoT devices 1011. In some embodiments, any of the RAN nodes 1031/1032 can fulfill various logical functions for the RAN including, but not limited to, radio network controller (RNC) functions such as radio bearer management, uplink and downlink dynamic radio resource management and data packet scheduling, and mobility management. In embodiments, the UEs 1011, 1021 can be configured to communicate using OFDM communication signals with each other or with any of the NANs 1031, 1032 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RNC function(s) operated by the RAN or individual NANs 1031-1032 organize downlink transmissions (e.g., from any of the RAN nodes 1031, 1032 to the UEs 1011, 1021) and uplink transmissions (e.g., from the UEs 1011, 1021 to RAN nodes 1031, 1032) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1011, 1021 at each transmission time interval (TTI). A TTI is the duration of a transmission on a radio link 1003, 1005, and is related to the size of the data blocks passed to the radio link layer from higher network layers.

The NANs 1031/1032 may be configured to communicate with one another via respective interfaces or links (not shown), such as an X2 interface for LTE implementations (e.g., when CN 1042 is an Evolved Packet Core (EPC)), an Xn interface for 5G or NR implementations (e.g., when CN 1042 is an Fifth Generation Core (5GC)), or the like. The NANs 1031 and 1032 are also communicatively coupled to CN 1042. In embodiments, the CN 1042 may be an evolved packet core (EPC) network, a NextGen Packet Core (NPC) network, a 5GC, or some other type of CN. The CN 1042 may comprise a plurality of network elements, which are configured to offer various data and telecommunications services to customers/subscribers (e.g., users of UEs 1021 and IoT devices 1011) who are connected to the CN 1042 via a RAN. The components of the CN 1042 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 1042 may be referred to as a network slice, and a logical instantiation of a portion of the CN 1042 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1042 components/functions.

The CN 1042 is shown to be communicatively coupled to an application server 1050 and a network 1050 via an IP communications interface 1055. the one or more server(s) 1050 comprise one or more physical and/or virtualized systems for providing functionality (or services) to one or more clients (e.g., UEs 1021 and IoT devices 1011) over a network. The server(s) 1050 may include various computer devices with rack computing architecture component(s), tower computing architecture component(s), blade computing architecture component(s), and/or the like. The server(s) 1050 may represent a cluster of servers, a server farm, a cloud computing service, or other grouping or pool of servers, which may be located in one or more datacenters. The server(s) 1050 may also be connected to, or otherwise associated with one or more data storage devices (not shown). Moreover, the server(s) 1050 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1050 offer applications or services that use IP/network resources. As examples, the server(s) 1050 may provide traffic management services, cloud analytics, content streaming services, immersive gaming experiences, social networking and/or microblogging services, and/or other like services. In addition, the various services provided by the server(s) 1050 may include initiating and controlling software and/or firmware updates for applications or individual components implemented by the UEs 1021 and IoT devices 1011. The server(s) 1050 can also be configured to support one or more communication services (e.g., Voice-over-Internet Protocol (VoIP) sessions, PTT sessions, group communication sessions, social networking services, etc.) for the UEs 1021 and IoT devices 1011 via the CN 1042.

The cloud 1044 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1044 include application capabilities type, infrastructure capabilities type, and platform capabilities type. A cloud capabilities type is a classification of the functionality provided by a cloud service to a cloud service customer (e.g., a user of cloud 1044), based on the resources used. The application capabilities type is a cloud capabilities type in which the cloud service customer can usethe cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1044 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (Naas), which is a cloud service category involving transport connectivity and related network capabilities; Platform as a Service (Paas), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

In some embodiments, the cloud 1044 may represent a network such as the Internet, a local area network (LAN) or a wide area network (WAN) including proprietary and/or enterprise networks for a company or organization, or combinations thereof. The cloud 1044 may be a network that comprises computers, network connections among the computers, and software routines to enable communication between the computers over network connections. In this regard, the cloud 1044 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1044 may be via a wired or a wireless connection using the various communication protocols discussed infra. More than one network may be involved in a communication session between the illustrated devices. Connection to the cloud 1044 may require that the computers execute software routines which enable, for example, the seven layers of the OSI model of computer networking or equivalent in a wireless (cellular) phone network. Cloud 1044 may be used to enable relatively long-range communication such as, for example, between the one or more server(s) 1050 and one or more UEs 1021 and IoT devices 1011. In some embodiments, the cloud 1044 may represent the Internet, one or more cellular networks, local area networks, or wide area networks including proprietary and/or enterprise networks, TCP/Internet Protocol (IP)-based network, or combinations thereof. In such embodiments, the cloud 1044 may be associated with network operator who owns or controls equipment and other elements necessary to provide network-related services, such as one or more base stations or access points, one or more servers for routing digital data or telephone calls (e.g., a core network or backbone network), etc. The backbone links 1055 may include any number of wired or wireless technologies, and may be part of a LAN, a WAN, or the Internet. In one example, the backbone links 1055 are fiber backbone links that couple lower levels of service providers to the Internet, such as the CN 1012 and cloud 1044.

In embodiments, the edge compute nodes 1036 may include or be part of an edge system 1035 (or edge network 1035). The edge compute nodes 1036 may also be referred to as "edge hosts 1036" or "edge servers 1036." The edge system 1035 includes a collection of edge servers 1036 (e.g., MEC hosts/servers 1036-1 and 1036-2 of FIG. 12) and edge management systems (not shown by FIG. 10) necessary to run edge computing applications (e.g., MEC Apps 1236 of FIG. 12) within an operator network or a subset of an operator network. The edge servers 1036 are physical computer systems that may include an edge platform (e.g., MEC platform 1237 of FIG. 12) and/or virtualization infrastructure (e.g., VI 1238 of FIG. 12), and provide compute, storage, and network resources to edge computing applications. Each of the edge servers 1036 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1020 and/or endpoints 1010. The VI of the edge servers 1036 provide virtualized environments and virtualized resources for the edge hosts, and the edge computing applications may run as VMs and/or application containers on top of the VI. One example implementation of the edge system 1035 is a MEC system 1035, which is discussed in more detail infra with respect to FIGS. 12-13. It should be understood that the disclosed MEC systems and services deployment examples are only one illustrative example of edge computing systems/networks 1035, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the LPP embodiments.

As shown by FIG. 10, each of the NANs 1031, 1032, and 1033 are co-located with edge compute nodes (or "edge servers") 1036a, 1036b, and 1036c, respectively. These implementations may be small-cell clouds (SCCs) where an edge compute node 1036 is co-located with a small cell (e.g., pico-cell, femto-cell, etc.), or may be mobile micro clouds (MCCs) where an edge compute node 1036 is co-located with a macro-cell (e.g., an eNB, gNB, etc.). The edge compute node 1036 may be deployed in a multitude of arrangements other than as shown by FIG. 10. In a first example, multiple NANs 1031-1033 are co-located or otherwise communicatively coupled with one edge compute node 1036. In a second example, the edge servers 1036 may be co-located or operated by RNCs, which may be the case for legacy network deployments, such as 3G networks. In a third example, the edge servers 1036 may be deployed at cell aggregation sites or at multi-RAT aggregation points that can be located either within an enterprise or used in public coverage areas. In a fourth example, the edge servers 1036 may be deployed at the edge of CN 1042. These implementations may be used in follow-me clouds (FMC), where cloud services running at distributed data centers follow the UEs 1021 as they roam throughout the network.

In any of the aforementioned embodiments and/or implementations, the edge servers 1036 provide a distributed computing environment for application and service hosting, and also provide storage and processing resources so that data and/or content can be processed in close proximity to subscribers (e.g., users of UEs 1021, 1011) for faster response times The edge servers 1036 also support multi-tenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1036 from the UEs 1011/1021, CN 1042, cloud 1044, and/or server(s) 1050, or vice versa. For example, a device application or client application operating in a UE 1021/1011 may offload application tasks or workloads to one or more edge servers 1036. In another example, an edge server 1036 may offload application tasks or workloads to one or more UE 1021/1011 (e.g., for distributed ML computation or the like).

Figure 11:
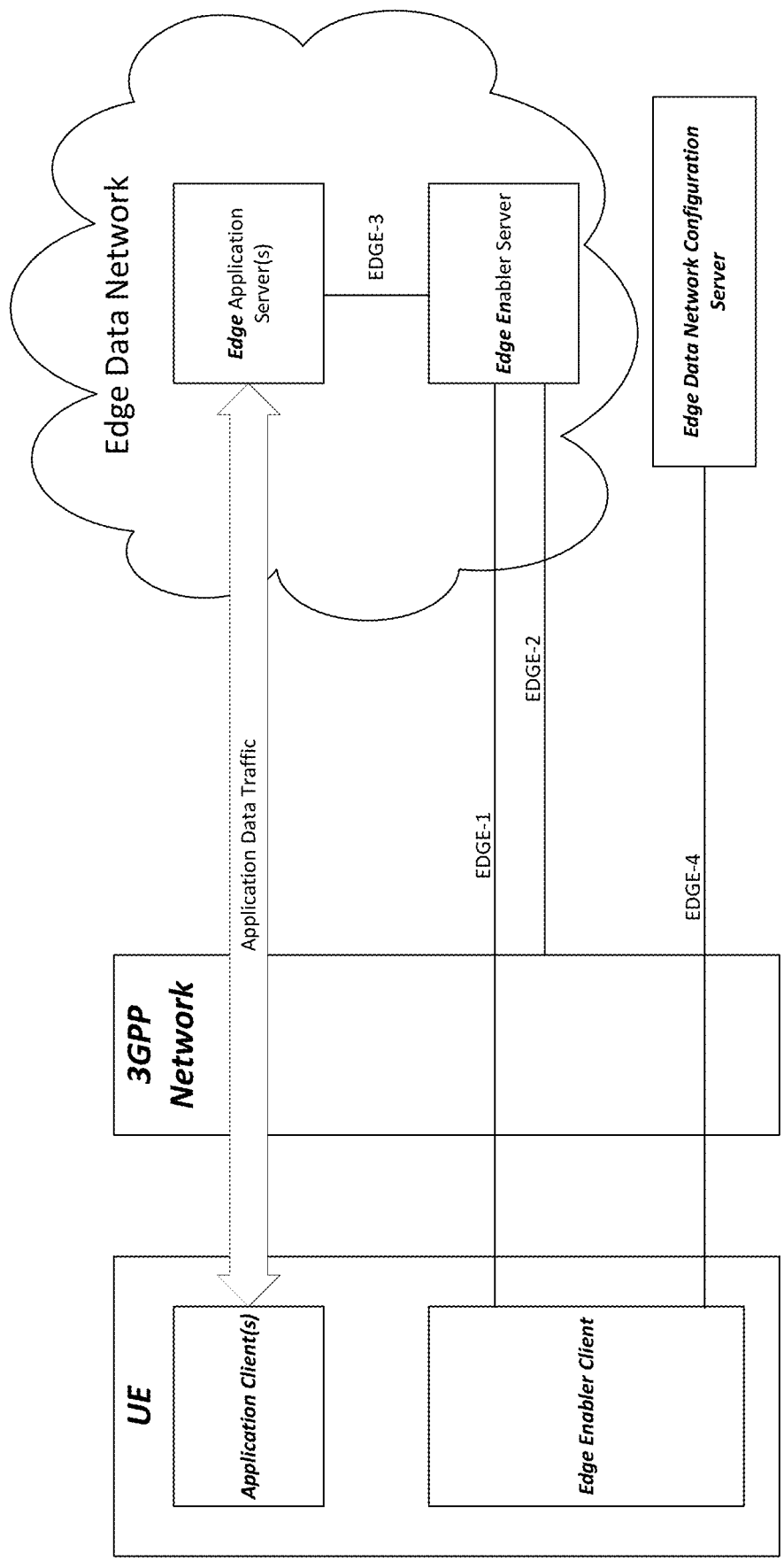
FIG. 11 shows an example 3GPP-based application architecture for enabling Edge Applications, in accordance with various embodiments.

FIG. 11 shows an example 3GPP-based application architecture for enabling Edge Applications (see e.g., 3GPP TR 23.758 v0.3.0 (2019-07-18)). In FIG. 11, the Edge Enabler Server is a functional entity resident in the Edge Hosting Environment providing services for the Edge Application Servers and Edge Enabler Clients. The Edge Enabler Server provides supporting functions needed for Edge Application Servers to run in an Edge Data Network including provisioning of configuration information to enable the exchange of Application Data Traffic with the Edge Application Server(s); and providing information related to the Edge Application Servers, such as availability, to the Edge Enabler Client. The interactions related to enabling Edge Computing between the Edge Enabler Server and the Edge Enabler Client are supported by the EDGE-1 reference point. The interactions related to Edge Enabler Layer between the Edge Enabler Server and the 3GPP Network are supported by the EDGE-2 reference point.

The Edge Hosting Environment is an environment providing support required for Edge Application Server's execution. The Edge Application Server(s) are application servers (AS) resident in the Edge Hosting Environment (e.g., the Edge Data Network), where an AS is application software resident in the cloud performing server function(s). The interactions related to Edge Enabler Layer between the Edge Enabler Server and the Edge Application Servers are supported by the EDGE-3 reference point.

The Edge Enabler Client is a functional entity resident in a UE (e.g., UEs 1011, 1021 of FIG. 10) providing services for the Application Clients including, for example, retrieval and provisioning of configuration information to enable the exchange of Application Data Traffic with the Edge Application Server; and discovery of Edge Application Servers available in the Edge Data Network.

The Edge Data Network Configuration Server provides supporting functions needed for the UE to connect with an Edge Enabler Server including, for example, provisioning of Edge Data Network configuration information to the Edge Enabler Client. The Edge Data Network configuration information includes information for the UE to connect to the Edge Data Networks with its service area information; and information for establishing a connection with Edge Enabler Servers (such as URI). The interactions related to Edge Enabler Layer, between the Edge Data Network Configuration Server and the Edge Enabler Client are supported by the EDGE-4 reference point.

Figure 12:
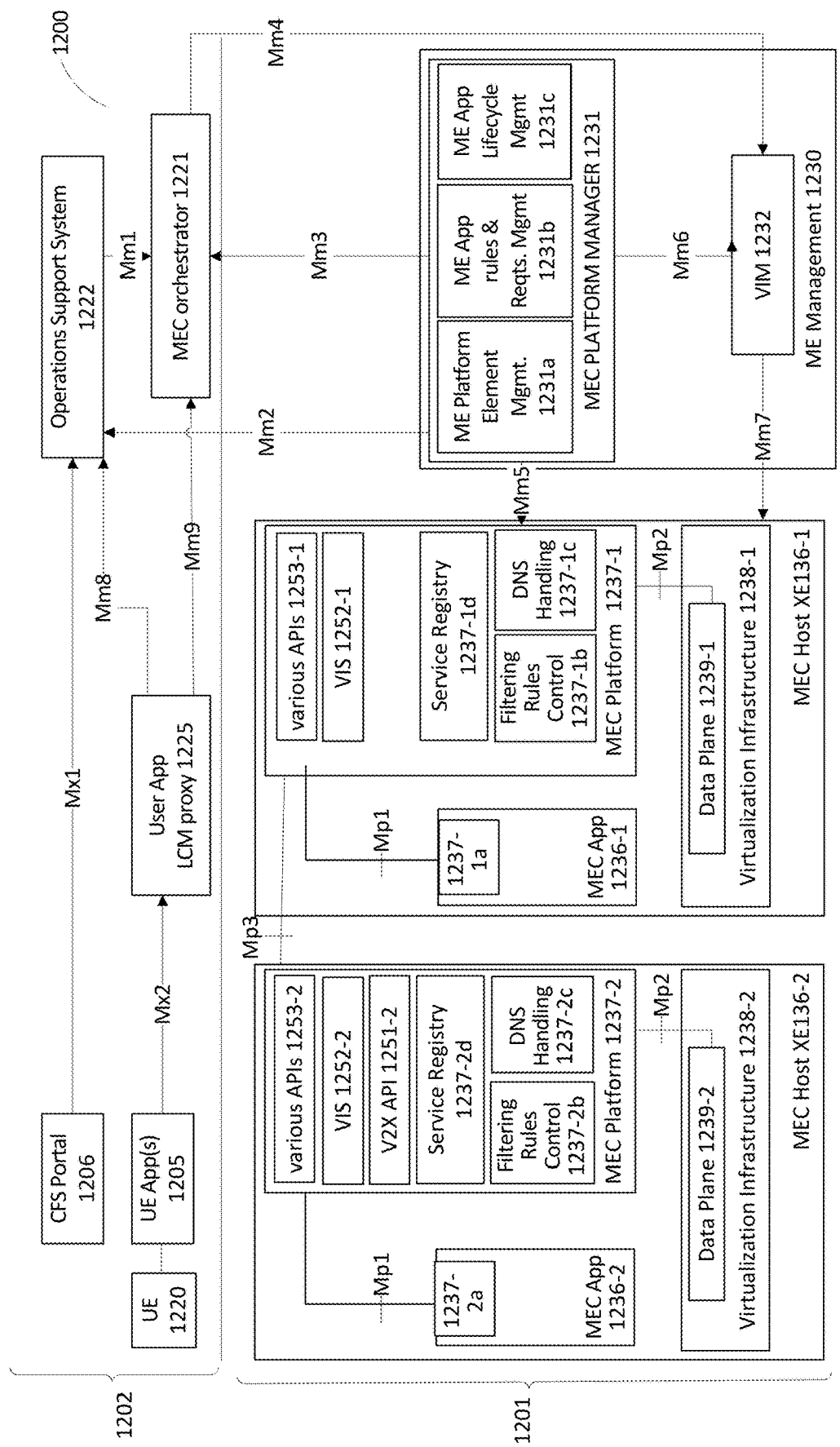
FIG. 12 depicts a block diagram for an example MEC system architecture in accordance with various embodiments.

FIG. 12 depicts a block diagram for an example MEC system architecture 1200 according to various embodiments. The MEC system architecture 1200 may correspond to the edge computing system 1035 of FIG. 10. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP LTE-V2X based protocols) need to exchange data, provide data to aggregation points and access to data in databases which provide an overview of the local situation derived from a multitude of sensors (by various cars, roadside units, etc.).

The illustrated logical connections between various entities of the MEC architecture 1200 may be access-agnostic and not dependent on a particular deployment. MEC enables implementation of MEC applications (MEC Apps) 1236-1 and 1236-2 (collectively referred to as "MEC Apps 1236" or the like) as software-only entities that run on top of a Virtualization Infrastructure (VI) 1238-1 and 1238-2 (collectively referred to as "VI 1238" or the like), which is located in or close to the network edge. A MEC app 1236 is an application that can be instantiated on a MEC host 1036 within the MEC system 1200 and can potentially provide or consume MEC services 1237a. The term "user application" in the context of MEC refers to an MEA 1236 that is instantiated in the MEC system 1200 in response to a request from a user (e.g., UE 1021) via a device application. FIG. 12 shows the general entities involved, and these entities can be grouped into multi-access edge system level 1202, multi-access edge host level 1201, and network level entities (not shown). The multi-access edge host level 1201 includes a MEC host 1036-1 and MEC Host 1036-2 (which may be the same or similar to the MEC servers 1036 discussed previously, and re collectively referred to as "MEC host 1036" or the like) and Multi-access Edge (ME) management 1230, which provide functionality to run MEC Apps 1236 within an operator network or a subset of an operator network. The multi-access edge system level 1202 includes multi-access edge system level management 1202, UE 1220 (which may be the same or similar to the intermediate nodes 1020 and/or endpoints 1010 discussed herein), and third party entities. The network level (not shown) includes various external network level entities, such as a 3GPP network (e.g., CN 1042 of FIG. 10), a local area network (e.g., a LAN, WLAN, PAN, etc.), and an external network (e.g., CN 1042 and/or cloud 1044 of FIG. 10). The multi-access edge host level 1201 includes multi-access edge host level management and one or more MEC hosts 1036. The multi-access edge host level management may include various components that handle the management of the multi-access edge specific functionality of a particular MEC platform 1237, MEC host 1036, and the MEC Apps 1236 to be run. The MEC host 1036 includes the MEC platform 1237, MEC Apps 1236, and VI 1238.

The MEC system 1200 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 1200 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 1036 is an entity that contains an MEC platform 1237 and VI 1238 which provides compute, storage, and network resources for the purpose of running MEC Apps 1236. Each of the VIs 1238 includes a respective data plane (DP) 1239 (including DP 1239-1 and 1239-2) that executes respective traffic rules 1237-1b and 1237-2b (collectively referred to as "traffic rules 1237b") received by the MEC platform 1237, and routes the traffic among applications (e.g., MEC Apps 1236), MEC services 1237-1a and 1237-2a (collectively referred to as "MEC services 1237a"), DNS server/proxy (see e.g., via DNS handling entities 1237-1c and 1237-2c), 3GPP network, local networks, and external networks. The MEC DP 1238a may be connected with the (R)AN nodes 1031 and CN 1042 of FIG. 10, and/or may be connected with the AP 1033 of FIG. 10 via a wider network, such as the internet, an enterprise network, or the like. The other entities depicted and/or discussed herein may be the same or similar as those discussed with regard to FIG. 10.

The MEC platforms 1237-1 and 1237-2 (collectively referred to as "MEC platform 1237" or the like) within a MEC host 1036 may be a collection of essential functionality required to run MEC Apps 1236 on a particular VI 1238 and enable them to provide and consume MEC services 1237a, and that can provide itself a number of MEC services 937a. The MEC platform 1237 can also provide various services and/or functions, such as offering an environment where the MEC Apps 1236 can discover, advertise, consume and offer MEC services 1237a (discussed infra), including MEC services 1237a available via other platforms when supported. The MEC platform 1237 may be able to allow authorized MEC Apps 1236 to communicate with third party servers located in external networks. The MEC platform 1237 may receive traffic rules from the MEC platform manager 1231, applications, or services, and instruct the data plane accordingly (see e.g., Traffic Rules Control 1237b). The MEC platform 1237 may send instructions to the DP 1238 within the VI 1238 via the Mp2 reference point. The Mp2 reference point between the MEC platform 1237 and the DP 1238 of the VI 1238 may be used to instruct the DP 1238 on how to route traffic among applications, networks, services, etc. In some implementations, the MEC platform 1237 may translate tokens representing UEs XPO1 in the traffic rules into specific IP addresses. The MEC platform 1237 also receives DNS records from the MEC platform manager 1231 and configures a DNS proxy/server accordingly. The MEC platform 1237 hosts MEC services 1237*a* including the multi-access edge services discussed infra, and provide access to persistent storage and time of day information. Furthermore, the MEC platform 1237 may communicate with other MEC platforms 1237 of other MEC servers 1036 via the Mp3 reference point.

The VI 1238 may represent the totality of all hardware and software components which build up the environment in which MEC Apps 1236 and/or MEC platform 1237 are deployed, managed and executed. The VI 1238 may span across several locations, and the network providing connectivity between these locations is regarded to be part of the VI 1238. The physical hardware resources of the VI 1238 includes computing, storage and network resources that provide processing, storage and connectivity to MEC Apps 1236 and/or MEC platform 1237 through a virtualization layer (e.g., a hypervisor, VM monitor (VMM), or the like). The virtualization layer may abstract and/or logically partition the physical hardware resources of the MEC server 1036 as a hardware abstraction layer. The virtualization layer may also enable the software that implements the MEC Apps 1236 and/or MEC platform 1237 to use the underlying VI 1238, and may provide virtualized resources to the MEC Apps 1236 and/or MEC platform 1237, so that the MEC Apps 1236 and/or MEC platform 1237 can be executed.

The MEC Apps 1236 are applications that can be instantiated on a MEC host/server 1036 within the MEC system 1200 and can potentially provide or consume MEC services 1237*a*. The term "MEC service" refers to a service provided via a MEC platform 1237 either by the MEC platform 937 itself or by a MEC App 1236. MEC Apps 1236 may run as VM on top of the VI 1238 provided by the MEC server 1036, and can interact with the MEC platform 1237 to consume and provide the MEC services 1237*a*. The MEC Apps 1236 are instantiated on the VI 1238 of the MEC server 1036 based on configuration or requests validated by the ME management 1230. In some embodiments, the MEC Apps 1236 can also interact with the MEC platform 1237 to perform certain support procedures related to the lifecycle of the MEC Apps 1236, such as indicating availability, preparing relocation of user state, etc. The MEC Apps 1236 may have a certain number of rules and requirements associated to them, such as required resources, maximum latency, required or useful services, etc. These requirements may be validated by the ME management 1230, and can be assigned to default values if missing. MEC services 1237-1*a* and 1237-2*a* (collectively referred to as "MEC services "437*a*" or the like) are services provided and/or consumed either by the MEC platform 1237 and/or MEC Apps 1236. The service consumers (e.g., MEC Apps 1236 and MEC platform 1237) may communicate with particular MEC services 1237*a* over individual APIs (including MEC V2X API 1251-1, 1251-2 and various APIs 1253-1, 1253-2 in FIG. 12). When provided by an application, a MEC service 1237*a* can be registered in a list of services in the service registries 1237-1*d* and 1237-2*d* (collectively referred to as "service registry 1237*d*" or the like) to a respective the MEC platform 1237 over the Mp1 reference point. Additionally, the MEC Apps 1236 can subscribe to one or more services 1237*a* for which it is authorized over the Mp1 reference point.

The MEC system 1200 may support a feature called UserApps. When the MEC system 1200 supports the feature UserApps, the ME management 1230 may support the instantiation of MEC Apps 1236 (or user applications) on multiple MEC hosts 1036 following a single instantiation request, and when required by the operator in response to a request by the user. The application instance may need to fulfil a number of potential constraints predefined for the application 1205. Once instantiated, connectivity may be established between the UE 1220 and the application instance. Potential constraints may include latency, location, compute resources, storage resources, network capability, security conditions, and the like. As part of the user application (or MEC app 1236) instantiation, the MEC system 1200 will create an associated application context that the MEC system 1200 maintains for the lifetime of the user application (or MEC app 1236). The application context is a set of reference data about an application instance that is used to identify it, enable lifecycle management operations and associate it with its device application, The term "user context" in the context of MEC refers to application-specific runtime data maintained by a MEC app 1236, which is associated with a user of that application. The application context contains information specific to the application instance such as its unique identifier within the MEC system 1200 and the address (e.g., URI or the like) provided for clients (e.g., UE 1220) that are external to the MEC system 1200 to interact with the user application.

When the MEC system 1200 supports the feature UserApps, the system 1200 may, in response to a request by a user, support the establishment of connectivity between the UE 1220 and an instance of a specific MEC App 1236 fulfilling the requirements of the MEC App 1236 regarding the UE 1220. If no instance of the MEC App 1236 fulfilling these requirements is currently running, the multi-access edge system management may create a new instance of the application 1205 on a MEC host 1036 that fulfils the requirements of the application 1205. Once instantiated, connectivity is established between the UE 1220 and the new MEC App 1236 instance. Requirements of the application can include latency, location, compute resources, storage resources, network capability, security conditions, and the like. When the MEC system 1200 supports the UserApps feature, the system 1200 may support the onboarding of MEC Apps 1236 during the execution of an instantiation request, may allow the establishment of connectivity between the UE 1220 and a specific instance of an MEC App 1236, may support the capability to terminate the MEC App 1236 instance when no UE 1220 is connected to it anymore, and may support the termination of the MEC App 1236 running on multiple MEC servers 1036 following a single termination request.

As shown by FIG. 12, the Mp1 reference point is between the MEC platform 1237 and the MEC Apps 1236. The Mp1 reference point may provide service registration 1237*d*, service discovery, and communication support for various services, such as the MEC services 1237-1*a* provided by MEC host 1036-1 and MEC services 1237-2*a* provided by MEC Host 1036-2 (collectively referred to as "MEC services 1237*a*" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 1237*a* include Radio Network Information Service (RNIS), location services, and bandwidth management services. The RNIS, when available, provides authorized MEC Apps 1236 with radio network related information, and expose appropriate up-to-date radio network information to the MEC Apps 1236. The radio network information (RNI) may include, inter alia, radio network conditions, measurement and statistics information related to the user plane, information related to UEs 1220 served by the radio node(s) associated with the MEC host 1036 (e.g., UE context and radio access bearers), changes on information related to UEs 1220 served by the radio node(s) associated with the MEC host 1036, and/or the like. The RNI may be provided at the relevant granularity (e.g., per UE 1220, per cell, per period of time).

The service consumers (e.g., MEC Apps 1236 and MEC platform 1237) may communicate with the RNIS over an RNI API 1253 to obtain contextual information from a corresponding RAN. RNI may be provided to the service consumers via an access node (e.g., (R)AN nodes 1031, 1032, or AP 1033 of FIG. 10). The RNI API 1253 may support both query and subscription (e.g., a pub/sub) based mechanisms that are used over a Representational State Transfer (RESTful) API 1253 or over a message broker of the MEC platform 1237 (not shown by FIG. 12). A MEC App 1236 may query information on a message broker via a transport information query procedure, wherein the transport information may be pre-provisioned to the MEC App 1236 via a suitable configuration mechanism. The various messages communicated via the RNI API 1253 may be in XML, JSON, Protobuf, or some other suitable format.

The RNI may be used by MEC Apps 1236 and MEC platform 1237 to optimize the existing services and to provide new types of services that are based on up to date information on radio conditions. As an example, a MEC App 1236 may use RNI to optimize current services such as video throughput guidance. In throughput guidance, a radio analytics MEC App 1236 may use MEC services to provide a backend video server with a near real-time indication on the throughput estimated to be available at the radio downlink interface in a next time instant. The throughput guidance radio analytics application 1236 computes throughput guidance based on the required radio network information it obtains from a multi-access edge service running on the MEC server 1036. RNI may be also used by the MEC platform 1237 to optimize the mobility procedures required to support service continuity, such as when a certain MEC App 1236 requests a single piece of information using a simple request-response model (e.g., using RESTful mechanisms) while other MEC Apps 1236 subscribe to multiple different notifications regarding information changes (e.g., using a pub/sub mechanism and/or message broker mechanisms).

The location services (LS), when available, may provide authorized MEC Apps 1236 with location-related information, and expose such information to the MEC Apps 1236. With location related information, the MEC platform 1237 or one or more MEC Apps 1236 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1220 currently served by the radio node(s) associated with the MEC server 1036, information about the location of all UEs 1220 currently served by the radio node(s) associated with the MEC server 1036, information about the location of a certain category of UEs 1220 currently served by the radio node(s) associated with the MEC server 1036, a list of UEs 1220 in a particular location, information about the location of all radio nodes currently associated with the MEC server 1036, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 1036, or a subset thereof, according to a desired deployment. In this regard, the OMA Zonal Presence API 1253 provides means for MEC Apps 1236 to retrieve information about a zone, the access points associated to the zones and the users that are connected to the access points. In addition, the OMA Zonal Presence API 1253, allows authorized application to subscribe to a notification mechanism, reporting about user activities within a zone. In various embodiments, a MEC server 1036 may access location information or zonal presence information of individual UEs 1220 using the OMA Zonal Presence API 1253 to identify the relative location or positions of the UEs 1220.

The bandwidth management services (BWMS) provides for the allocation of bandwidth to certain traffic routed to and from MEC Apps 1236, and specify static/dynamic up/down bandwidth resources, including bandwidth size and bandwidth priority. MEC Apps 1236 may use the BWMS to update/receive bandwidth information to/from the MEC platform 1237. In some embodiments, different MEC Apps 1236 running in parallel on the same MEC server 1036 may be allocated specific static, dynamic up/down bandwidth resources, including bandwidth size and bandwidth priority. The BWMS includes a bandwidth management (BWM) API 1253 to allowed registered applications to statically and/or dynamically register for specific bandwidth allocations per session/application. The BWM API 1253 includes HTTP protocol bindings for BWM functionality using RESTful services or some other suitable API mechanism.

Referring back to FIG. 12, multi-access edge management comprises multi-access edge system level management and the multi-access edge host level management 1230. The ME management 1230 comprises the MEC platform manager 1231 and the VI manager (VIM) 1232, and handles the management of MEC-specific functionality of a particular MEC server 1036 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 1231 is responsible for managing the life cycle of applications including informing the multi-access edge orchestrator (MEC-O) 1221 of relevant application related events. The MEC platform manager 1231 may also provide MEP element management functions 1231*a* to the MEC platform 1237, manage MEC App rules and requirements 1231*b* including service authorizations, traffic rules, DNS configuration and resolving conflicts, and manage MEC App 1236 lifecycles (MEALC mgmt 1231*c*). The MEC platform manager 1231 may also receive virtualized resources fault reports and performance measurements from the VIM 1232 for further processing. The Mm5 reference point between the MEC platform manager 1231 and the MEC platform 1237 is used to perform platform configuration, configuration of the MEPE mgmt

1231*a*, the MERR mgmt 1231*b*, the MEALC mgmt 1231*c*, management of application relocation, etc.

The VIM 1232 may be an entity that allocates, manages and releases virtualized (compute, storage and networking) resources of the VI 1238, and prepares the VI 1238 to run a software image. To do so, the VIM 1232 may communicate with the VI 1238 over the Mm7 reference point between the VIM 1232 and the VI 1238. Preparing the VI 1238 may include configuring the VI 1238, and receiving/storing the software image. When supported, the VIM 1232 may provide rapid provisioning of applications, such as described in "Openstack++ for Cloudlet Deployments", available at http://reports-archive.adm.cs.cmu.edu/anon/2015/CMU-CS-15-123.pdf. The VIM 1232 may also collect and report performance and fault information about the virtualized resources, and perform application relocation when supported. For application relocation from/to external cloud environments, the VIM 1232 may interact with an external cloud manager to perform the application relocation, for example using the mechanism described in "Adaptive VM Handoff Across Cloudlets", and/or possibly through a proxy. Furthermore, the VIM 1232 may communicate with the MEC platform manager 1231 via the Mm6 reference point, which may be used to manage virtualized resources, for example, to realize the application lifecycle management. Moreover, the VIM 1232 may communicate with the MEC-O 1221 via the Mm4 reference point, which may be used to manage virtualized resources of the MEC server 1036, and to manage application images. Managing the virtualized resources may include tracking available resource capacity, etc.

The multi-access edge system level management includes the MEC-O 1221 as a core component, which has an overview of the complete MEC system 1200. The MEC-O 1221 may maintain an overall view of the MEC system 1200 based on deployed multi-access edge hosts 901, available resources, available MEC services 1237*a*, and topology. The Mm3 reference point between the MEC-O 1221 and the MEC platform manager 1231 may be used for the management of the application lifecycle, application rules and requirements and keeping track of available MEC services 1237*a*. The MEC-O 1221 may communicate with the user application lifecycle management proxy (UALMP) 1225 via the Mm9 reference point in order to manage MEC Apps 1236 requested by UE application 1205.

The MEC-O 1221 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1202 to handle the applications. The MEC-O 1221 may select appropriate MEC host(s) 901 for application instantiation based on constraints, such as latency, available resources, and available services. The MEC-O 1221 may also trigger application instantiation and termination, as well as trigger application relocation as needed and when supported.

The Operations Support System (OSS) 1222 refers to the OSS of an operator that receives requests via the Customer Facing Service (CFS) portal 1206 (and over the Mx1 reference point) and from UE applications 1205 for instantiation or termination of MEC Apps 1236, and decides on the granting of these requests. The CFS portal 1206 (and the Mx1 interface) may be used by third-parties to request the MEC system 1200 to run applications 1206 in the MEC system 1200. Granted requests may be forwarded to the MEC-O 1221 for further processing. When supported, the OSS 1222 also receives requests from UE applications 1205 for relocating applications between external clouds and the MEC system 1200. The Mm2 reference point between the OSS 1222 and the MEC platform manager 1231 is used for the MEC platform manager 1231 configuration, fault and performance management. The Mm1 reference point between the MEC-O 1221 and the OSS 1222 is used for triggering the instantiation and the termination of multi-access edge applications 1236 in the MEC system 1200.

The UE app(s) 1205 (also referred to as "device applications" or the like) is one or more applications running in a device, computing system, etc. (e.g., UE 1220), that has the capability to interact with the MEC system 900 via the user application lifecycle management proxy 1225. The UE app(s) 1205 may be, include, or interact with one or more client applications, which in the context of MEC, is application software running on a device, computing system, etc. that utilizes functionality provided by one or more specific MEC application(s) 1236. The user application lifecycle management proxy ("user app LCM proxy") 1225 may authorize requests from UE applications 1205 in the UE and interacts with the OSS 1222 and the MEC-O 1221 for further processing of these requests. The term "lifecycle management," in the context of MEC, refers to a set of functions required to manage the instantiation, maintenance and termination of a MEC application 1236 instance. The user app LCM proxy 1225 may interact with the OSS 1222 via the Mm8 reference point, and is used to handle UE applications 1205 requests for running applications in the MEC system 1200. A user application 1205 may be an MEC App 1236 that is instantiated in the MEC system 1200 in response to a request of a user via an application running in the UE 1220 (e.g., UE application 1205). The user app LCM proxy 1225 allows UE applications 1205 to request on-boarding, instantiation, termination of user applications and when supported, relocation of user applications in and out of the MEC system 1200. It also allows informing the UE applications 1205 about the state of the user applications 1205. The user app LCM proxy 1225 is only accessible from within the mobile network, and may only be available when supported by the MEC system 1200. A UE application 1205 may use the Mx2 reference point between the user app LCM proxy 1225 and the UE application 1205 to request the MEC system 1200 to run an application in the MEC system 1200, or to move an application in or out of the MEC system 1200. The Mx2 reference point may only be accessible within the mobile network and may only be available when supported by the multi-access edge system.

In order to run an MEC App 1236 in the MEC system 1200, the MEC-O 1221 receives requests triggered by the OSS 1222, a third-party, or a UE application 1205. In response to receipt of such requests, the MEC-O 1221 selects a MEC server 1036 to host the MEC App 1236 for computational offloading. These requests may include information about the application to be run, and possibly other information, such as the location where the application needs to be active, other application rules and requirements, as well as the location of the application image if it is not yet on-boarded in the MEC system 1200.

In various embodiments, the MEC-O 1221 selects one or more MEC servers 1036 for computational intensive tasks. The selected one or more MEC servers 1036 may offload computational tasks of a UE application 1205 based on various operational parameters, such as network capabilities and conditions, computational capabilities and conditions, application requirements, and/or other like operational parameters. The application requirements may be rules and requirements associated to/with one or more MEC Apps 1236, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1236 to be able to run; multi-access edge services that the MEC Apps 1236 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 1237*b*; DNS rules 1237*c*; etc.

The MEC-O 1221 considers the requirements and information listed above and information on the resources currently available in the MEC system 1200 to select one or several MEC servers 1036 within the MEC system 901 to host MEC Apps 1236 and/or for computational offloading. After one or more MEC servers 1036 are selected, the MEC-O 1221 requests the selected MEC host(s) 1036 to instantiate the application(s) or application tasks. The actual algorithm used to select the MEC servers 1036 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1221 may decide to select one or more new MEC servers 1036 to act as a master node, and initiates the transfer of an application instance or application-related state information from the one or more source MEC servers 1036 to the one or more target MEC servers 1036.

In addition, the MEC system architecture 1200 also provides support for applications. In the context of FIG. 12, the UE app 1205 is an application instance running on a vehicle or vUE 1220, and requesting V2X service to the system. MEC hosts 1036 are co-located with edge infrastructure (e.g., nodes 1031-133 of FIG. 10) and communicate with each other through the Mp3 interface. The example of FIG. 12 also uses V2X Information Services (VIS) 1252-1 and 1252-1 (collectively referred to as "MEC VIS 1252"). FIG. 12 is an example of application instances in a V2X service with MEC V2X API 1251*a* and 1251*b* (collectively referred to as "MEC V2X API 1251"). In the framework of V2X services, a vehicle UE 1220 is hosting a client application, and is connected to a certain MEC host 1036 (and a related MEC App 1236). In presence of multiple MEC host/server 1036, the VIS 1252 permits to expose information between MEC Apps 1236 running on different MEC hosts 1036. In addition, other remote application server instances can be located somewhere else (e.g., private clouds owned by the operator or by the OEM such as cloud 1044). The VIS 1252 may be produced by the MEC platform 1237 or by the MEC Apps 1236.

In particular, the VIS 1252 permits information exposure, pertinent to the support of automotive use cases, to MEC application instances. VIS 1252 also permits a single V2X/ITS operator to offer a V2X service(s) over a region that may span different countries and involve multiple network operators, MEC systems 1200 and MEC apps 1236 providers. For that purpose, the MEC VIS 1252 includes the following functionalities.

In some aspects, the MEC platform 1237 can include a MEC V2X API 1251 and provide MEC VIS 1252, which can include the following functionalities: (a) gathering of PC5 V2X relevant information from the 3GPP network for purposes of performing UE authorization for V2X communications (e.g., obtaining a list of V2X authorized UEs 1220, obtaining relevant information about the authorization based on the UE subscription, and obtaining V2X configuration parameters such as a common set of V2X configuration parameters which can include PC5 configuration parameters); (b) exposure of the information obtained in (a) to MEC apps 1236 in the same host or MEC apps in other MEC hosts; (c) enablement of MEC apps 1236 to communicate securely with the V2X-related 3GPP core network logical functions (e.g., enabling communication between the MEC host and a V2X control function in the core network); (d) enablement of MEC apps 1236 in different MEC systems 1200 to communicate securely with each other; and (e) gathering and processing information available in other MEC APIs 1253 (e.g., gathering and processing information obtained from a RNI API, Location API, WLAN API, and other APIs that may be implemented within the MEC platform 1237) in order to predict radio network congestion, and provide suitable notifications to the UE 1220.

From that perspective, the VIS 1252 is relevant to Mp1 and Mp3 reference points in the MEC architecture 1200. In particular, the relevant information is exposed to MEC apps 1236 via the Mp1 reference point, and the Mp3 reference point may enable the possibility to transfer this information between different MEC platforms 1237. The MEC V2X API 1251 provides information to MEC apps 1236 in a standardized way, which provides interoperability in multi-vendor scenarios. Nevertheless, MEC apps 1236 may communicate in a direct way (e.g., without the use of MEC platform 1237). Inter-system communication may be realized between MEC Orchestrators 1221. As an alternative, or, in addition to that, possible Mp3 enhancements (or new reference points between MEC systems 1200) may be defined.

In some aspects, the MEC Host 1036-2 in FIG. 12 can also implement a MEC V2X API 1251-2, which can provide an interface to one or more of the apps instantiated within MEC Host 1036-2, such as MEC App 1236-2*b*. In this regard, MEC host 1036-1 and MEC Host 1036-2 can communicate with each other via the Mp3 interface as well as the MEC V2X APIs 1251-1, 1251-2. Additionally, one or more of the MEC apps 1236-1 instantiated within MEC host 1036-1 can communicate with one or more of the MEC apps 1236-2 instantiated within MEC Host 1036-2 via the MEC V2X APIs 1251-1, 1251-2 as well as the Mp3 interface between the MEC host 1036-1 and MEC Host 1036-2.

In some aspects, each of the MEC hosts 1036 can be owned/managed by a different mobile services operator (while it can be operated directly by a MEC vendor or a third party). In some aspects, MEC apps 1236 instantiated on MEC host 1036-1 and MEC Host 1036-2 can be used to provide V2X-related services, and can be operated by the mobile services operator, by a MEC vendor, or by a third party (e.g., OEM, or OEM supplier, or system integrator).

In some aspects, the MEC V2X APIs 1251 can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs 1251 can be configured to gather information and data from sensors. In this regard, the deployment of the MEC V2X APIs 1251 is ensuring continuity of the service across different mobile networks, for the same OEM (e.g., automobile manufacturer). If a standard implementation of a V2X API 1251 is introduced (e.g., by ETSI MEC), this functionality can ensure the same basic V2X service characteristics for all OEMs in a 5G communication system with MEC functionalities.

In some aspects, MEC app 1236a and MEC app 1236b can use the corresponding MEC V2X APIs 1251 to retrieve information from the 3GPP network. In some aspects, MEC apps 1236 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 1236-1 can be configured to connect to MEC Host 1036-2 (through V2X MEC API 1251-2 in MEC Host 1036-2), and MEC app 1236-2 can be configured to connect to MEC host 1036-1 (through V2X MEC API 1251-1 in MEC host 1036-1). In case of a multi-operator architecture, multiple MEC hosts can be configured to communicate with each other via the MEC V2X APIs 1251 and synchronize in order to transfer the relevant V2X configuration parameters, so that they can be available across the multi-operator architecture in absence of cellular coverage (e.g., outside of the 3GPP domain). In this way, a UE 1220 can have access to V2X configuration parameters even when the UE is not under coverage of its 3GPP network.

In some aspects, one or more ME apps within a MEC host 1036 can be instantiated to perform functionalities of a V2X application function, which may include providing VIS 1252. Additionally, MEC hosts can use MEC V2X APIs 1251 to perform various V2X or VIS 1252 functions. In particular, one or more ME apps can be instantiated within a MEC host to perform functionalities associated with a V2X application function. In some aspects, these ME apps can be configured to perform the following V2X application functions: obtaining V2X subscription information for a vUE 1220, determining whether the vUE 1220 is authorized to perform V2X communications in response to a request for V2X services, communicating V2X configuration parameters such as a common set of V2X configuration parameters, and so forth.

Figure 13:
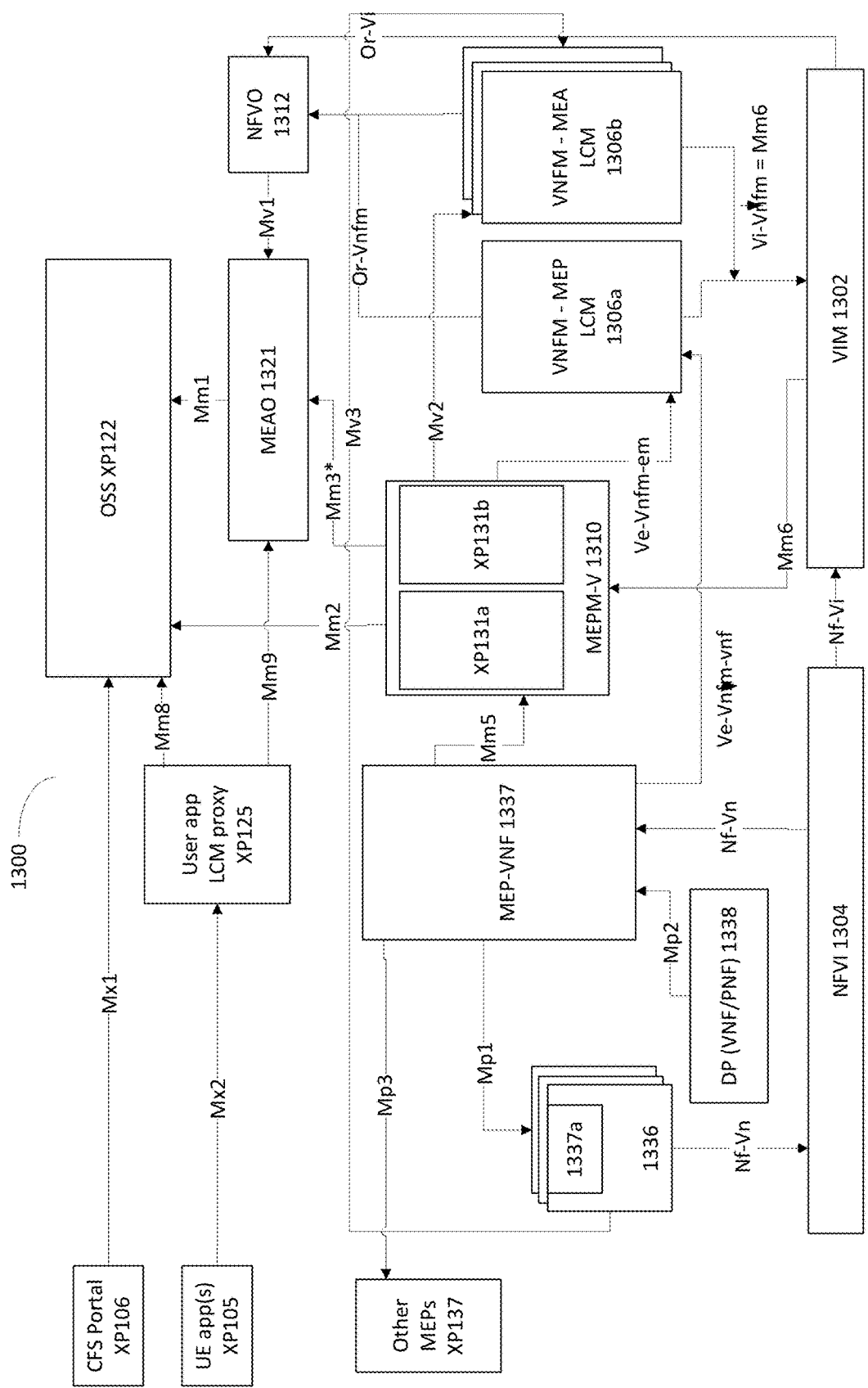
FIG. 13 illustrates an example multi-access edge system architecture (or a multi-access edge system architecture) in accordance with various embodiments.

FIG. 13 illustrates an example multi-access edge system architecture 1300 (or a multi-access edge system architecture) in accordance with various embodiments. MEC system 1300 of FIG. 13 is a second embodiment of a system architecture of the MEC system 1200 discussed previously. Like numbered elements in FIG. 13 are the same as discussed previously with respect to FIG. 12. The MEC system 1300 includes architectures and infrastructures that are used to virtualize one or more network functions (NFs) onto physical resources comprising a combination of industry-standard server hardware, storage hardware, or switches, or alternatively comprising proprietary hardware. Typically, mobile network operators virtualize their NFs using Network Functions Virtualization (NFV), and use virtualization infrastructure (VI) to consolidate various network elements, which are referred to as Virtualized Network Functions (VNFs). In other words, NFV can be used to execute virtual or reconfigurable implementations of one or more components/functions of a CN 1042. As mentioned previously, the MEC system 1200 (or individual MEC servers 1036/1201) may include VI to consolidate and virtualize various MEC components and MEC applications on top of the VI. In this regard, the system 1300 is an architecture where MEC elements are deployed in an NFV environment, which may provide maximum utilization of the underlying VI. In particular, the system 1300 is a MEC architecture that is deployed in NFV environments, wherein the MEP 1237 is deployed as a VNF, the MEAs 1236 appear as VNFs towards the NFV MANO components (MEAs 1236 with specific NFV functionality are referred to as an "MEA-VNFs 1336" or the like), and the VI 1238 is deployed as an NFVI 1304 and its virtualized resources are managed by a VIM 1302.

In addition to elements discussed previously with respect to FIG. 12, the system 1300 is illustrated as including a virtualized infrastructure manager (VIM) 1302, a network function virtualization infrastructure (NFVI) 1304, a VNF manager (VNFM) 1306, virtualized network functions (VNFs) including, inter alia, MEP-VNF 1337 and MEA-VNFs 1336, a MEC Edge Platform Manager—NFV (MEPM-V) 1310, and an NFV Orchestrator (NFVO) 1312. In embodiments, the MEP 1237 is realized as a VNF (e.g., MEP-VNF 1337 in FIG. 13) and is managed according to typical NFV procedures. In these embodiments, the MEPM 1231 is transformed into the Multi-access Edge Platform Manager—NFV (MEPM-V) 1310, where the MEPM-V 1310 acts as an Element Manager (EM) of the MEP-VNF 1337. The MEPM-V 1310 delegates Life Cycle Management (LCM) parts/tasks to one or more VNFM(s) 1306, including VNFM-MEP LCM 1306A and VNFM-MEA LCM 1306B. In particular, the VNFM 1306 is used to perform LCM of the MEP-VNF including LCM of the MEP 1237 performed by the VNFM-MEP LCM 1306A and LCM of the MEAs 1236 performed by the VNFM-MEA LCM 1306B.

Additionally, the MEC-O 1221 is transformed into a Multi-access Edge Application Orchestrator" (MEAO) 1321 that uses the NFVO 1312 for resource orchestration, and for orchestration of the set of MEA-VNFs as one or more NFV Network Services (NSs). The MEA-VNFs 1336 are managed like individual VNFs, where certain orchestration and Life Cycle Management (LCM) tasks are delegated to the NFVO 1312 and VNFM 1306a,b functional blocks. In some embodiments, the MEP-VNF 1337, the MEPM-V 1310, and VNFM-MEA LCM 1306B may be deployed as a single package or ensemble. In other embodiments, the VNFM-MEP LCM 1306A and VNFM-MEA LCM 1306B are part of a generic VNFM 1306, and the MEP-VNF 1337 and the MEPM-V 1310 are provided by a single vendor.

The VIM 1302 manages the resources of the NFVI 1304. The NFVI 1304 includes physical or virtual resources and applications (including hypervisors) used to execute the system 1300. The VIM 1302 manages the life cycle of virtual resources with the NFVI 1304 (e.g., creation, maintenance, and tear down of virtual machines (VMs) associated with one or more physical resources); tracks VM instances; tracks performance, fault, and security of VM instances and associated physical resources; and exposes VM instances and associated physical resources to other management systems. The NFVO 1312 coordinates, authorizes, releases, and engages resources of the NFVI 1304 in order to provide requested services (e.g., to execute a core network function, component, or slice).

The VNFM 1306 manages VNFs used to execute core network 1042 components/functions. The VNFM 1306 manages the life cycle of the VNFs and tracks performance, fault, and security of the virtual aspects of VNFs. The MEPM-V 1310 tracks the performance, fault and security of the functional aspects of VNFs. The tracking data from the VNFM 1306 and the MEPM-V 1310 may comprise, for example, performance measurement (PM) data used by the VIM 1302 or the NFVI 1304. Both the VNFM 1306 and the MEPM-V 1310 can scale up/down the quantity of VNFs of the system 1300.

The Mm3* reference point between MEAO 1321 and the MEPM-V 1310 is based on the Mm3 reference point discussed previously. The Mm3* reference point in this embodiment may be altered to account for the split between MEPM-V 1310 and VNFM-MEA LCMs 1306B. In addition to the reference points discussed previously with respect to FIG. 12, system 1300 includes the reference points Mv1, Mv2 and Mv3 between elements of the MEC architecture and NFV architectures to support the management of MEA-VNFs 1336 and respective MEC services 1337*a*. The Mv1 reference point connects the MEAO 1321 and the NFVO 1312 and is the same or similar to the Os-Ma-nfvo reference point in NFV architectures. The Mv2 reference point connects the VNFM-MEA LCM 1306B with the MEPM-V 1310 to allow LCM related notifications to be exchanged between these entities. The Mv2 reference point is the same or similar to the Ve-Vnfm-em reference point in NFV architectures. The Mv3 reference point connects the VNFM-MEA LCM 1306B with MEA-VNF 1336 instance(s) to allow the exchange of messages related to, for example, MEA LCM or initial deployment-specific configurations. The Mv3 reference point is the same or similar to the Ve-Vnfm-vnf reference point in NFV architectures.

Furthermore, the following reference points are used as they are defined for NFV architectures: The Nf-Vn reference point that connects each MEA-VNF 1336 with the NFVI 1304; the Nf-Vi reference point that connects the NFVI 1304 and the VIM 1302; the Os-Ma-nfvo reference point that connects the OSS 1222 and the NFVO 1312, which is primarily used to manage NSs (e.g., a number of VNFs connected and orchestrated to deliver a service); the Or-Vnfm reference point that connects the NFVO 1312 and the VNFM 1306*a,b*, which is primarily used for the NFVO 1312 to invoke VNF LCM operations; the Vi-Vnfm reference point that connects the VIM 1302 and the VNFM 1306*a,b*, which is primarily used by the VNFM 1306*a,b* to invoke resource management operations to manage cloud resources that are needed by the VNF 1337 and/or data plane (DP)-VNF 1338 (where Vi-Vnfm reference point corresponds to the Mm6 reference point discussed previously); the Or-Vi reference point that connects the NFVO 1312 and the VIM 1302, which is primarily used by the NFVO 1312 to manage cloud resources capacity; the Ve-Vnfm-em reference point that connects the VNFM 1306*a,b* that manages the lifecycle of the MEP 1237 with the MEPM-V 1310; the Ve-Vnfm-vnf reference point that connects the VNFM 1306*a,b* that manages the lifecycle of the MEP 1237 with the MEP-VNF 1337; the Nf-Vn reference point that connects the MEP-VNF 1337 and the NFVI 1304; the Nf-Vi reference point that connects the NFVI 1304 and the VIM 1302; the Os-Ma-nfvo reference point that connects the OSS 1222 and the NFVO 1312, which is primarily used to manage NSs, for example, a number of VNFs connected and orchestrated to deliver a service; the Or-Vnfm reference point that connects the NFVO 1312 and the VNFM 1306*a,b* that manages the lifecycle of the ME platform, which is primarily used for the NFVO 1312 to invoke VNF LCM operations; the Vi-Vnfm reference point that connects the VIM 1302 and the VNFM 1306*a,b* that manages the lifecycle of the MEP 1237, which is primarily used by the VNFM 1306*a,b* to invoke resource management operations to manage the cloud resources that are needed by the VNF; and the Or-Vi reference point that connects the NFVO 1312 and the VIM 1302. It is primarily used by the NFVO 1312 to manage cloud resources capacity.

When MEC is deployed in a NFV environment, the data plane (DP) 1338 may be implemented as a Physical Network Function (PNF) (e.g., as DP-PNF 1338), a VNF (e.g., as DP-VNF 1338), or combination thereof. When implemented as a DP-PNF 1338, the DP is connected to the NS that contains the MEA-VNFs 1336, and the Mp2 reference point is kept as a MEC-internal reference point also in the NFV-based deployment of MEC. In another embodiment, for performance enhancements, the Service Function Chaining (SFC) functionality provided by the underlying NFVI 1304 may be reused for traffic routing. In such a deployment, the DP 1338 and the Mp2 reference point are omitted from the system 1300. The SFC functionality in the NFVI 1304 is configured by the NFVO 1312 in the VIM 1302 based on the NFP of the NFV NS, using the Or-Vi reference point. In these embodiments, the MEAO 1321 translates the traffic rules into an NFP and sends it to the NFVO 1312. The MEP 1337 may not control the traffic redirection directly via the Mp2 reference point, but instead may pass requests to activate/deactivate/update traffic rules to the MEPM-V 1310, which will then be forwarded to the MEAO 1321. When receiving such a request, the MEAO 1321 may request the NFVO 1312 to update the NFP accordingly. Furthermore, although not shown by FIG. 13, the system 1300 may also include a network manager (NM). The NM may provide a package of end-user functions with the responsibility for the management of a network, which may include network elements with VNFs, non-virtualized network functions, or both (e.g., management of the VNFs may occur via the MEPM-V 1310).

In some aspects, one or more ME apps 1236 within MEC host 1201 or ME apps 1336 in MEC system 1300 can be instantiated to perform functionalities of a V2X application function. Additionally, MEC hosts 1201 can use MEC V2X APIs to perform various V2X functions. In particular, one or more MEA 1236/1336 can be instantiated within MEC host 1201 or MEC system 1300 to perform functionalities associated with a V2X application function. In some aspects, these MEAs 1236/1336 can be configured to perform the following V2X application functions: obtaining V2X subscription information for a vUE 1021*a*, determining whether the vUE 1021*a* is authorized to perform V2X communications in response to a request for V2X services, communicating V2X configuration parameters such as a common set of V2X configuration parameters, and so forth.

In some aspects, the MEP 1237 and/or MEP-VNF 13137 can include a MEC V2X API, which can be used to perform the following functionalities: (a) gathering of V2X relevant information from the 3GPP network for purposes of performing UE authorization for V2X communications (e.g., obtaining a list of V2X authorized UEs, obtaining relevant information about the authorization based on the UE subscription, and obtaining V2X configuration parameters such as a common set of V2X configuration parameters which can include PC5 configuration parameters); (b) exposure of the information obtained in (a) to MEC apps in the same host or MEC apps in other MEC hosts; (c) enablement of MEC apps to communicate securely with the V2X-related 3GPP core network logical functions (e.g., enabling communication between the MEC host and a V2X control function in the core network); (d) enablement of MEC apps in different MEC systems to communicate securely with each other; and (e) gathering and processing information available in other MEC APIs (e.g., gathering and processing information obtained from a RNI API, Location API, WLAN API, and other APIs that may be implemented within the MEP 1237 and/or MEP-VNF 13137) in order to predict radio network congestion, and provide suitable notifications to the UE.

In some aspects, a second MEC host 1201 can also implement a MEC V2X API which can provide an interface to one or more of the apps instantiated within MEC host 1201, such as MEC app 1236. In this regard, hosts 1201 can communicate with each other via the MP3 interface as well as the MEC V2X APIs. Additionally, one or more of the apps instantiated within host 1201 can communicate with one or more of the apps instantiated within host 1201 via the MEC V2X APIs as well as the interface between the hosts 1201.

In some aspects, each of the MEC hosts 1201 can be owned/managed by a different mobile services operator (while it can be operated directly by a MEC vendor or a third party). In some aspects, MEC applications instantiated on hosts 1002 and 1004 can be used to provide V2X-related services, and can be operated by the mobile services operator, by a MEC vendor, or by a third party (e.g. OEM, or OEM supplier, or system integrator).

In some aspects, the MEC V2X APIs can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs can be configured to gather information and data from sensors. In this regard, the deployment of the MEC V2X APIs is ensuring continuity of the service across different mobile networks, for the same OEM (e.g., automobile manufacturer). If a standard implementation of a V2X API is introduced (e.g. by ETSI MEC), this functionality can ensure the same basic V2X service characteristics for all OEMs in a 5G communication system with MEC functionalities.

In some aspects, MEC apps 1236 and 1336 can use the corresponding MEC V2X APIs to retrieve information from the 3GPP network. In some aspects, MEC apps 1236 and 1336 can be configured to host V2X configuration parameters such as PC5 configuration parameters (or a common set of V2X configuration parameters that can be available within a multi—PLMN communication environment). The availability of these V2X configuration parameters also in absence of network coverage is ensured by the usage of an Mp3 interface (or another type of interface) between the hosts. In some aspects, MEC app 1236/1336 can be configured to connect to MEC host 1201 (through V2X MEC API 1702 in MEC host 1201), and MEC app 1236/1336 can be configured to connect to MEC Host 1201 (through V2X MEC API in MEC host 1201). In case of a multi-operator architecture, multiple MEC hosts can be configured to communicate with each other via the MEC V2X APIs and synchronize in order to transfer the relevant V2X configuration parameters, so that they can be available across the multi-operator architecture in absence of cellular coverage (e.g., outside of the 3GPP domain). In this way, a UE 1021a can have access to V2X configuration parameters even when the UE is not under coverage of its 3GPP network.

Cellular Core Networks

Figure 14:
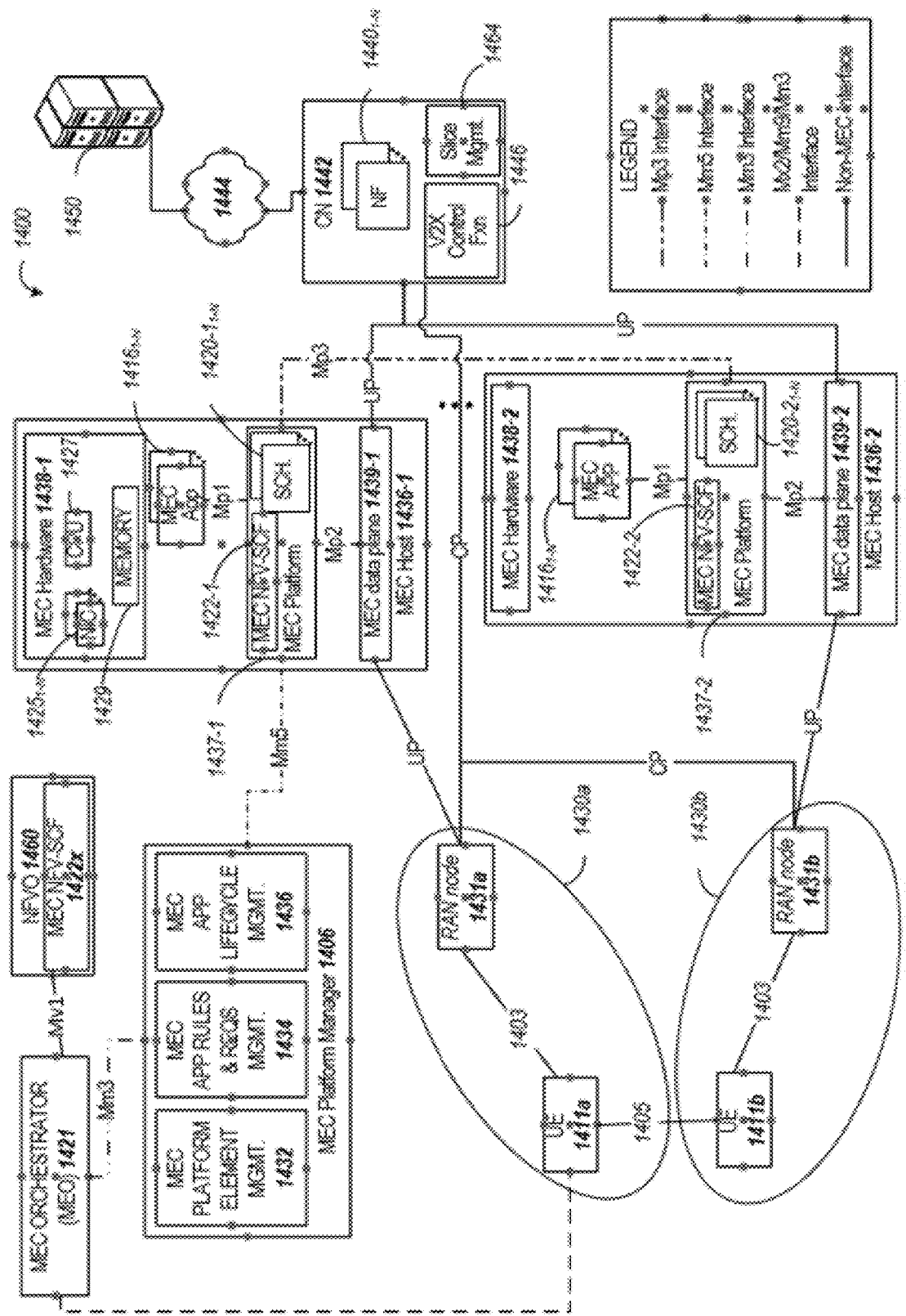
FIG. 14 illustrates an example MEC communication architecture including a common core network (CN), in accordance with various embodiments.

FIG. 14 illustrates an example MEC communication architecture 1400 including a common CN 1420, in accordance with various embodiments. In this example, the MEC infrastructure includes slice management, resource management, and traceability functions. The connections represented by some form of a dashed line (as noted in the legend in FIG. 14) may be defined according to a specification from an ETSI MEC standards family.

The MEC communication infrastructure 1400 can include entities from a MEC-based architecture as well as entities from a 3GPP based architecture. For example, the MEC communication infrastructure 1400 can include a plurality of MEC hosts such as MEC hosts 1402 and 1404, a MEC platform manager 1406, and a MEC orchestrator 1408. The 3GPP based entities can include a CN 1442 coupled to one or more application server(s) 1450 via the network 1444 (e.g., the Internet), as well as RANs 1430a and 1430b (collectively referred to as "RAN nodes 1430" or the like) including RAN nodes 1431a and 1431b (collectively referred to as "RAN nodes 1431" or the like) coupled to corresponding UEs 1411a and 1411b (collectively referred to as "UEs 1411" or the like). The UEs 1411 may be the same or similar as the UEs 1011, 1021 of FIG. 10, the RAN 1430 may be the same or similar to the RAN discussed previously with respect to FIG. 10, and the RAN nodes 1431 may be the same or similar as the NANs 1031, 1032, and/or 1033 discussed previously with respect to FIG. 10. The UEs 1411 may be communicativel coupled with one another via connection 1405 which may be the same or similar to connection 1005 previously with respect to FIG. 10. Connections 1403 between the UEs 1411 and RAN nodes 1431 may be the same or similar to connections 1003 previously with respect to FIG. 10.

In some embodiments, the MEC communication infrastructure 1400 can be implemented by different network operators in the same country and/or in different countries, using different network traffic types. For example, the RAN 1430a associated with RAN node 1431a (with a coverage area represented by the circle 1430a in FIG. 14) can be within a first PLMN (e.g., associated with a first mobile services provider or operator and a first network traffic type), and RAN node 1431b (with a coverage area represented by the circle 1430b in FIG. 14) can be within a second PLMN (e.g., associated with a second mobile services provider or operator and a second network traffic type). As used herein, the terms "mobile services provider" and "mobile services operator" are interchangeable.

In this regard, the MEC communication infrastructure 1400 can be associated with a multi-operator scenario composed by respective coverage areas where communication services (e.g., V2X services) can be provided, with each coverage area being operated by a mobile services operator. Additionally, each of the UEs 1411 and RAN nodes 1431 can be configured for computationally offloading according to the embodiments discussed herein, where each UE 1411 can offload various workloads, tasks, etc. in coordination with one or more entities of the MEC communication infrastructure 1400, such as the MEC NFV server function (SF) (MEC NFV-SF) 1422-1 and 1422-2. Techniques disclosed herein can be used to provide E2E offloading support for MEC-enabled 5G deployments using the MEC NFV-SF. In some aspects, the MEC NFV-SF 1422x can be within a NFV orchestrator (NFVO) 1460, which can be coupled to the MEC orchestrator 1421, as well as to other MEC entities illustrated by FIGS. 12-13.

The solid line connections in FIG. 14 represent non-MEC connections, such as utilizing 3GPP cellular network user plane (UP) and control plane (CP) connections or the like. Other connection techniques (e.g., protocols) and connections may also be used. Accordingly, in the scenario of FIG. 14, the system entities (e.g., MEC orchestrator 1421, MEC platform manager 1406, MEC hosts 1402, 1404 are connected by MEC (or NFV) logical links (indicated with dashed lines), in addition to network infrastructure links (e.g., a 5G/NR, a 4G/LTE, etc.) network, such as provided among UEs 1411, RAN nodes 1431, CN 1442, etc.) (indicated with solid lines). A further connection to cloud services (e.g., application server(s) 1450 access via the network 1444) may also be connected via backhaul network infrastructure links.

The CN 1442 includes various network functions (NFs) 14401-N where the particular NFs 14401-N included in the CN 1442 are based on the particular 3GPP technology that is implemented (e.g., 2G/3G/4G/LTE/LTE-A (LTE Advanced) and/or 5g/NR). For example, the CN 1442 may be an evolved packet core (EPC) network (e.g., a 4G/LTE network), a NextGen Packet Core (NPC) network (e.g., a 5G/NR network), or some other type of CN. In 5G embodiments, the S/P-GW the NFs 14401-N can include UPF(s), one or more AMF(s), SMF(s), AUSF(s) and UDM(s) (to handle subscription data), and/or other NFs (such as those discussed infra with respect to FIG. 15). In 5G embodiments, the UP and CP interfaces between the RAN nodes 1431 and respective MEC data planes 1439 and the CN 1442 may be Xn-AP interfaces (e.g., Xn-U and Xn-C interfaces).

In EPC embodiments, the NFs 14401-N can include an S-GW, P-GW, one or more MMES, an HSS, SGSN, PCRF, and/or other EPC NFs coupled to a V2X control function 1446. In EPC embodiments, the UP and CP interfaces may be S1 interfaces, which is split into two parts: the S1 user plane (S1-UP) interface which carries traffic data between the RAN nodes 1431 and the SGW via the MEC hosts 1436, and the S1 control plane (S1-C) interface which is a signaling interface between the RAN nodes 1431 and the MME(s).

The MME(s) may be similar in function to the control plane of legacy SGSN, and may implement MM functions to keep track of the current location of a UE 1411. The MME(s) may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1411, provide user identity confidentiality, and/or perform other like services to users/subscribers. Each UE 1411 and the MME 1421 may include an MM or EMM sublayer, and an MM context may be established in the UE 1411 and the MME 1421 when an attach procedure is successfully completed. The MM context may be a data structure or database object that stores MM-related information of the UE 1411. The MME(s) may be coupled with the HSS via an S6a reference point, coupled with the SGSN via an S3 reference point, and coupled with the S-GW via an S11 reference point. The SGSN may be a node that serves the UE 1411 by tracking the location of an individual UE 1411 and performing security functions. In addition, the SGSN may perform Inter-EPC node signaling for mobility between 2G/3G and E-UTRAN 3GPP access networks; PDN and S-GW selection as specified by the MME(s); handling of UE 1411 time zone functions as specified by the MME(s); and MME selection for handovers to E-UTRAN 3GPP access network. The S3 reference point between the MME(s) and the SGSN may enable user and bearer information exchange for inter-3GPP access network mobility in idle and/or active states.

The HSS may comprise a database for network users, including subscription-related information to support the network entities' handling of communication sessions. The EPC 1420 may comprise one or several HSSs 1424, depending on the number of mobile subscribers, on the capacity of the equipment, on the organization of the network, etc. For example, the HSS can provide support for routing/roaming, authentication, authorization, naming/addressing resolution, location dependencies, etc. An S6a reference point between the HSS and the MME(s) may enable transfer of subscription and authentication data for authenticating/authorizing user access to the EPC 1420 between HSS and the MME(s).

The S-GW may terminate the S1-U interface toward the RAN 1430, and routes data packets between the RAN 1430 and the EPC 1420. In addition, the S-GW may be a local mobility anchor point for inter-RAN node handovers and also may provide an anchor for inter-3GPP mobility. Other responsibilities may include lawful intercept, charging, and some policy enforcement. The S11 reference point between the S-GW and the MME(s) may provide a control plane between the MME(s) and the S-GW. The S-GW may be coupled with the P-GW via an S5 reference point.

The P-GW may terminate an SGi interface toward a packet data network (PDN) 1430. The P-GW may route data packets between the EPC 1420 and external networks such as a network including the PDN via an IP interface 1055 (see e.g., FIG. 10). The PDN may correspond to the server(s) 1050 of FIG. 10, the cloud 1044 of FIG. 10, or some other network such as the Internet. In embodiments, the P-GW may be communicatively coupled to the PDN via an IP communications interface 1055 (see e.g., FIG. 10). The S5 reference point between the P-GW and the S-GW may provide user plane tunneling and tunnel management between the P-GW and the S-GW. The S5 reference point may also be used for S-GW relocation due to UE 1411 mobility and if the S-GW needs to connect to a non-collocated P-GW for the required PDN connectivity. The P-GW may further include a node for policy enforcement and charging data collection (e.g., PCEF). Additionally, the SGi reference point between the P-GW and the PDN may be an operator external public, a private PDN, or an intra operator packet data network, for example, for provision of IMS services. The P-GW may be coupled with a PCRF via a Gx reference point.

PCRF is the policy and charging control element of the EPC 1420. In a non-roaming scenario, there may be a single PCRF in the Home Public Land Mobile Network (HPLMN) associated with a UE's 1411 Internet Protocol Connectivity Access Network (IP-CAN) session. In a roaming scenario with local breakout of traffic, there may be two PCRFs associated with a UE 1411's IP-CAN session, a Home PCRF (H-PCRF) within an HPLMN and a Visited PCRF (V-PCRF) within a Visited Public Land Mobile Network (VPLMN). The PCRF may be communicatively coupled to the application server 1430 via the P-GW. The application server 1430 may signal the PCRF to indicate a new service flow and select the appropriate QoS and charging parameters. The PCRF may provision this rule into a PCEF (not shown) with the appropriate TFT and QCI, which commences the QoS and charging as specified by the application server 1430. The Gx reference point between the PCRF and the P-GW may allow for the transfer of QoS policy and charging rules from the PCRF to PCEF in the P-GW. An Rx reference point may reside between the PDN (or an Application Function (AF)) and the PCRF.

The V2X control function 1446 is used in connection with authorizing UEs to use V2X services based on HSS information (e.g., subscription information managed by the HSS), assist one or more UEs in obtaining the network address of an application server 1450 or a V2X application server, as well as providing V2X configuration parameters for direct D2D communication via PC5 interface 1405. The interface for direct D2D communication is referred to as PC5. The PC5 parameters may be provided by the V2X control function 1446 to one or more UEs for purposes of configuring V2X communication between the UEs.

The slice management function 1464 can be used for configuring one or more network slices (e.g., 5G slices) for use by UEs or other devices within the communication architecture 1400, where the slice configuration may be with the assistance of the MEC NFV-SF (e.g., 1421 and 1431) as discussed herein.

The MEC hosts 1436-1 and 1436-2 (collectively referred to as "MEC hosts 1436" or the like) can be configured in accordance with the ETSI specfications/standards. The MEC host 1436-2 can include a MEC platform 1437-1, which can be coupled to one or more MEC applications (apps) 14161-N (collectively, MEC app 1416) and to MEC data plane 1439-1. The MEC host 1436-2 can include a MEC platform 1437-2, which can be coupled to a MEC app 1416 and MEC data plane 1439-2. The MEC platform manager 1406 can include a MEC platform element management module 1432, MEC application rules and requirements management module 1434, and MEC application lifecycle management module 1436. The MEC host 1436-2 also includes MEC hardware 1438-1, such as network interfaces (e.g. network interface cards or NICs) 1425A, . . . , 1425N, one or more CPUs 1427, and memory 1429. Additional description of the MEC related entities 1402, 1404, 1406, and 1408 are provided hereinbelow in connection with FIG. 4A.

In some aspects, the MEC apps 1416 can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably. The MEC platform 1437-1 can further include one or more schedulers 1420-11-N (collectively, a scheduler 1420-1). Each of the schedulers 1420-11-N may comprise suitable circuitry, logic, interfaces, and/or code and is configured to manage instantiation of NFVs 14161-N (collectively, NFV 1416). More specifically, a scheduler 1420-1 can select a CPU (e.g., one of the CPUs 1427) and/or other network resources for executing/instantiating the NFV 1416. Additionally, since each of the NFVs 14161-N is associated with processing a different network traffic type, the scheduler 1420-1 can further select a NIC (e.g., from the available NICs 14251-N) for use by the NFV 1416. Each of the schedulers 1420-11-N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host 1436, defining CloS-specific resource requirements (e.g., I/O, memory, processing power, etc.) for different loads of that particular traffic type.

FIG. 14 further illustrates MEC host 1436-2 including MEC hardware 1438-2, MEC QoS manager 1422-2, and schedulers 1420-21-N, which can have the same or similar functionality as MEC hardware 1438-1 (or as shown and described with respect to FIGS. 16-17), MEC NFV-SF module 1422-2, and schedulers 1420-21-N described in connection with MEC host 1436-2. Even though MEC NFV-SF 1422-2 is illustrated as being implemented within the MEC platform 1437-1, the present disclosure is not limited in this regard and one or more components of the MEC NFV-SF 1422-2 can be implemented within other modules of the MEC host 1436-2 (e.g., MEC data plane 1439-1), a NFV infrastructure (e.g., NFVI 1238 and 1304 of FIGS. 12-13), a NFVO, the MEC orchestrator 1421, the MEC platform manager 1437-2, or another entity within the architecture 1400.

In some aspects, the MEC architecture 1400 (or any of the MEC architectures discussed herein) can be configured to provide functionalities in accordance with the ETSI GS MEC-003 specification and/or the ETSI GR MEC-017 specification.

Figures 1, 15:
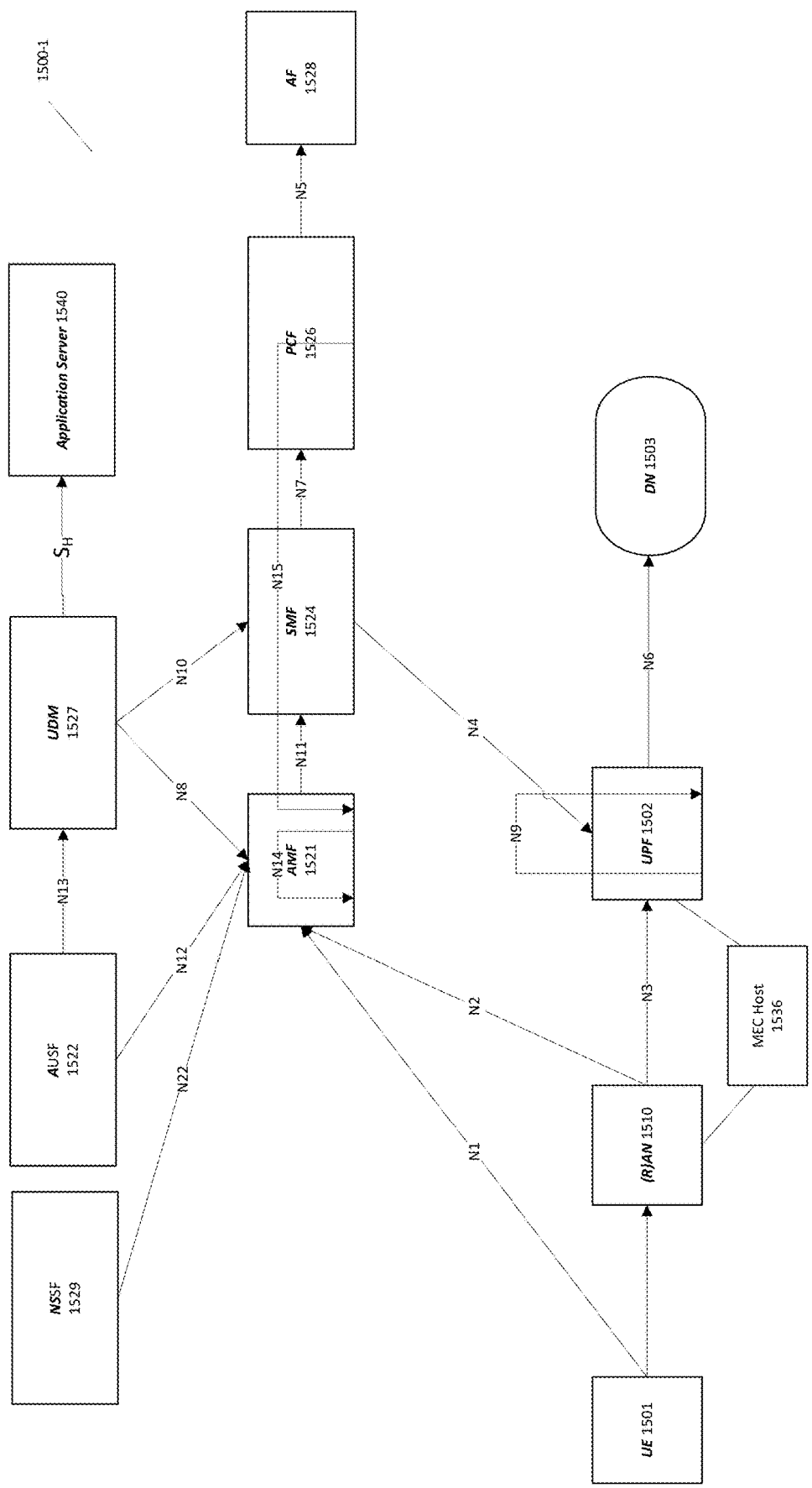
Figures 2, 15:
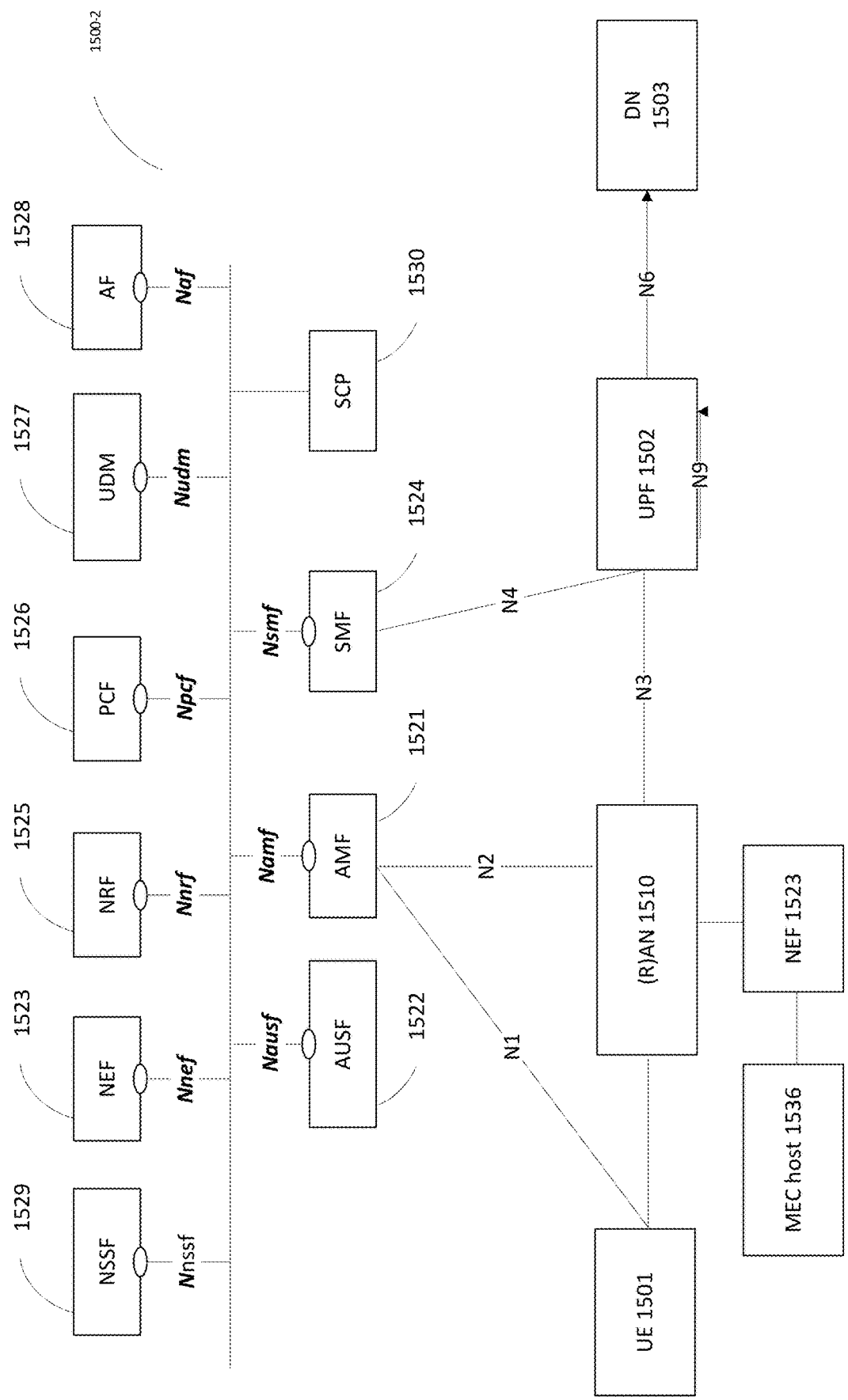

FIGS. 15-1 and 15-2 illustrate example system architectures 1500-1 and 1500-2 (collectively, system 1500) of a 5GC such as CN 1042 of FIG. 10 and/or CN 1442 FIG. 14, in accordance with various embodiments. In particular, FIG. 15-1 shows an exemplary 5G system architecture 1500-1 in a reference point representation where interactions between NFs are represented by corresponding point-to-point reference points Ni, and FIG. 15-2 illustrates an exemplary 5G system architecture 300D in a service-based representation where interactions between NFs are represented by corresponding service-based interfaces. The system 1500 is shown to include a UE 1501, which may be the same or similar to the UEs 1011, 1021 and UE 1411 discussed previously; a (R)AN 1510, which may be the same or similar to the RAN 1430 discussed previously, and which may include RAN nodes 1031-1032 discussed previously; and a DN 1503, which may be, for example, operator services, Internet access or 3rd party services, and may correspond with the PDN of FIG. 14; and a 5GC 1520. The 5GC 1520 may include an AUSF 1522; an AMF 1521; a SMF 1524; a NEF 1523; a PCF 1526; a NRF 1525; a UDM 1527; an AF 1528; a UPF 1502; a NSSF 1529; and SCP 1530.

The reference point representation of FIG. 15-1 shows various interactions between corresponding NFs. For example, FIG. 15-1 illustrates the following reference points: N1 (between the UE 1501 and the AMF 1521), N2 (between the RAN 1510 and the AMF 1521), N3 (between the RAN 1510 and the UPF 1502), N4 (between the SMF 1524 and the UPF 1502), N5 (between the PCF 1526 and the AF 1528), N6 (between the UPF 1502 and the DN 1503), N7 (between the SMF 1524 and the PCF 1526), N8 (between the UDM 1527 and the AMF 1521), N9 (between two UPFs 1502), N10 (between the UDM 1527 and the SMF 1524), N11 (between the AMF 1521 and the SMF 1524), N12 (between the AUSF 1522 and the AMF 1521), N13 (between the AUSF 1522 and the UDM 1527), N14 (between two AMFs 1521), N15 (between the PCF 1526 and the AMF 1521 in case of a non-roaming scenario, or between the PCF 1526 and a visited network and AMF 1521 in case of a roaming scenario), N16 (between two SMFs; not shown), and N22 (between AMF 1521 and NSSF 1525). Other reference point representations not shown in FIG. 15-1 can also be used.

The service-based representation of FIG. 15-2 represents NFs within the control plane that enable other authorized NFs to access their services. In this regard, 5G system architecture 1500-2 can include the following service-based interfaces: Namf (a service-based interface exhibited by the AMF 1521), Nsmf (a service-based interface exhibited by the SMF 1524), Nnef 364C (a service-based interface exhibited by the NEF 1523), Npcf (a service-based interface exhibited by the PCF 1526), Nudm (a service-based interface exhibited by the UDM 1527), Naf (a service-based interface exhibited by the AF 1528), Nnrf (a service-based interface exhibited by the NRF 1525), Nnssf (a service-based interface exhibited by the NSSF 1529), Nausf (a service-based interface exhibited by the AUSF 1522). Other service-based interfaces (e.g., Nudr, N5g-eir, and Nudsf) not shown in FIG. 15-2 can also be used. In embodiments, the NEF 1523 can provide an interface to MEC host 1536, which can be used to process wireless connections with the RAN 1510.

The UPF 1502 acts as an anchor point for intra-RAT and inter-RAT mobility, an external PDU session point of interconnect to DN 1503, which can include, for example, operator services, Internet access, or third-party services; and a branching point to support multi-homed PDU session. The UPF 1502 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1502 may include an uplink classifier to support routing traffic flows to a data network. The DN 1503 may represent various network operator services, Internet access, or third party services. DN 1503 may include, or be similar to, application server(s) 1050 discussed previously. The UPF 1502 may interact with the SMF 1524 via an N4 reference point between the SMF 1524 and the UPF 1502.

The AUSF 1522 stores data for authentication of UE 1501 and handle authentication-related functionality. The AUSF 1522 may facilitate a common authentication framework for various access types. The AUSF 1522 may communicate with the AMF 1521 via an N12 reference point between the AMF 1521 and the AUSF 1522; and may communicate with the UDM 1527 via an N13 reference point between the UDM 1527 and the AUSF 1522. Additionally, the AUSF 1522 may exhibit an Nausf service-based interface.

The UDM 1527 may handle subscription-related information to support the network entities' handling of communication sessions, and may store subscription data of UE 1501. For example, subscription data may be communicated between the UDM 1527 and the AMF 1521 via an N8 reference point between the UDM 1527 and the AMF. The UDM 1527 may include two parts, an application FE and a UDR (the FE and UDR are not shown by FIG. 15). The UDR may store subscription data and policy data for the UDM 1527 and the PCF 1526, and/or structured data for exposure and application data (including PFDs for application detection, application request information for multiple UEs 1501) for the NEF 1523. The Nudr service-based interface may be exhibited by the UDR 221 to allow the UDM 1527, PCF 1526, and NEF 1523 to access a particular set of the stored data, as well as to read, update (e.g., add, modify) delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1524 via an N10 reference point between the UDM 1527 and the SMF 1524. UDM 1527 may also support SMS management, wherein an SMS-FE implements the similar application logic as discussed previously. Additionally, the UDM 1527 may exhibit the Nudm service-based interface.

In some aspects, the UDM 1527 can be coupled to an application server 1540, which can include a telephony application server (TAS) or another application server (AS) including a MEC host (e.g., MEC host 1436 of FIG. 14 and/or MEC server 1036 of FIG. 10). The AS 1540 can be coupled to an IMS via an S-CSCF or the I-CSCF. The 5G system architecture 1500-1 can use one or more MEC hosts 1536 to provide an interface and offload processing of wireless communication traffic. For example and as illustrated in FIG. 15-1, the MEC host 1536 can provide a connection between the RAN 1510 and UPF 1503 in the CN. The MEC host 1536 can use one or more NFV instances instantiated on virtualization infrastructure within the MEC host 1536 to process wireless connections to and from the RAN 1510 and the UPF 1503. Additionally, the MEC host MEC host 1536 can use the MEC NFV-SF module 1422, which is configured according to techniques disclosed herein to provide computational/workload offloading support for MEC-enabled deployments.

The AMF 1521 may be responsible for registration management (e.g., for registering UE 1501, etc.), connection management, reachability management, mobility management, and lawful interception of AMF-related events, and access authentication and authorization. The AMF 1521 may be a termination point for the an N11 reference point between the AMF 1521 and the SMF 1524. The AMF 1521 may provide transport for SM messages between the UE 1501 and the SMF 1524, and act as a transparent proxy for routing SM messages. AMF 1521 may also provide transport for SMS messages between UE 1501 and an SMSF (not shown by FIG. 15). AMF 1521 may act as SEAF, which may include interaction with the AUSF 1522 and the UE 1501, receipt of an intermediate key that was established as a result of the UE 1501 authentication process. Where USIM based authentication is used, the AMF 1521 may retrieve the security material from the AUSF 1522. AMF 1521 may also include a SCM function, which receives a key from the SEA that it uses to derive access-network specific keys. Furthermore, AMF 1521 may be a termination point of a RAN CP interface, which may include or be an N2 reference point between the (R)AN 1510 and the AMF 1521; and the AMF 1521 may be a termination point of NAS (N1) signalling, and perform NAS ciphering and integrity protection.

AMF 1521 may also support NAS signalling with a UE 1501 over an N3 IWF interface. The N3IWF may be used to provide access to untrusted entities. N3IWF may be a termination point for the N2 interface between the (R)AN 1510 and the AMF 1521 for the control plane, and may be a termination point for the N3 reference point between the (R)AN 1510 and the UPF 1502 for the user plane. As such, the AMF 1521 may handle N2 signalling from the SMF 1524 and the AMF 1521 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 1501 and AMF 1521 via an N1 reference point between the UE 1501 and the AMF 1521, and relay uplink and downlink user-plane packets between the UE 1501 and UPF 1502. The N3IWF also provides mechanisms for IPsec tunnel establishment with the UE 1501. The AMF 1521 may exhibit an Namf service-based interface, and may be a termination point for an N14 reference point between two AMFs 1521 and an N17 reference point between the AMF 1521 and a 5G-EIR (not shown by FIG. 15).

The UE 1501 may need to register with the AMF 1521 in order to receive network services. RM is used to register or deregister the UE 1501 with the network (e.g., AMF 1521), and establish a UE context in the network (e.g., AMF 1521). The UE 1501 may operate in an RM-REGISTERED state or an RM-DEREGISTERED state. In the RM-DEREGISTERED state, the UE 1501 is not registered with the network, and the UE context in AMF 1521 holds no valid location or routing information for the UE 1501 so the UE 1501 is not reachable by the AMF 1521. In the RM-REGISTERED state, the UE 1501 is registered with the network, and the UE context in AMF 1521 may hold a valid location or routing information for the UE 1501 so the UE 1501 is reachable by the AMF 1521. In the RM-REGISTERED state, the UE 1501 may perform mobility Registration Update procedures, perform periodic Registration Update procedures triggered by expiration of the periodic update timer (e.g., to notify the network that the UE 1501 is still active), and perform a Registration Update procedure to update UE capability information or to re-negotiate protocol parameters with the network, among others.

The AMF 1521 may store one or more RM contexts for the UE 1501, where each RM context is associated with a specific access to the network. The RM context may be a data structure, database object, etc. that indicates or stores, inter alia, a registration state per access type and the periodic update timer. The AMF 1521 may also store a 5GC MM context that may be the same or similar to the (E)MM context discussed previously. In various embodiments, the AMF 1521 may store a CE mode B Restriction parameter of the UE 1501 in an associated MM context or RM context. The AMF 1521 may also derive the value, when needed, from the UE's usage setting parameter already stored in the UE context (and/or MM/RM context).

CM may be used to establish and release a signaling connection between the UE 1501 and the AMF 1521 over the N1 interface. The signaling connection is used to enable NAS signaling exchange between the UE 1501 and the CN 1520, and comprises both the signaling connection between the UE and the AN (e.g., RRC connection or UE-N3IWF connection for non-3GPP access) and the N2 connection for the UE 1501 between the AN (e.g., RAN 1510) and the AMF 1521. The UE 1501 may operate in one of two CM states, CM-IDLE mode or CM-CONNECTED mode. When the UE 1501 is operating in the CM-IDLE state/mode, the UE 1501 may have no NAS signaling connection established with the AMF 1521 over the N1 interface, and there may be (R)AN 1510 signaling connection (e.g., N2 and/or N3 connections) for the UE 1501. When the UE 1501 is operating in the CM-CONNECTED state/mode, the UE 1501 may have an established NAS signaling connection with the AMF 1521 over the N1 interface, and there may be a (R)AN 1510 signaling connection (e.g., N2 and/or N3 connections) for the UE 1501. Establishment of an N2 connection between the (R)AN 1510 and the AMF 1521 may cause the UE 1501 to transition from CM-IDLE mode to CM-CONNECTED mode, and the UE 1501 may transition from the CM-CONNECTED mode to the CM-IDLE mode when N2 signaling between the (R)AN 1510 and the AMF 1521 is released.

The SMF 1524 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1501 and a data network (DN) 1503 identified by a Data Network Name (DNN). PDU sessions may be established upon UE 1501 request, modified upon UE 1501 and 5GC 1520 request, and released upon UE 1501 and 5GC 1520 request using NAS SM signaling exchanged over the N1 reference point between the UE 1501 and the SMF 1524. Upon request from an application server, the 5GC 1520 may trigger a specific application in the UE 1501. In response to receipt of the trigger message, the UE 1501 may pass the trigger message (or relevant parts/information of the trigger message) to one or more identified applications in the UE 1501. The identified application(s) in the UE 1501 may establish a PDU session to a specific DNN. The SMF 1524 may check whether the UE 1501 requests are compliant with user subscription information associated with the UE 1501. In this regard, the SMF 1524 may retrieve and/or request to receive update notifications on SMF 1524 level subscription data from the UDM 1527.

The SMF 1524 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 1524 may be included in the system 1500, which may be between another SMF 1524 in a visited network and the SMF 1524 in the home network in roaming scenarios. Additionally, the SMF 1524 may exhibit the Nsmf service-based interface.

The NEF 1523 may provide means for securely exposing the services and capabilities provided by 3GPP network functions for third party, internal exposure/re-exposure, Application Functions (e.g., AF 1528), edge computing or fog computing systems, etc. In such embodiments, the NEF 1523 may authenticate, authorize, and/or throttle the AFs. NEF 1523 may also translate information exchanged with the AF 1528 and information exchanged with internal network functions. For example, the NEF 1523 may translate between an AF-Service-Identifier and an internal 5GC information. NEF 1523 may also receive information from other network functions (NFs) based on exposed capabilities of other network functions. This information may be stored at the NEF 1523 as structured data, or at a data storage NF using standardized interfaces. The stored information can then be re-exposed by the NEF 1523 to other NFs and AFs, and/or used for other purposes such as analytics. Additionally, the NEF 1523 may exhibit an Nnef service-based interface.

The NRF 1525 may support service discovery functions, receive NF discovery requests from NF instances, and provide the information of the discovered NF instances to the NF instances. NRF 1525 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1525 may exhibit the Nnrf service-based interface. The NRF 1525 also supports service discovery functions, wherein the NRF 1525 receives NF Discovery Request from NF instance or the SCP 1530, and provides the information of the discovered NF instances (be discovered) to the NF instance or SCP 1530.

The PCF 1526 may provide policy rules to control plane function(s) to enforce them, and may also support unified policy framework to govern network behaviour. The PCF 1526 may also implement an FE to access subscription information relevant for policy decisions in a UDR of the UDM 1527. The PCF 1526 may communicate with the AMF 1521 via an N15 reference point between the PCF 1526 and the AMF 1521, which may include a PCF 1526 in a visited network and the AMF 1521 in case of roaming scenarios. The PCF 1526 may communicate with the AF 1528 via an N5 reference point between the PCF 1526 and the AF 1528; and with the SMF 1524 via an N7 reference point between the PCF 1526 and the SMF 1524. The system 1500 and/or CN 1520 may also include an N24 reference point between the PCF 1526 (in the home network) and a PCF 1526 in a visited network. Additionally, the PCF 1526 may exhibit an Npcf service-based interface.

The AF 1528 may provide application influence on traffic routing, provide access to the NCE, and interact with the policy framework for policy control. The NCE may be a mechanism that allows the 5GC 1520 and AF 1528 to provide information to each other via NEF 1523, which may be used for edge computing implementations. In such implementations, the network operator and third party services may be hosted close to the UE 1501 access point of attachment to achieve an efficient service delivery through the reduced end-to-end latency and load on the transport network. For edge computing implementations, the 5GC may select a UPF 1502 close to the UE 1501 and execute traffic steering from the UPF 1502 to DN 1503 via the N6 interface. This may be based on the UE subscription data, UE location, and information provided by the AF 1528. In this way, the AF 1528 may influence UPF (re)selection and traffic routing. Based on operator deployment, when AF 1528 is considered to be a trusted entity, the network operator may permit AF 1528 to interact directly with relevant NFs. Additionally, the AF 1528 may exhibit an Naf service-based interface.

The NSSF 1529 may select a set of network slice instances serving the UE 1501. The NSSF 1529 may also determine allowed NSSAI and the mapping to the subscribed S-NSSAIs, if needed. The NSSF 1529 may also determine the AMF set to be used to serve the UE 1501, or a list of candidate AMF(s) 1521 based on a suitable configuration and possibly by querying the NRF 1525. The selection of a set of network slice instances for the UE 1501 may be triggered by the AMF 1521 with which the UE 1501 is registered by interacting with the NSSF 1529, which may lead to a change of AMF 1521. The NSSF 1529 may interact with the AMF 1521 via an N22 reference point between AMF 1521 and NSSF 1529; and may communicate with another NSSF 1529 in a visited network via an N31 reference point (not shown by FIG. 15). Additionally, the NSSF 1529 may exhibit an Nnssf service-based interface.

As discussed previously, the system 1500 may include an SMSF, which may be responsible for SMS subscription checking and verification, and relaying SM messages to/from the UE 1501 to/from other entities, such as an SMS-GMSC/IWMSC/SMS-router. The SMS may also interact with AMF 1521 and UDM 1527 for a notification procedure that the UE 1501 is available for SMS transfer (e.g., set a UE not reachable flag, and notifying UDM 1527 when UE 1501 is available for SMS).

The SCP 1530 (or individual instances of the SCP 1530) supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP 1530 may be deployed in a distributed manner. More than one SCP 1530 can be present in the communication path between various NF Services. The SCP 1530, although not an NF instance, can also be deployed distributed, redundant, and scalable.

The system architecture 1500 may also include other elements that are not shown by FIG. 15-1 or 15-2, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 15). Individual NFs may share a UDSF for storing their respective unstructured data or individual NFs may each have their own UDSF located at or near the individual NFs. Additionally, the UDSF may exhibit an Nudsf service-based interface (not shown by FIG. 15). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

In another example, the 5G system architecture 1500 includes an IP multimedia subsystem (IMS) as well as a plurality of IP multimedia core network subsystem entities, such as call session control functions (CSCFs) (not shown by FIG. 15-1 or 15-2). More specifically, the IMS includes a CSCF, which can act as a proxy CSCF (P-CSCF), a serving CSCF (S-CSCF), an emergency CSCF (E-CSCF), or interrogating CSCF (I-CSCF). The P-CSCF can be configured to be the first contact point for the UE 1501 within the IMS. The S-CSCF can be configured to handle the session states in the network, and the E-CSCF can be configured to handle certain aspects of emergency sessions such as routing an emergency request to the correct emergency center or public safety answering point (PSAP). The I-CSCF can be configured to function as the contact point within an operator's network for all IMS connections destined to a subscriber of that network operator, or a roaming subscriber currently located within that network operator's service area. In some aspects, the I-CSCF can be connected to another IP multimedia network, for example, an IMS operated by a different network operator.

Additionally, there may be many more reference points and/or service-based interfaces between the NF services in the NFs; however, these interfaces and reference points have been omitted from FIGS. 15-1 and 15-2 for clarity. In one example, the CN 1520 may include an Nx interface, which is an inter-CN interface between an MME and the AMF 1521 in order to enable interworking between system 1500 and an EPC. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Example Systems and Implementations

Figure 16:
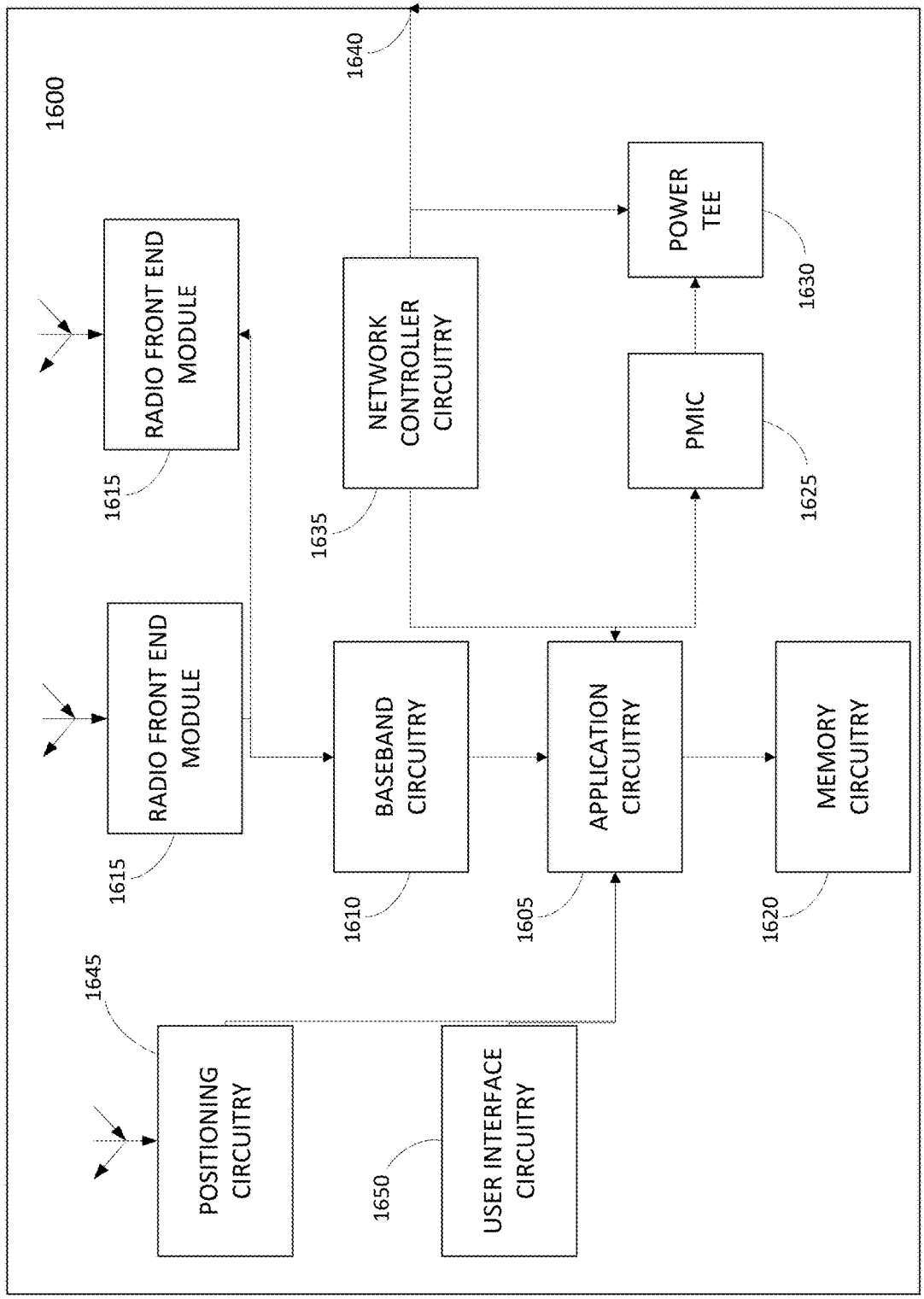
FIG. 16 illustrates an example of infrastructure equipment in accordance with various embodiments.

FIG. 16 illustrates an example of infrastructure equipment 1600 in accordance with various embodiments. The infrastructure equipment 1600 (or "system 1600") may be implemented as a base station, radio head, access network node (e.g., the edge nodes 1030 shown and described previously), MEC servers 1036, server(s) 1050, and/or any other element/device discussed herein. In other examples, the system 1600 could be implemented in or by an intermediate node 1020 or endpoint 1010.

The system 1600 includes application circuitry 1605, baseband circuitry 1610, one or more RFEMs 1615, memory circuitry 1620, PMIC 1625, power tee circuitry 1630, network controller circuitry 1635, network interface connector 1640, positioning circuitry 1645, and user interface 1650. In some embodiments, the device 1600 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 1605 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 1605 may be coupled with or may include memory/storage elements and may be configured to execute instructions stored in the memory/storage to enable various applications or operating systems to run on the system 1600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1605 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 1605 may comprise, or may be, a special-purpose processor/controller to operate according to the various embodiments herein. As examples, the processor(s) of application circuitry 1605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1600 may not utilize application circuitry 1605, and instead may include a special-purpose processor/controller to process IP data received from an EPC or 5GC, for example.

In some implementations, the application circuitry 1605 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices PLDs such as CPLDs, HCPLDs, and the like; ASICs such as structured ASICs and the like; programmable SoCs; and/or the like. In such implementations, the circuitry of application circuitry 1605 may comprise logic blocks or logic fabric, and other interconnected resources that may be programmed to perform various functions, such as the procedures, methods, functions, etc. of the various embodiments discussed herein. In such embodiments, the circuitry of application circuitry 1605 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 1030, intermediate nodes 1020, and/or endpoints 1010 of FIG. 10 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1605 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating coprocessor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the Hi Silicon Kirin 970 provided by Huawei®, and/or the like.

The baseband circuitry 1610 may be implemented, for example, as a solder-down substrate including one or more integrated circuits, a single packaged integrated circuit soldered to a main circuit board or a multi-chip module containing two or more integrated circuits. The baseband circuitry 1610 includes one or more processing devices (e.g., baseband processors) to carry out various protocol and radio control functions. Baseband circuitry 1610 may interface with application circuitry of system 1600 for generation and processing of baseband signals and for controlling operations of the RFEMs 1615. The baseband circuitry 1610 may handle various radio control functions that enable communication with one or more radio networks via the RFEMs 1615. The baseband circuitry 1610 may include circuitry such as, but not limited to, one or more single-core or multi-core processors (e.g., one or more baseband processors) or control logic to process baseband signals received from a receive signal path of the RFEMs 1615, and to generate baseband signals to be provided to the RFEMs 1615 via a transmit signal path. In various embodiments, the baseband circuitry 1610 may implement a RTOS to manage resources of the baseband circuitry 1610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 16, in one embodiment, the baseband circuitry 1610 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1615 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1615 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1610 and/or RFEMs 1615. The baseband circuitry 1610 may also support radio communications for more than one wireless protocol.

Continuing with the aforementioned embodiment, the baseband circuitry 1610 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1650 may include one or more user interfaces designed to enable user interaction with the system 1600 or peripheral component interfaces designed to enable peripheral component interaction with the system 1600. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 1615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1615, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1610 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1620 may include one or more of volatile memory including DRAM and/or SDRAM, and nonvolatile memory including high-speed electrically erasable memory (commonly referred to as Flash memory), PRAM, MRAM, etc., and may incorporate the 3D crosspoint (XPOINT) memories from Intel® and Micron®. Memory circuitry 1620 may be implemented as one or more of solder down packaged integrated circuits, socketed memory modules and plug-in memory cards. The memory circuitry 1620 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1600, an operating system of infrastructure equipment 1600, one or more applications, and/or for carrying out the embodiments discussed herein. The computational logic may be stored or loaded into memory circuitry 1620 as instructions for execution by the processors of the application circuitry 1605 to provide or perform the functions described herein. The various elements may be implemented by assembler instructions supported by processors of the application circuitry 1605 or high-level languages that may be compiled into such instructions. The permanent copy of the programming instructions may be placed into persistent storage devices of memory circuitry 1620 in the factory during manufacture, or in the field through, for example, a distribution medium (not shown), through a communication interface (e.g., from a distribution server), and/or OTA.

The PMIC 1625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1630 may provide for electrical power drawn from a network cable to provide both power supply and data connectivity to the infrastructure equipment 1600 using a single cable.

The network controller circuitry 1635 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 1600 via network interface connector 1640 using a physical connection, which may be electrical (commonly referred to as a "copper interconnect"), optical, or wireless. The network controller circuitry 1635 may include one or more dedicated processors and/or FPGAs to communicate using one or more of the aforementioned protocols. In some implementations, the network controller circuitry 1635 may include multiple controllers to provide connectivity to other networks using the same or different protocols. In various embodiments, the network controller circuitry 1635 enables communication with associated equipment and/or with a backend system (e.g., server(s) 1030 of FIG. 10), which may take place via a suitable gateway device.

The positioning circuitry 1645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the baseband circuitry 1610 and/or RFEMs 1615 to communicate with the nodes and components of the positioning network. The positioning circuitry 1645 may also provide position data and/or time data to the application circuitry 1605, which may use the data to synchronize operations with various other infrastructure equipment, or the like.

The components shown by FIG. 16 may communicate with one another using interface circuitry 1606 or IX 1606, which may include any number of bus and/or IX technologies such as ISA, extended ISA, I2C, SPI, point-to-point interfaces, power management bus (PMBus), PCI, PCIe, PCIx, Intel® UPI, Intel® Accelerator Link (IAL), CAPI, OpenCAPI, Intel® QPI, UPI, Intel® OPA IX, RapidIO™ system IXs, CCIA, Gen-Z Consortium IXs, a HyperTransport interconnect, and/or any number of other IX technologies. The IX technology may be a proprietary bus, for example, used in an SoC based system.

Figure 17:
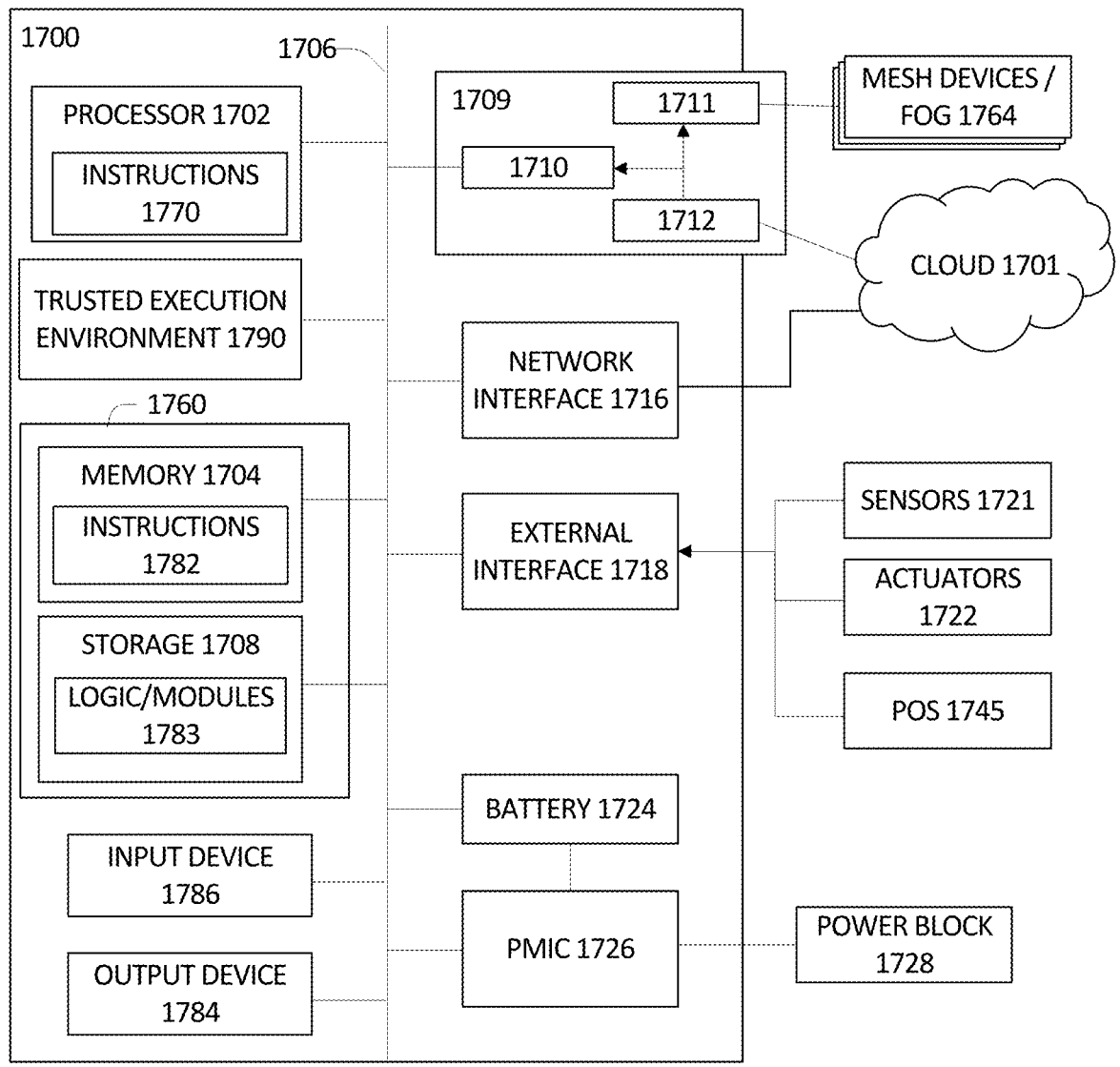
FIG. 17 depicts example components of a computer platform or device in accordance with various embodiments.

FIG. 17 illustrates an example of an platform 1700 (also referred to as "system 1700," "device 1700," "appliance 1700," or the like) in accordance with various embodiments. In embodiments, the platform 1700 may be suitable for use as intermediate nodes 1020 and/or endpoints 1010 of FIG. 10, and/or any other element/device discussed herein with regard any other figure shown and described herein. Platform 1700 may also be implemented in or as a server computer system or some other element, device, or system discussed herein. The platform 1700 may include any combinations of the components shown in the example. The components of platform 1700 may be implemented as integrated circuits (ICs), portions thereof, discrete electronic devices, or other modules, logic, hardware, software, firmware, or a combination thereof adapted in the computer platform 1700, or as components otherwise incorporated within a chassis of a larger system. The example of FIG. 17 is intended to show a high level view of components of the computer platform 1700. However, some of the components shown may be omitted, additional components may be present, and different arrangement of the components shown may occur in other implementations.

The platform 1700 includes processor circuitry 1702. The processor circuitry 1702 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1702 may include one or more hardware accelerators, which may be microprocessors, programmable processing devices (e.g., FPGA, ASIC, etc.), or the like. The one or more hardware accelerators may include, for example, computer vision and/or deep learning accelerators. In some implementations, the processor circuitry 1702 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1702 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1702 may be coupled with or may include memory/storage and may be configured to execute instructions stored in the memory/storage to enable various applications or operating systems to run on the platform 1700. In these embodiments, the processors (or cores) of the processor circuitry 1702 is configured to operate application software to provide a specific service to a user of the platform 1700. In some embodiments, the processor circuitry 1702 may be a special-purpose processor/controller to operate according to the various embodiments herein.

As examples, the processor circuitry 1702 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, Calif. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1702 may be a part of a system on a chip (SoC), System-in-Package (SiP), a multi-chip package (MCP), and/or the like, in which the processor circuitry 1702 and other components are formed into a single integrated circuit, or a single package, such as the Edison™ or Galileo™ SoC boards from Intel® Corporation. Other examples of the processor circuitry 1702 are mentioned elsewhere in the present disclosure.

Additionally or alternatively, processor circuitry 1702 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1702 may comprise logic blocks or logic fabric including and other interconnected resources that may be programmed to perform various functions, such as the procedures, methods, functions, etc. of the various embodiments discussed herein. In such embodiments, the circuitry of processor circuitry 1702 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1702 may communicate with system memory circuitry 1704 over an interconnect 1706 (e.g., a bus). Any number of memory devices may be used to provide for a given amount of system memory. As examples, the memory circuitry 1704 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1704 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1704 may also comprise persistent storage devices, which may be temporal and/or persistent storage of any type, including, but not limited to, non-volatile memory, optical, magnetic, and/or solid state mass storage, and so forth.

The individual memory devices of memory circuitry 1704 may be implemented as one or more of solder down packaged integrated circuits, socketed memory modules, and plug-in memory cards. The memory circuitry 1704 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. In embodiments, the memory circuitry 1704 may be disposed in or on a same die or package as the processor circuitry 1702 (e.g., a same SoC, a same SiP, or soldered on a same MCP as the processor circuitry 1702).

To provide for persistent storage of information such as data, applications, operating systems (OS), and so forth, a storage circuitry 1708 may also couple to the processor circuitry 1702 via the interconnect 1706. In an example, the storage circuitry 1708 may be implemented via a solid-state disk drive (SSDD). Other devices that may be used for the storage circuitry 1708 include flash memory cards, such as SD cards, microSD cards, xD picture cards, and the like, and USB flash drives. In low power implementations, the storage circuitry 1708 may be on-die memory or registers associated with the processor circuitry 1702. However, in some examples, the storage circuitry 1708 may be implemented using a micro hard disk drive (HDD). Further, any number of new technologies may be used for the storage circuitry 1708 in addition to, or instead of, the technologies described, such resistance change memories, phase change memories, holographic memories, or chemical memories, among others.

The storage circuitry 1708 store computational logic 1783 (or "modules 1783") in the form of software, firmware, or hardware commands to implement the techniques described herein. The computational logic 1783 may be employed to store working copies and/or permanent copies of computer programs, or data to create the computer programs, for the operation of various components of platform 1700 (e.g., drivers, etc.), an OS of platform 1700 and/or one or more applications for carrying out the embodiments discussed herein. The computational logic 1783 may be stored or loaded into memory circuitry 1704 as instructions 1782, or data to create the instructions 1782, for execution by the processor circuitry 1702 to provide the functions described herein. The various elements may be implemented by assembler instructions supported by processor circuitry 1702 or high-level languages that may be compiled into such instructions (e.g., instructions 1770, or data to create the instructions 1770). The permanent copy of the programming instructions may be placed into persistent storage devices of storage circuitry 1708 in the factory or in the field through, for example, a distribution medium (not shown), through a communication interface (e.g., from a distribution server (not shown)), or over-the-air (OTA).

In an example, the instructions 1782 provided via the memory circuitry 1704 and/or the storage circuitry 1708 of FIG. 17 are embodied as one or more non-transitory computer readable storage media (see e.g., NTCRSM 1760) including program code, a computer program product or data to create the computer program, with the computer program or data, to direct the processor circuitry 1702 of platform 1700 to perform electronic operations in the platform 1700, and/or to perform a specific sequence or flow of actions, for example, as described with respect to the flowchart(s) and block diagram(s) of operations and functionality depicted previously. The processor circuitry 1702 accesses the one or more non-transitory computer readable storage media over the interconnect 1706.

In alternate embodiments, programming instructions (or data to create the instructions) may be disposed on multiple NTCRSM 1760. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1760 may be embodied by devices described for the storage circuitry 1708 and/or memory circuitry 1704. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1783, instructions 1782, 1770 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1700, partly on the system 1700, as a stand-alone software package, partly on the system 1700 and partly on a remote computer or entirely on the remote computer or server. In the latter scenario, the remote computer may be connected to the system 1700 through any type of network, including a LAN or WAN, or the connection may be made to an external computer (e.g., through the Internet using an Internet Service Provider).

In an example, the instructions 1770 on the processor circuitry 1702 (separately, or in combination with the instructions 1782 and/or logic/modules 1783 stored in computer-readable storage media) may configure execution or operation of a trusted execution environment (TEE) 1790. The TEE 1790 operates as a protected area accessible to the processor circuitry 1702 to enable secure access to data and secure execution of instructions. In some embodiments, the TEE 1790 may be a physical hardware device that is separate from other components of the system 1700 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 1790 may be implemented as secure enclaves, which are isolated regions of code and/or data within the processor and/or memory/storage circuitry of the system 1700. Only code executed within a secure enclave may access data within the same secure enclave, and the secure enclave may only be accessible using the secure application (which may be implemented by an application processor or a tamper-resistant microcontroller). Various implementations of the TEE 1790, and an accompanying secure area in the processor circuitry 1702 or the memory circuitry 1704 and/or storage circuitry 1708 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1700 through the TEE 1790 and the processor circuitry 1702.

Although the instructions 1782 are shown as code blocks included in the memory circuitry 1704 and the computational logic 1783 is shown as code blocks in the storage circuitry 1708, it should be understood that any of the code blocks may be replaced with hardwired circuits, for example, built into an FPGA, ASIC, or some other suitable circuitry. For example, where processor circuitry 1702 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1704 and/or storage circuitry 1708 may store program code of an operating system (OS), which may be a general purpose OS or an OS specifically written for and tailored to the computing platform 1700. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 1700, attached to the platform 1700, or otherwise communicatively coupled with the platform 1700. The drivers may include individual drivers allowing other components of the platform 1700 to interact or control various I/O devices that may be present within, or connected to, the platform 1700. For example, the drivers may include a display driver to control and allow access to a display device, a touchscreen driver to control and allow access to a touchscreen interface of the platform 1700, sensor drivers to obtain sensor readings of sensor circuitry 1721 and control and allow access to sensor circuitry 1721, actuator drivers to obtain actuator positions of the actuators 1722 and/or control and allow access to the actuators 1722, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the platform 1700 (not shown).

The components may communicate over the IX 1706. The IX 1706 may include any number of technologies, including ISA, extended ISA, I2C, SPI, point-to-point interfaces, power management bus (PMBus), PCI, PCIx, PCIe, Intel® UPI, Intel® Accelerator Link (IAL), CAPI, OpenCAPI, Intel® QPI, UPI, Intel® OPA IX, RapidIO™ system IXs, CCIA, Gen-Z Consortium IXs, a HyperTransport interconnect, and/or any number of other IX technologies. The IX 1706 may be a proprietary bus, for example, used in a SoC based system.

The interconnect 1706 couples the processor circuitry 1702 to the communication circuitry 1709 for communications with other devices. The communication circuitry 1709 is a hardware element, or collection of hardware elements, used to communicate over one or more networks (e.g., cloud 1701) and/or with other devices (e.g., mesh devices/fog 1764). The communication circuitry 1709 includes baseband circuitry 1710 (or "modem 1710") and RF circuitry 1711 and 1712.

The baseband circuitry 1710 includes one or more processing devices (e.g., baseband processors) to carry out various protocol and radio control functions. Baseband circuitry 1710 may interface with application circuitry of platform 1700 (e.g., a combination of processor circuitry 1702, memory circuitry 1704, and/or storage circuitry 1708) for generation and processing of baseband signals and for controlling operations of the RF circuitry 1711 or 1712. The baseband circuitry 1710 may handle various radio control functions that enable communication with one or more radio networks via the RF circuitry 1711 or 1712. The baseband circuitry 1710 may include circuitry such as, but not limited to, one or more single-core or multi-core processors (e.g., one or more baseband processors) or control logic to process baseband signals received from a receive signal path of the RF circuitry 1711 and/or 1712, and to generate baseband signals to be provided to the RF circuitry 1711 or 1712 via a transmit signal path. In various embodiments, the baseband circuitry 1710 may implement an RTOS to manage resources of the baseband circuitry 1710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 17, in one embodiment, the baseband circuitry 1710 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G)/NR protocol entities when the communication circuitry 1709 is a cellular radiofrequency communication system, such as millimeter wave (mmWave) communication circuitry or some other suitable cellular communication circuitry. In the first example, the protocol processing circuitry 1702 would operate MAC, RLC, PDCP, SDAP, RRC, and NAS functions. In a second example, the protocol processing circuitry may operate one or more IEEE-based protocols when the communication circuitry 1709 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1710 and/or RF circuitry 1711 and 1712. The baseband circuitry 1710 may also support radio communications for more than one wireless protocol.

Continuing with the aforementioned embodiment, the baseband circuitry 1710 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1709 also includes RF circuitry 1711 and 1712 to enable communication with wireless networks using modulated electromagnetic radiation through a non-solid medium. Each of the RF circuitry 1711 and 1712 include a receive signal path, which may include circuitry to convert analog RF signals (e.g., an existing or received modulated waveform) into digital baseband signals to be provided to the baseband circuitry 1710. Each of the RF circuitry 1711 and 1712 also include a transmit signal path, which may include circuitry configured to convert digital baseband signals provided by the baseband circuitry 1710 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1711 or 1712 using metal transmission lines or the like.

The RF circuitry 1711 (also referred to as a "mesh transceiver") is used for communications with other mesh or fog devices 1764. The mesh transceiver 1711 may use any number of frequencies and protocols, such as 2.4 GHz transmissions under the IEEE 802.15.4 standard, using the Bluetooth® low energy (BLE) standard, as defined by the Bluetooth® Special Interest Group, or the ZigBee® standard, among others. Any number of RF circuitry 1711, configured for a particular wireless communication protocol, may be used for the connections to the mesh devices 1764. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1711 may communicate using multiple standards or radios for communications at different ranges. For example, the platform 1700 may communicate with close/proximate devices, e.g., within about 10 meters, using a local transceiver based on BLE, or another low power radio, to save power. More distant mesh devices 1764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1712 (also referred to as a "wireless network transceiver," a "cloud transceiver," or the like) may be included to communicate with devices or services in the cloud 1701 via local or wide area network protocols. The wireless network transceiver 1712 includes one or more radios to communicate with devices in the cloud 1701. The cloud 1701 may be the same or similar to cloud 144 discussed previously. The wireless network transceiver 1712 may be a LPWA transceiver that follows the IEEE 802.15.4, or IEEE 802.15.4g standards, among others, such as those discussed herein. The platform 1700 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1711 and wireless network transceiver 1712, as described herein. For example, the radio transceivers 1711 and 1712 may include an LTE or other cellular transceiver that uses spread spectrum (SPA/SAS) communications for implementing high-speed communications. Further, any number of other protocols may be used, such as WiFi® networks for medium speed communications and provision of network communications.

The transceivers 1711 and 1712 may include radios that are compatible with, and/or may operate according to any one or more of the following radio communication technologies and/or standards including but not limited to those discussed herein.

Network interface circuitry/controller (NIC) 1716 may be included to provide wired communication to the cloud 1701 or to other devices, such as the mesh devices 1764 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1700 via NIC 1716 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1716 may include one or more dedicated processors and/or FPGAs to communicate using one or more of the aforementioned network interface protocols. In some implementations, the NIC 1716 may include multiple controllers to provide connectivity to other networks using the same or different protocols. For example, the platform 1700 may include a first NIC 1716 providing communications to the cloud over Ethernet and a second NIC 1716 providing communications to other devices over another type of network.

The interconnect 1706 may couple the processor circuitry 1702 to an external interface 1718 (also referred to as "I/O interface circuitry" or the like) that is used to connect external devices or subsystems. The external devices include, inter alia, sensor circuitry 1721, actuators 1722, and positioning circuitry 1745.

The sensor circuitry 1721 may include devices, modules, or subsystems whose purpose is to detect events or changes in its environment and send the information (sensor data) about the detected events to some other a device, module, subsystem, etc. Examples of such sensors 1721 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1718 connects the platform 1700 to actuators 1722, allow platform 1700 to change its state, position, and/or orientation, or move or control a mechanism or system. The actuators 1722 comprise electrical and/or mechanical devices for moving or controlling a mechanism or system, and converts energy (e.g., electric current or moving air and/or liquid) into some kind of motion. The actuators 1722 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1722 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1700 may be configured to operate one or more actuators 1722 based on one or more captured events and/or instructions or control signals received from a service provider and/or various client systems.

The positioning circuitry 1745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1745 may include a Micro-Technology for Positioning, Navigation, and Timing (Micro-PNT) IC that uses a master timing clock to perform position tracking/estimation without GNSS assistance. The positioning circuitry 1745 may also be part of, or interact with, the communication circuitry 1709 to communicate with the nodes and components of the positioning network. The positioning circuitry 1745 may also provide position data and/or time data to the application circuitry, which may use the data to synchronize operations with various infrastructure (e.g., radio base stations), for turn-by-turn navigation, or the like.

In some examples, various I/O devices may be present within, or connected to, the platform 1700, which are referred to as input device circuitry 1786 and output device circuitry 1784 in FIG. 17. The input device circuitry 1786 and output device circuitry 1784 include one or more user interfaces designed to enable user interaction with the platform 1700 and/or peripheral component interfaces designed to enable peripheral component interaction with the platform 1700. Input device circuitry 1786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1784 may be included to show information or otherwise convey information, such as sensor readings, actuator position(s), or other like information. Data and/or graphics may be displayed on one or more user interface components of the output device circuitry 1784. Output device circuitry 1784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1700. The output device circuitry 1784 may also include speakers or other audio emitting devices, printer(s), and/or the like. In some embodiments, the sensor circuitry 1721 may be used as the input device circuitry 1786 (e.g., an image capture device, motion capture device, or the like) and one or more actuators 1722 may be used as the output device circuitry 1784 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 1724 may be coupled to the platform 1700 to power the platform 1700, which may be used in embodiments where the platform 1700 is not in a fixed location. The battery 1724 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1700 is mounted in a fixed location, the platform 1700 may have a power supply coupled to an electrical grid. In these embodiments, the platform 1700 may include power tee circuitry to provide for electrical power drawn from a network cable to provide both power supply and data connectivity to the platform 1700 using a single cable.

PMIC 1726 may be included in the platform 1700 to track the state of charge (SoCh) of the battery 1724, and to control charging of the platform 1700. The PMIC 1726 may be used to monitor other parameters of the battery 1724 to provide failure predictions, such as the state of health (SoH) and the state of function (SoF) of the battery 1724. The PMIC 1726 may include voltage regulators, surge protectors, power alarm detection circuitry. The power alarm detection circuitry may detect one or more of brown out (under-voltage) and surge (over-voltage) conditions. The PMIC 1726 may communicate the information on the battery 1724 to the processor circuitry 1702 over the interconnect 1706. The PMIC 1726 may also include an analog-to-digital (ADC) convertor that allows the processor circuitry 1702 to directly monitor the voltage of the battery 1724 or the current flow from the battery 1724. The battery parameters may be used to determine actions that the platform 1700 may perform, such as transmission frequency, mesh network operation, sensing frequency, and the like. As an example, the PMIC 1726 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 1728, or other power supply coupled to a grid, may be coupled with the PMIC 1726 to charge the battery 1724. In some examples, the power block 1728 may be replaced with a wireless power receiver to obtain the power wirelessly, for example, through a loop antenna in the platform 1700. A wireless battery charging circuit, such as an LTC4020 chip from Linear Technologies of Milpitas, Calif., among others, may be included in the PMIC 1726. The specific charging circuits chosen depend on the size of the battery 1724, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 18:
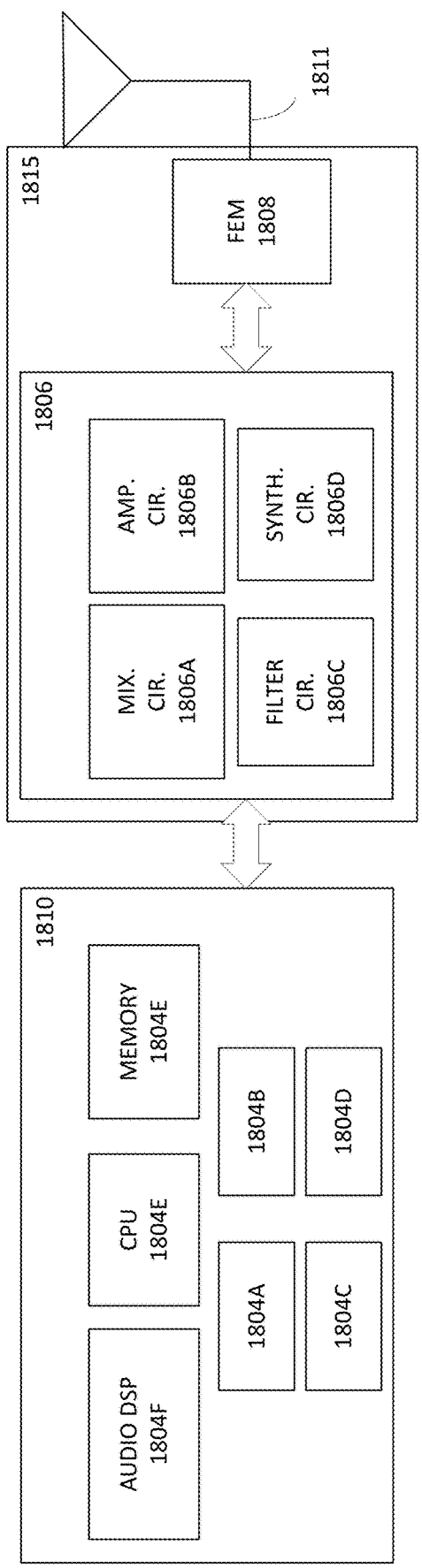
FIG. 18 depicts example components of baseband circuitry and radio frequency end modules in accordance with various embodiments.

FIG. 18 illustrates example components of baseband circuitry 1810 and radio front end modules (RFEM) 1815 in accordance with various embodiments. The baseband circuitry 1810 corresponds to the baseband circuitry 1610 and 1710 of FIGS. 16 and 17, respectively. The RFEM 1815 corresponds to the RFEM 1615 and 1715 of FIGS. 16 and 17, respectively. As shown, the RFEMs 1815 may include Radio Frequency (RF) circuitry 1806, front-end module (FEM) circuitry 1808, antenna array 1811 coupled together at least as shown.

The baseband circuitry 1810 includes circuitry and/or control logic configured to carry out various radio/network protocol and radio control functions that enable communication with one or more radio networks via the RF circuitry 1806. The radio control functions may include, but are not limited to, signal modulation/demodulation, encoding/decoding, radio frequency shifting, etc. In some embodiments, modulation/demodulation circuitry of the baseband circuitry 1810 may include Fast-Fourier Transform (FFT), precoding, or constellation mapping/demapping functionality. In some embodiments, encoding/decoding circuitry of the baseband circuitry 1810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1810 is configured to process baseband signals received from a receive signal path of the RF circuitry 1806 and to generate baseband signals for a transmit signal path of the RF circuitry 1806. The baseband circuitry 1810 is configured to interface with application circuitry 1605/1705 (see FIGS. 16 and 17) for generation and processing of the baseband signals and for controlling operations of the RF circuitry 1806. The baseband circuitry 1810 may handle various radio control functions.

The aforementioned circuitry and/or control logic of the baseband circuitry 1810 may include one or more single or multi-core processors. For example, the one or more processors may include a 3G baseband processor 1804A, a 4G/LTE baseband processor 1804B, a 5G/NR baseband processor 1804C, or some other baseband processor(s) 1804D for other existing generations, generations in development or to be developed in the future (e.g., sixth generation (6G), etc.). In other embodiments, some or all of the functionality of baseband processors 1804A-D may be included in modules stored in the memory 1804G and executed via a Central Processing Unit (CPU) 1804E. In other embodiments, some or all of the functionality of baseband processors 1804A-D may be provided as hardware accelerators (e.g., FPGAs, ASICs, etc.) loaded with the appropriate bit streams or logic blocks stored in respective memory cells. In various embodiments, the memory 1804G may store program code of a real-time OS (RTOS), which when executed by the CPU 1804E (or other baseband processor), is to cause the CPU 1804E (or other baseband processor) to manage resources of the baseband circuitry 1810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1810 includes one or more audio digital signal processor(s) (DSP) 1804F. The audio DSP(s) 1804F include elements for compression/decompression and echo cancellation and may include other suitable processing elements in other embodiments.

In some embodiments, each of the processors 1804A-1804E include respective memory interfaces to send/receive data to/from the memory 1804G. The baseband circuitry 1810 may further include one or more interfaces to communicatively couple to other circuitries/devices, such as an interface to send/receive data to/from memory external to the baseband circuitry 1810; an application circuitry interface to send/receive data to/from the application circuitry 1605/1705 of FIGS. 16-XT); an RF circuitry interface to send/receive data to/from RF circuitry 1806 of FIG. 18; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1725.

In alternate embodiments (which may be combined with the above described embodiments), baseband circuitry 1810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1810 may include protocol processing circuitry with one or more instances of control circuitry (not shown) to provide control functions for the digital baseband circuitry and/or radio frequency circuitry (e.g., the radio front end modules 1815).

Although not shown by FIG. 18, in some embodiments, the baseband circuitry 1810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1810 and/or RF circuitry 1806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1810 and/or RF circuitry 1806 are part of a Wi-Fi communication system. In the second example, the protocol processing circuitry would operate Wi-Fi MAC and logical link control (LLC) functions. The protocol processing circuitry may include one or more memory structures (e.g., 1804G) to store program code and data for operating the protocol functions, as well as one or more processing cores to execute the program code and perform various operations using the data. The baseband circuitry 1810 may also support radio communications for more than one wireless protocol.

The various hardware elements of the baseband circuitry 1810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1810 may be suitably combined in a single chip or chipset, or disposed on a same circuit board. In another example, some or all of the constituent components of the baseband circuitry 1810 and RF circuitry 1806 may be implemented together such as, for example, a system on a chip (SoC) or System-in-Package (SiP). In another example, some or all of the constituent components of the baseband circuitry 1810 may be implemented as a separate SoC that is communicatively coupled with and RF circuitry 1806 (or multiple instances of RF circuitry 1806). In yet another example, some or all of the constituent components of the baseband circuitry 1810 and the application circuitry 1605/1705 may be implemented together as individual SoCs mounted to a same circuit board (e.g., a "multi-chip package").

In some embodiments, the baseband circuitry 1810 may provide for communication compatible with one or more radio technologies. For example, in some embodiments, the baseband circuitry 1810 may support communication with an E-UTRAN or other WMAN, a WLAN, a WPAN. Embodiments in which the baseband circuitry 1810 is configured to support radio communications of more than one wireless protocol may be referred to as multi-mode baseband circuitry.

RF circuitry 1806 may enable communication with wireless networks using modulated electromagnetic radiation through a non-solid medium. In various embodiments, the RF circuitry 1806 may include switches, filters, amplifiers, etc. to facilitate the communication with the wireless network. RF circuitry 1806 may include a receive signal path, which may include circuitry to down-convert RF signals received from the FEM circuitry 1808 and provide baseband signals to the baseband circuitry 1810. RF circuitry 1806 may also include a transmit signal path, which may include circuitry to up-convert baseband signals provided by the baseband circuitry 1810 and provide RF output signals to the FEM circuitry 1808 for transmission.

In some embodiments, the receive signal path of the RF circuitry 1806 may include mixer circuitry 1806*a*, amplifier circuitry 1806*b* and filter circuitry 1806*c*. In some embodiments, the transmit signal path of the RF circuitry 1806 may include filter circuitry 1806*c* and mixer circuitry 1806*a*. RF circuitry 1806 may also include synthesizer circuitry 1806*d* for synthesizing a frequency for use by the mixer circuitry 1806*a* of the receive signal path and the transmit signal path. In some embodiments, the mixer circuitry 1806*a* of the receive signal path may be configured to down-convert RF signals received from the FEM circuitry 1808 based on the synthesized frequency provided by synthesizer circuitry 1806*d*. The amplifier circuitry 1806*b* may be configured to amplify the down-converted signals and the filter circuitry 1806*c* may be a low-pass filter (LPF) or band-pass filter (BPF) configured to remove unwanted signals from the down-converted signals to generate output baseband signals. Output baseband signals may be provided to the baseband circuitry 1810 for further processing. In some embodiments, the output baseband signals may be zero-frequency baseband signals, although this is not a requirement. In some embodiments, mixer circuitry 1806*a* of the receive signal path may comprise passive mixers, although the scope of the embodiments is not limited in this respect.

In some embodiments, the mixer circuitry 1806*a* of the transmit signal path may be configured to up-convert input baseband signals based on the synthesized frequency provided by the synthesizer circuitry 1806*d* to generate RF output signals for the FEM circuitry 1808. The baseband signals may be provided by the baseband circuitry 1810 and may be filtered by filter circuitry 1806*c*.

In some embodiments, the mixer circuitry 1806*a* of the receive signal path and the mixer circuitry 1806*a* of the transmit signal path may include two or more mixers and may be arranged for quadrature downconversion and upconversion, respectively. In some embodiments, the mixer circuitry 1806*a* of the receive signal path and the mixer circuitry 1806*a* of the transmit signal path may include two or more mixers and may be arranged for image rejection (e.g., Hartley image rejection). In some embodiments, the mixer circuitry 1806*a* of the receive signal path and the mixer circuitry 1806*a* of the transmit signal path may be arranged for direct downconversion and direct upconversion, respectively. In some embodiments, the mixer circuitry 1806*a* of the receive signal path and the mixer circuitry 1806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1806 may include analog-to-digital converter (ADC) and digital-to-analog converter (DAC) circuitry and the baseband circuitry 1810 may include a digital baseband interface to communicate with the RF circuitry 1806.

In some dual-mode embodiments, a separate radio IC circuitry may be provided for processing signals for each spectrum, although the scope of the embodiments is not limited in this respect.

In some embodiments, the synthesizer circuitry 1806*d* may be a fractional-N synthesizer or a fractional N/N+1 synthesizer, although the scope of the embodiments is not limited in this respect as other types of frequency synthesizers may be suitable. For example, synthesizer circuitry 1806*d* may be a delta-sigma synthesizer, a frequency multiplier, or a synthesizer comprising a phase-locked loop with a frequency divider.

The synthesizer circuitry 1806*d* may be configured to synthesize an output frequency for use by the mixer circuitry 1806*a* of the RF circuitry 1806 based on a frequency input and a divider control input. In some embodiments, the synthesizer circuitry 1806*d* may be a fractional N/N+1 synthesizer.

In some embodiments, frequency input may be provided by a voltage controlled oscillator (VCO), although that is not a requirement. Divider control input may be provided by either the baseband circuitry 1810 or the application circuitry 1605/1705 depending on the desired output frequency. In some embodiments, a divider control input (e.g., N) may be determined from a look-up table based on a channel indicated by the application circuitry 1605/1705.

Synthesizer circuitry 1806*d* of the RF circuitry 1806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1806 may include an IQ/polar converter.

FEM circuitry 1808 may include a receive signal path, which may include circuitry configured to operate on RF signals received from antenna array 1811, amplify the received signals and provide the amplified versions of the received signals to the RF circuitry 1806 for further processing. FEM circuitry 1808 may also include a transmit signal path, which may include circuitry configured to amplify signals for transmission provided by the RF circuitry 1806 for transmission by one or more of antenna elements of antenna array 1811. In various embodiments, the amplification through the transmit or receive signal paths may be done solely in the RF circuitry 1806, solely in the FEM circuitry 1808, or in both the RF circuitry 1806 and the FEM circuitry 1808.

In some embodiments, the FEM circuitry 1808 may include a TX/RX switch to switch between transmit mode and receive mode operation. The FEM circuitry 1808 may include a receive signal path and a transmit signal path. The receive signal path of the FEM circuitry 1808 may include an LNA to amplify received RF signals and provide the amplified received RF signals as an output (e.g., to the RF circuitry 1806). The transmit signal path of the FEM circuitry 1808 may include a power amplifier (PA) to amplify input RF signals (e.g., provided by RF circuitry 1806), and one or more filters to generate RF signals for subsequent transmission by one or more antenna elements of the antenna array 1811.

The antenna array 1811 comprises one or more antenna elements, each of which is configured convert electrical signals into radio waves to travel through the air and to convert received radio waves into electrical signals. For example, digital baseband signals provided by the baseband circuitry 1810 is converted into analog RF signals (e.g., modulated waveform) that will be amplified and transmitted via the antenna elements of the antenna array 1811 including one or more antenna elements (not shown). The antenna elements may be omnidirectional, direction, or a combination thereof. The antenna elements may be formed in a multitude of arranges as are known and/or discussed herein. The antenna array 1811 may comprise microstrip antennas or printed antennas that are fabricated on the surface of one or more printed circuit boards. The antenna array 1811 may be formed in as a patch of metal foil (e.g., a patch antenna) in a variety of shapes, and may be coupled with the RF circuitry 1806 and/or FEM circuitry 1808 using metal transmission lines or the like.

Processors of the application circuitry 1605/1705 and processors of the baseband circuitry 1810 may be used to execute elements of one or more instances of a protocol stack. For example, processors of the baseband circuitry 1810, alone or in combination, may be used execute Layer 3, Layer 2, or Layer 1 functionality, while processors of the application circuitry 1605/1705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 19:
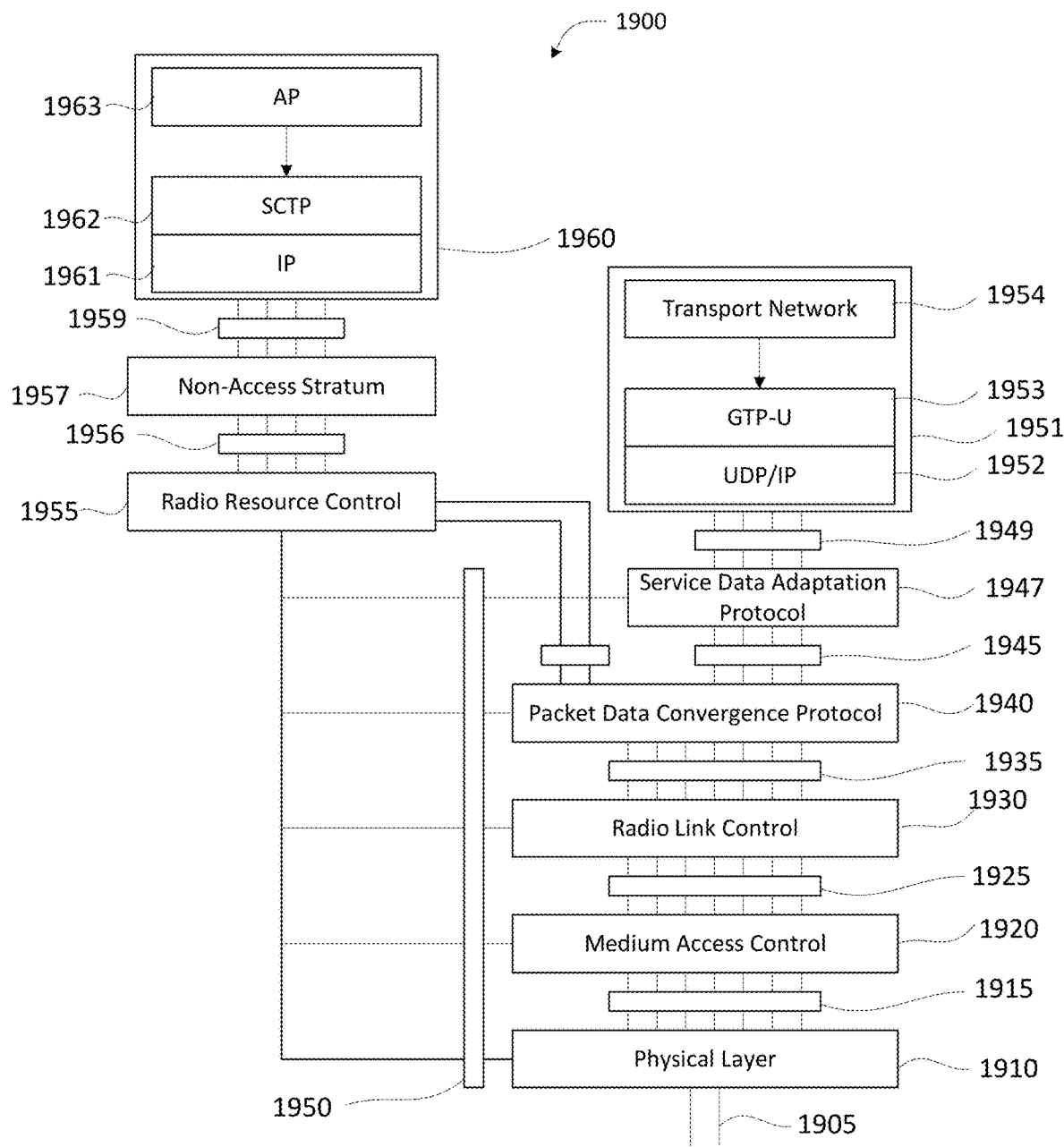
FIG. 19 illustrates various protocol functions that may be implemented in a wireless communication device according to various embodiments.

FIG. 19 illustrates various protocol functions that may be implemented in a wireless communication device according to various embodiments. In particular, FIG. 19 includes an arrangement 1900 showing interconnections between various protocol layers/entities. The following description of FIG. 19 is provided for various protocol layers/entities that operate in conjunction with the 5G/NR system standards and LTE system standards, but some or all of the aspects of FIG. 19 may be applicable to other wireless communication network systems as well.

The protocol layers of arrangement 1900 may include one or more of PHY 1910, MAC 1920, RLC 1930, PDCP 1940, SDAP 1947, RRC 1955, and NAS layer 1957, in addition to other higher layer functions not illustrated. The protocol layers may include one or more service access points (e.g., items 1959, 1956, 1950, 1949, 1945, 1935, 1925, and 1915 in FIG. 19) that may provide communication between two or more protocol layers.

The PHY 1910 may transmit and receive physical layer signals 1905 that may be received from or transmitted to one or more other communication devices. The physical layer signals 1905 may comprise one or more physical channels, such as those discussed herein. The PHY 1910 may further perform link adaptation or adaptive modulation and coding (AMC), power control, cell search (e.g., for initial synchronization and handover purposes), and other measurements used by higher layers, such as the RRC 1955. The PHY 1910 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1910 may process requests from and provide indications to an instance of MAC 1920 via one or more PHY-SAP 1915. According to some embodiments, requests and indications communicated via PHY-SAP 1915 may comprise one or more transport channels.

Instance(s) of MAC 1920 may process requests from, and provide indications to, an instance of RLC 1930 via one or more MAC-SAPS 1925. These requests and indications communicated via the MAC-SAP 1925 may comprise one or more logical channels. The MAC 1920 may perform mapping between the logical channels and transport channels, multiplexing of MAC SDUs from one or more logical channels onto TBs to be delivered to PHY 1910 via the transport channels, de-multiplexing MAC SDUs to one or more logical channels from TBs delivered from the PHY 1910 via transport channels, multiplexing MAC SDUs onto TBs, scheduling information reporting, error correction through HARQ, and logical channel prioritization.

Instance(s) of RLC 1930 may process requests from and provide indications to an instance of PDCP 1940 via one or more radio link control service access points (RLC-SAP) 1935. These requests and indications communicated via RLC-SAP 1935 may comprise one or more RLC channels. The RLC 1930 may operate in a plurality of modes of operation, including: Transparent Mode™, Unacknowledged Mode (UM), and Acknowledged Mode (AM). The RLC 1930 may execute transfer of upper layer protocol data units (PDUs), error correction through automatic repeat request (ARQ) for AM data transfers, and concatenation, segmentation and reassembly of RLC SDUs for UM and AM data transfers. The RLC 1930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1940 may process requests from and provide indications to instance(s) of RRC 1955 and/or instance(s) of SDAP 1947 via one or more packet data convergence protocol service access points (PDCP-SAP) 1945. These requests and indications communicated via PDCP-SAP 1945 may comprise one or more radio bearers. The PDCP 1940 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1947 may process requests from and provide indications to one or more higher layer protocol entities via one or more SDAP-SAP. These requests and indications communicated via SDAP-SAP 1949 may comprise one or more QoS flows. The SDAP 1947 may map QoS flows to DRBs, and vice versa, and may also mark QFIs in DL and UL packets. A single SDAP entity 1947 may be configured for an individual PDU session. In the UL direction, the NG-RAN XQ10 may control the mapping of QoS Flows to DRB(s) in two different ways, reflective mapping or explicit mapping. For reflective mapping, the SDAP 1947 of a UE XQ01 may monitor the QFIs of the DL packets for each DRB, and may apply the same mapping for packets flowing in the UL direction. For a DRB, the SDAP 1947 of the UE XQ01 may map the UL packets belonging to the QoS flows(s) corresponding to the QoS flow ID(s) and PDU session observed in the DL packets for that DRB. To enable reflective mapping, the NG-RAN 1510 may mark DL packets over the Uu interface with a QoS flow ID. The explicit mapping may involve the RRC 1955 configuring the SDAP 1947 with an explicit QoS flow to DRB mapping rule, which may be stored and followed by the SDAP 1947. In embodiments, the SDAP 1947 may only be used in NR implementations and may not be used in LTE implementations.

The RRC 1955 may configure, via one or more management service access points (M-SAP), aspects of one or more protocol layers, which may include one or more instances of PHY 1910, MAC 1920, RLC 1930, PDCP 1940 and SDAP 1947. In embodiments, an instance of RRC 1955 may process requests from and provide indications to one or more NAS entities 1957 via one or more RRC-SAPS 1956. The main services and functions of the RRC 1955 may include broadcast of system information (e.g., included in MIBs or SIBS related to the NAS), broadcast of system information related to the access stratum (AS), paging, establishment, maintenance and release of an RRC connection between the UE XQ01 and RAN XQ10 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBS may comprise one or more IEs, which may each comprise individual data fields or data structures.

The NAS 1957 may form the highest stratum of the control plane between the UE XQ01 and the AMF 1521. The NAS 1957 may support the mobility of the UEs XQ01 and the session management procedures to establish and maintain IP connectivity between the UE XQ01 and a P-GW in LTE systems.

According to various embodiments, one or more protocol entities of arrangement 1900 may be implemented in UEs XQ01, RAN nodes XQ11, AMF 1521 in NR implementations or MME in LTE implementations, UPF 1502 in NR implementations or S-GW and P-GW in LTE implementations, or the like to be used for control plane or user plane communications protocol stack between the aforementioned devices. In such embodiments, one or more protocol entities that may be implemented in one or more of UE XQ01, gNB XQ11, AMF 1521, etc. may communicate with a respective peer protocol entity that may be implemented in or on another device using the services of respective lower layer protocol entities to perform such communication. In some embodiments, a gNB-CU of the gNB XQ11 may host the RRC 1955, SDAP 1947, and PDCP 1940 of the gNB that controls the operation of one or more gNB-DUs, and the gNB-DUs of the gNB XQ11 may each host the RLC 1930, MAC 1920, and PHY 1910 of the gNB XQ11.

In a first example, a control plane protocol stack may comprise, in order from highest layer to lowest layer, NAS 1957, RRC 1955, PDCP 1940, RLC 1930, MAC 1920, and PHY 1910. In this example, upper layers 1960 may be built on top of the NAS 1957, which includes an IP layer 1961, an SCTP 1962, and an application layer signaling protocol (AP) 1963.

In NR implementations, the AP 1963 may be an NG application protocol layer (NGAP or NG-AP) 1963 for the NG interface XQ13 defined between the NG-RAN node XQ11 and the AMF 1521, or the AP 1963 may be an Xn application protocol layer (XnAP or Xn-AP) 1963 for the Xn interface XQ12 that is defined between two or more RAN nodes XQ11.

The NG-AP 1963 may support the functions of the NG interface XQ13 and may comprise Elementary Procedures (EPs). An NG-AP EP may be a unit of interaction between the NG-RAN node XQ11 and the AMF 1521. The NG-AP 1963 services may comprise two groups: UE-associated services (e.g., services related to a UE XQ01) and non-UE-associated services (e.g., services related to the whole NG interface instance between the NG-RAN node XQ11 and AMF 1521). These services may include functions including, but not limited to: a paging function for the sending of paging requests to NG-RAN nodes XQ11 involved in a particular paging area; a UE context management function for allowing the AMF 1521 to establish, modify, and/or release a UE context in the AMF 1521 and the NG-RAN node XQ11; a mobility function for UEs XQ01 in ECM-CONNECTED mode for intra-system HOs to support mobility within NG-RAN and inter-system HOs to support mobility from/to EPS systems; a NAS Signaling Transport function for transporting or rerouting NAS messages between UE XQ01 and AMF 1521; a NAS node selection function for determining an association between the AMF 1521 and the UE XQ01; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes XQ11 via CN XQ20; and/or other like functions.

The XnAP 1963 may support the functions of the Xn interface XQ12 and may comprise XnAP basic mobility procedures and XnAP global procedures. The XnAP basic mobility procedures may comprise procedures used to handle UE mobility within the NG RAN XQ11 (or E-UTRAN 1410), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE XQ01, such as Xn interface setup and reset procedures, NG-RAN update procedures, cell activation procedures, and the like.

In LTE implementations, the AP 1963 may be an S1 Application Protocol layer (S1-AP) 1963 for the S1 interface XQ13 defined between an E-UTRAN node XQ11 and an MME, or the AP 1963 may be an X2 application protocol layer (X2AP or X2-AP) 1963 for the X2 interface XQ12 that is defined between two or more E-UTRAN nodes XQ11.

The S1 Application Protocol layer (S1-AP) 1963 may support the functions of the Si interface, and similar to the NG-AP discussed previously, the S1-AP may comprise S1-AP EPs. An S1-AP EP may be a unit of interaction between the E-UTRAN node XQ11 and an MME within an LTE CN XQ20. The S1-AP 1963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1963 may support the functions of the X2 interface XQ12 and may comprise X2AP basic mobility procedures and X2AP global procedures. The X2AP basic mobility procedures may comprise procedures used to handle UE mobility within the E-UTRAN XQ20, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE XQ01, such as X2 interface setup and reset procedures, load indication procedures, error indication procedures, cell activation procedures, and the like.

The SCTP layer (alternatively referred to as the SCTP/IP layer) 1962 may provide guaranteed delivery of application layer messages (e.g., NGAP or XnAP messages in NR implementations, or S1-AP or X2AP messages in LTE implementations). The SCTP 1962 may ensure reliable delivery of signaling messages between the RAN node XQ11 and the AMF 1521/MME based, in part, on the IP protocol, supported by the IP 1961. The Internet Protocol layer (IP) 1961 may be used to perform packet addressing and routing functionality. In some implementations the IP layer 1961 may use point-to-point transmission to deliver and convey PDUs. In this regard, the RAN node XQ11 may comprise L2 and L1 layer communication links (e.g., wired or wireless) with the MME/AMF to exchange information.

In a second example, a user plane protocol stack may comprise, in order from highest layer to lowest layer, SDAP 1947, PDCP 1940, RLC 1930, MAC 1920, and PHY 1910. The user plane protocol stack may be used for communication between the UE XQ01, the RAN node XQ11, and UPF 1502 in NR implementations or an S-GW and P-GW in LTE implementations. In this example, upper layers 1951 may be built on top of the SDAP 1947, and may include a user datagram protocol (UDP) and IP security layer (UDP/IP) 1952, a General Packet Radio Service (GPRS) Tunneling Protocol for the user plane layer (GTP-U) 1953, and a User Plane PDU layer (UP PDU) 1963.

The transport network layer 1954 (also referred to as a "transport layer") may be built on IP transport, and the GTP-U 1953 may be used on top of the UDP/IP layer 1952 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1953 may be used for carrying user data within the GPRS core network and between the radio access network and the core network. The user data transported can be packets in any of IPv4, IPv6, or PPP formats, for example. The UDP/IP 1952 may provide checksums for data integrity, port numbers for addressing different functions at the source and destination, and encryption and authentication on the selected data flows. The RAN node XQ11 and the S-GW may utilize an S1-U interface to exchange user plane data via a protocol stack comprising an L1 layer (e.g., PHY 1910), an L2 layer (e.g., MAC 1920, RLC 1930, PDCP 1940, and/or SDAP 1947), the UDP/IP layer 1952, and the GTP-U 1953. The S-GW and the P-GW may utilize an S5/S8a interface to exchange user plane data via a protocol stack comprising an L1 layer, an L2 layer, the UDP/IP layer 1952, and the GTP-U 1953. As discussed previously, NAS protocols may support the mobility of the UE XQ01 and the session management procedures to establish and maintain IP connectivity between the UE XQ01 and the P-GW.

Moreover, although not shown by FIG. 19, an application layer may be present above the AP 1963 and/or the transport network layer 1954. The application layer may be a layer in which a user of the UE XQ01, RAN node XQ11, or other network element interacts with software applications being executed, for example, by application circuitry 1605 or application circuitry 1705, respectively. The application layer may also provide one or more interfaces for software applications to interact with communications systems of the UE XQ01 or RAN node XQ11, such as the baseband circuitry 1810. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 20:
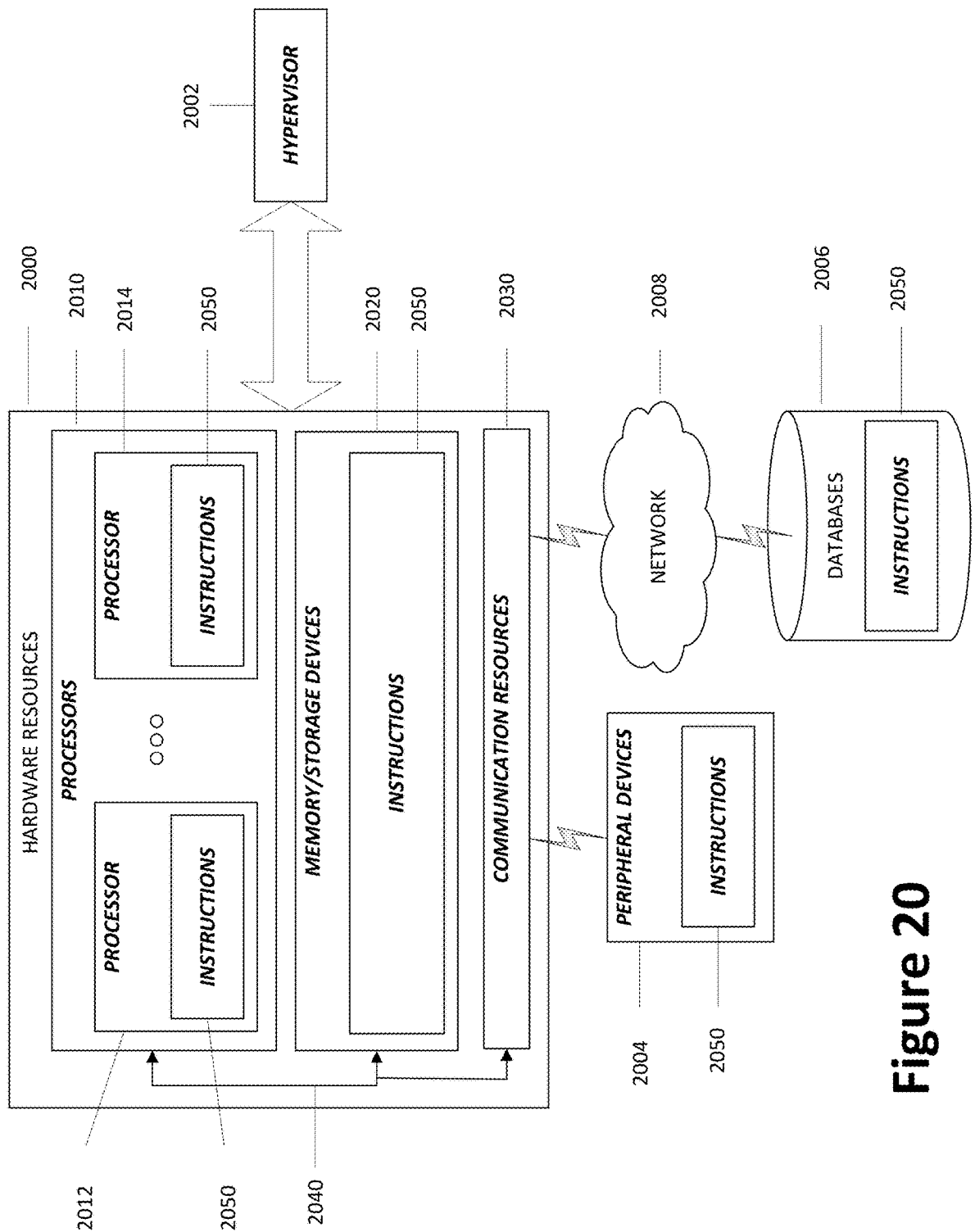
FIG. 20 is a block diagram illustrating components, according to some example embodiments, able to read instructions from a machine-readable or computer-readable medium (for example, a non-transitory machine-readable storage medium) and perform any one or more of the methodologies discussed herein.

FIG. 20 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 20 shows a diagrammatic representation of hardware resources 2000 including one or more processors (or processor cores) 2010, one or more memory/storage devices 2020, and one or more communication resources 2030, each of which may be communicatively coupled via a bus 2040. For embodiments where node virtualization (e.g., NFV) is utilized, a hypervisor 2002 may be executed to provide an execution environment for one or more network slices/sub-slices to utilize the hardware resources 2000.

The processors 2010 may include, for example, a processor 2012 and a processor 2014. The processor(s) 2010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2020 may include main memory, disk storage, or any suitable combination thereof. The memory/storage devices 2020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2030 may include interconnection or network interface components or other suitable devices to communicate with one or more peripheral devices 2004 or one or more databases 2006 via a network 2008. For example, the communication resources 2030 may include wired communication components (e.g., for coupling via USB), cellular communication components, NFC components, Bluetooth® (or Bluetooth® Low Energy) components, Wi-Fi® components, and other communication components.

Instructions 2050 may comprise software, a program, an application, an applet, an app, or other executable code for causing at least any of the processors 2010 to perform any one or more of the methodologies discussed herein. The instructions 2050 may reside, completely or partially, within at least one of the processors 2010 (e.g., within the processor's cache memory), the memory/storage devices 2020, or any suitable combination thereof. Furthermore, any portion of the instructions 2050 may be transferred to the hardware resources 2000 from any combination of the peripheral devices 2004 or the databases 2006. Accordingly, the memory of processors 2010, the memory/storage devices 2020, the peripheral devices 2004, and the databases 2006 are examples of computer-readable and machine-readable media.

Example Procedures

Figure 21:
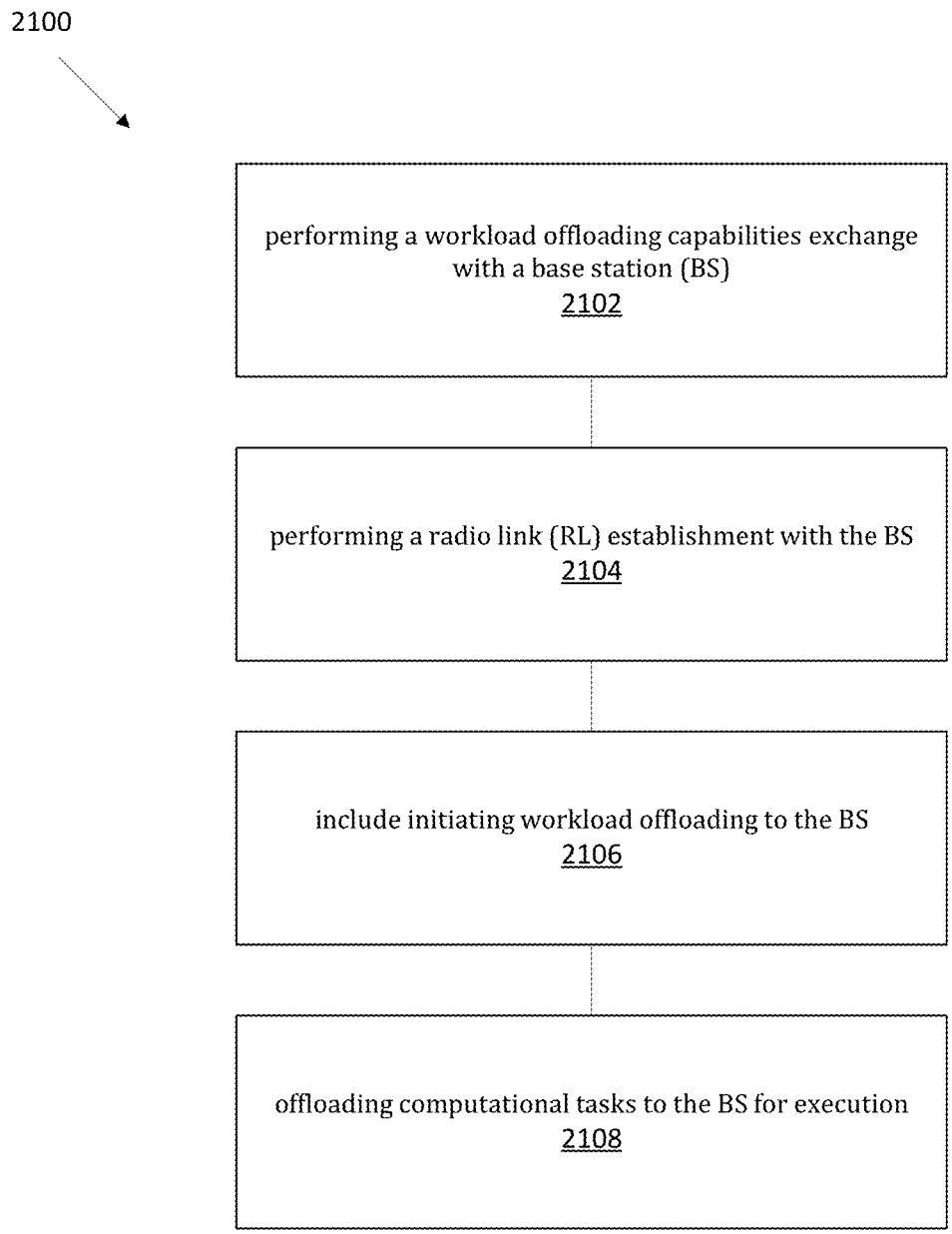
FIG. 21 is a flowchart of a process of a UE in accordance with various embodiments.

In some embodiments, the electronic device(s), network (s), system(s), chip(s) or component(s), or portions or implementations thereof, of FIGS. 10-20, or some other figure herein, may be configured to perform one or more processes, techniques, or methods as described herein, or portions thereof. One such process 2100 is depicted in FIG. 21. For example, the process 2100 may include, at 2102, performing a workload offloading capabilities exchange with a base station (B S).

At 2104, the process 2100 may further include performing a radio link (RL) establishment with the BS. At 2106, the process 2100 may further include initiating workload offloading to the BS. At 2108, the process 2100 may further include offloading computational tasks to the BS for execution.

In some embodiments, the process 2100 may be performed by a UE or a portion thereof.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a cellular system wherein a base station (BS) has both communication functions and computation functions as illustrated in FIG. 3 and FIG. 4.

Example 2 includes the system of example 1 and/or some other examples herein, wherein the communication functions include: RF, L1 processing functions, L2 processing functions, control and scheduling functions, etc.

Example 3 includes the system of example 2 and/or some other examples herein, wherein the computation functions include computation resources such as CPUs, GPUs, NNPUs (neural network processing units), memories, etc.; computation platforms such as operating system, virtualization platform, containerization platform, etc.; and applications.

Example 4 includes the system of examples 1-3 and/or some other examples herein, wherein the BS is a logical concept, wherein the functions in the BS could be physically co-located or distributed.

Example 5 includes the system of examples 1-4 and/or some other examples herein, wherein the BS comprises a central unit (CU) holding computation functions, control plane (CP) of the access stratum (e.g., RRC) and upper L2 user plane (UP) stacks of the access stratum (e.g., SDAP and PDCP layers); and one or more distributed units (DUs) holding lower L2 UP stacks (e.g., RLC, MAC), L1, and RF.

Example 6 includes the system of examples 1-4 and/or some other examples herein, wherein the BS comprises a central computing unit holding computation functions; a central communication unit holding control plane (CP) of the access stratum (e.g., RRC), and upper L2 user plane (UP) stacks of the access stratum (e.g., SDAP and PDCP layers), and one or more DUs holding lower L2 UP stacks (e.g., RLC, MAC), L1 and RF.

Example 7 includes the system of examples 5-6 and/or some other examples herein, wherein the one or more DUs are further split by putting RF or some parts of the lower L2 and L1 functions in a remote location.

Example 8 includes workload migration related control plane and data plane messages between UE's computing function and BS's computing function can be directly communicated via L2 of access stratum (AS). Example 8 may be combined with any other example herein.

Example 9 includes the workload migration CP/UP traffics would terminate between UE and BS. Example 9 may be combined with any other example herein.

Example 10 includes the workload migration engine in the client side and the server side can locate at above OS, or as a part of OS function or at below OS or in the radio modem. Example A10 may be combined with any other example herein.

Example 11 includes a method supporting computing workload migration within the RAN, wherein the underlying communication link would need to be aware of the workload migration traffic and have dedicated procedures/resources to enable the traffic termination between UE and BS. Example 11 may be combined with any other example herein.

Example 12 includes messages/information elements (IEs) enabled in the radio link to enable workload migration within the RAN, the messages/IEs comprising: messages/IEs for computing service and capability discovery between UE and BS; messages/IEs for UE initiated radio link resource establishment for computing workload migration; and/or messages/IEs for BS initiated radio link resource establishment for computing workload migration. Example 12 may be combined with any other example herein.

Example 13 includes a workload migration procedure and messages as illustrated in one or more of FIGS. 7, 8 and 9. Example 13 may be combined with any other example herein.

Example 14 includes a method comprising: performing a workload offloading capabilities exchange with a base station (BS); performing a radio link (RL) establishment with the BS; initiating workload offloading to the BS; and offloading computational tasks to the BS for execution.

Example 15 includes the method of example 14 and/or some other examples herein, wherein performing the workload offloading capabilities exchange comprises sending an RRC message to the BS including capabilities supporting workload offloading and/or computational capabilities.

Example 16 includes the method of examples 14-15 and/or some other examples herein, wherein performing the workload offloading capabilities exchange comprises receiving BS capabilities related to workload offloading in an RRC message and/or an SIB.

Example 17 includes the method of examples 14-16 and/or some other examples herein, wherein performing the RL establishment comprises sending an RRC message for radio resource establishment request, and receiving a response from the BS indicating acceptance or rejection of the request.

Example 18 includes the method of examples 14-16 and/or some other examples herein, wherein performing the RL establishment comprises receiving an RRC message for radio resource establishment request from the BS; determining whether to accept or reject the request; and sending a response to the BS indicating the acceptance or the rejection of the request.

Example 19 includes the method of examples 17-18 and/or some other examples herein, wherein initiating the workload offloading to the BS comprises: sending a workload migration request to the BS, the workload migration message including an application on-boarding message including information to be used by the BS for the workload offloading.

Example 20 includes the method of example 19 and/or some other examples herein, wherein the application on-boarding message includes a resource of an application image, and the BS is to obtain an application image from a cloud computing service using the resource (address) included in the application on-boarding message.

Example 21 includes the method of examples 19-20 and/or some other examples herein, wherein initiating the workload offloading to the BS comprises: receiving a workload migration response from the BS, the workload migration response including an indication of whether the a workload migration request was accepted or rejected by the BS, wherein when accepted, the workload migration response includes instructions to prepare for the workload offloading.

Example 22 includes the method of examples 14-21 and/or some other examples herein, wherein offloading the computational tasks to the BS for execution comprises: sending offloading tasks to the BS, wherein the offloading tasks include executable code, instructions, and/or data; and receiving results of the offloading execution from the BS.

Example 23 includes the method of examples 17-22 and/or some other examples herein, wherein the workload migration initation is to be performed over a dedicated data radio bearer (DRB) established during the RL establishment performance.

Example 24 includes the method of example 23 and/or some other examples herein, wherein the RL resource request for workload migration is piggybacked with the workload migration request, and the RL resource response includes information for the DRB establishment is piggybacked with the workload migration response.

Example 25 includes the method of example 23 and/or some other examples herein, wherein the RRC message sent to the BS includes the RL resource request, piggybacked with the offloading tasks, and the RRC message from the BS includes the RL resource response piggybacked with the workload execution results.

Example 26 includes the method of examples 14-25 and/or some other examples herein, wherein the method is performed by a user equipment or a portion thereof.

Example 27 may include an apparatus comprising means to perform one or more elements of a method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 29 may include an apparatus comprising logic, modules, or circuitry to perform one or more elements of a method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

Example 32 may include a signal as described in or related to any of examples 1-26, or portions or parts thereof.

Example 33 may include a datagram, packet, frame, segment, protocol data unit (PDU), or message as described in or related to any of examples 1-26, or portions or parts thereof, or otherwise described in the present disclosure.

Example 34 may include a signal encoded with data as described in or related to any of examples 1-26, or portions or parts thereof, or otherwise described in the present disclosure.

Example 35 may include a signal encoded with a datagram, packet, frame, segment, protocol data unit (PDU), or message as described in or related to any of examples 1-26, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of examples 1-26, or portions thereof.

Example 37 may include a computer program comprising instructions, wherein execution of the program by a processing element is to cause the processing element to carry out the method, techniques, or process as described in or related to any of examples 1-26, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

3GPP Third Generation Partnership Project
3D three-dimensional
4G Fourth Generation
5G Fifth Generation
5GC 5G Core network
ACK Acknowledgement
AECC Automotive Edge Computing Consortium
AF Application Function
AN Access Nodes, Access Network
AP Application Protocol, Antenna Port, Access Point
API Application Programming Interface
ARQ Automatic Repeat Request
AS Access Stratum
ASIC Application Specific Integrated Circuit
ASN.1 Abstract Syntax Notation One
AWGN Additive White Gaussian Noise
BER Bit Error Ratio
BLER Block Error Rate
BS Base Station
CCA Clear Channel Assessment
CCIA Cache Coherent Interconnect for Accelerators
CDN Content Delivery Network
CISC Complex Instruction Set Computing
CN Core Network
CPLD complex PLD
CPU Central Processing Unit
CRAN Cloud Radio Access Network, Cloud RAN
CSMA Carrier Sense Multiple Access
CSMA/CA CSMA with collision avoidance
CTS Clear-to-Send
CW Codeword
D2D Device-to-Device
DL Downlink
DN Data Network
DNN Data Network Name
DRAM Dynamic RAM
DRB Data Radio Bearer
DRS Discovery Reference Signal
DSL Domain Specific Language. Digital Subscriber Line
DSP Digital Signal Processor
E-LAN Ethernet Local Area Network
e2e End-to-End
ED Energy Detection
EDGE Enhanced Datarates for GSM Evolution (GSM Evolution)
eLAA enhanced LAA
EM Element Manager
eNB evolved NodeB, E-UTRAN Node B
EPC Evolved Packet Core
EPRE Energy per resource element
EPROM erasable programmable ROM
EEPROM electrically EPROM
EPS Evolved Packet System
ETSI European Telecommunications Standards Institute
E-UTRA Evolved UTRA
E-UTRAN Evolved UTRAN
feLAA further enhanced LAA
FFT Fast Fourier Transform
FPGA Field-Programmable Gate Array
GERAN GSM EDGE RAN, GSM EDGE Radio Access Network
GGSN Gateway GPRS Support Node
GHz Gigahertz
GLONASS GLObal'naya NAvigatsionnaya Sputnikovaya Sistema (Engl.: Global Navigation Satellite System)
gNB Next Generation NodeB
GNSS Global Navigation Satellite System
GPRS General Packet Radio Service
GPU Graphics Processing Unit
GSM Global System for Mobile Communications, Groupe Special Mobile
GTP GPRS Tunneling Protocol
HARQ Hybrid ARQ
HCPLD high-capacity PLD
HO Handover
HSPA High Speed Packet Access
HSS Home Subscriber Server
HTML Hypertext Markup Language
HTTP Hyper Text Transfer Protocol
HTTPS Hyper Text Transfer Protocol Secure (https is http/1.1 over SSL, e.g. port 443)
ID Identity, identifier
IE Information element
IEEE Institute of Electrical and Electronics Engineers
IETF Internet Engineering Task Force
IMEI International Mobile Equipment Identity
IMSI International Mobile Subscriber Identity
$I^2C$ inter-integrated circuit
I/O Input/Output
IoT Internet of Things
IP Internet Protocol
Ipsec IP Security, Internet Protocol Security
IPv4 Internet Protocol Version 4
IPv6 Internet Protocol Version 6
IR Infrared
ISA Industry Standard Architecture
ISO International Organisation for Standardisation
ISP Internet Service Provider
IWF Interworking-Function
I-WLAN Interworking WLAN
kB Kilobyte (1000 bytes)
kbps kilo-bits per second
KPI Key Performance Indicator
KQI Key Quality Indicator
KSI Key Set Identifier
ksps kilo-symbols per second
KVM Kernel Virtual Machine
L1 Layer 1 (physical layer)
L2 Layer 2 (data link layer)
L3 Layer 3 (network layer)
LAA Licensed Assisted Access
LAN Local Area Network
LBT Listen Before Talk
LCM LifeCycle Management
LED Light Emitting Diode
LLC Logical Link Control
LPP LTE Positioning Protocol
LSB Least Significant Bit
LTE Long Term Evolution
LWA LTE-WLAN aggregation
LWIP LTE/WLAN Radio Level Integration with IPsec Tunnel
M2M Machine-to-Machine
MAC Medium Access Control (protocol layering context)
MAC Message authentication code (security/encryption context)
MAC-A MAC used for authentication and key agreement (TSG T WG3 context)

MAC-I MAC used for data integrity of signalling messages (TSG T WG3 context)
MAMS Multi-Access Management Services
MANO Management and Orchestration
ME Mobile Equipment
MEC Multi-access Edge Computing, Mobile Edge Computing
MCP Multi-Chip Package
MME Mobility Management Entity
MPLS MultiProtocol Label Switching
MRAM magnetoresistive RAM
MS Mobile Station
MSID Mobile Station Identifier
MSIN Mobile Station Identification Number
MSISDN Mobile Subscriber ISDN Number
MTC Machine-Type Communications
mMTC massive MTC
NACK Negative Acknowledgement
NAS Non-Access Stratum
NEF Network Exposure Function
NF Network Function
NFV Network Functions Virtualization
NFVI NFV Infrastructure
NFVO NFV Orchestrator
NG Next Generation, Next Gen
NM Network Manager
NMS Network Management System
NR New Radio
S-NNSAI Single-NSSAI
NW Network
O&M Operation and Maintenance
OCF Open Connectivity Foundation™
OFC OpenFog Consortium
OPA Omni-Path Architecture
OpenCAPI Open Coherent Accelerator Processor Interface
OOB Out-of-band
OS Operating System
OSS Operations Support System
OTA over-the-air
PAPR Peak-to-Average Power Ratio
PAR Peak to Average Ratio
PCI Peripheral Component Interconnect
PCIe PCI express
PCIx PCI extended
PDCP Packet Data Convergence Protocol
PDN Packet Data Network, Public Data Network
PDU Protocol Data Unit
P-GW PDN Gateway
PHY Physical layer
PIN Personal Identification Number
PLD Programmable Logic Device
PLMN Public Land Mobile Network
PMIC Power Management Integrated Circuitry
POC PTT over Cellular
PP, PTP Point-to-Point
PPP Point-to-Point Protocol
PRAM phase change RAM
ProSe Proximity Services, Proximity-Based Service
PSTN Public Switched Telephone Network
PT-RS Phase-tracking reference signal
PTT Push-to-Talk
QPI QuickPath Interconnect
QoS Quality of Service
RADIUS Remote Authentication Dial In User Service
RAM Random Access Memory
RAN Radio Access Network
RAT Radio Access Technology
RF Radio Frequency
RFEM Radio Front End Module
RISC Reduced Instruction Set Computing
RL Radio Link
RLC Radio Link Control, Radio Link Control layer
RN Relay Node
RNC Radio Network Controller
RNL Radio Network Layer
RRC Radio Resource Control
RSRP Reference Signal Received Power
RSRQ Reference Signal Received Quality
RSSI Received Signal Strength Indicator
RSU Road Side Unit
RTP Real Time Protocol
RTOS Real Time OS
RTT Round Trip Time
Rx Reception, Receiving, Receiver
S-GW Serving Gateway
SAE System Architecture Evolution
SAP Service Access Point
SCTP Stream Control Transmission Protocol
SCP Service Communication Proxy
SDAP Service Data Adaptation Protocol
SDP Session Description Protocol
SDRAM synchronous DRAM
SDU Service Data Unit
SFN System Frame Number
SGSN Serving GPRS Support Node
SI System Information
SIB System Information Block
SIM Subscriber Identity Module
SINR signal-to-noise and interference ratio
SIP Session Initiated Protocol
SiP System in Package
SLA Service Level Agreement
SMS Short Message Service
SN Sequence Number
SNR signal-to-noise ratio
SoC System on Chip
SPI Serial Peripheral Interface
SPS Semi-Persistent Scheduling
SRAM static RAM
TBD To Be Defined
TCP Transmission Communication Protocol
TR Technical Report
TRx Transceiver
TS Technical Specification, Technical Standard
Tx Transmission, Transmitting, Transmitter
UART Universal Asynchronous Receiver and Transmitter
UE User Equipment
UDP User Datagram Protocol
UICC Universal Integrated Circuit Card
UL Uplink
UML Unified Modelling Language
UMTS Universal Mobile Telecommunications System
UPF User Plane Function
UPI Ultra Path Interconnect
URI Uniform Resource Identifier
URL Uniform Resource Locator
USB Universal Serial Bus
USIM Universal Subscriber Identity Module
UTRA UMTS Terrestrial Radio Access
UTRAN Universal Terrestrial Radio Access Network
V2I Vehicle-to-Infrastructure
V2P Vehicle-to-Pedestrian
V2V Vehicle-to-Vehicle V2X Vehicle-to-everything
VIM Virtualized Infrastructure Manager
VLAN Virtual LAN, Virtual Local Area Network
VM Virtual Machine
VNF Virtualized Network Function
VNFM VNF Manager
VPN Virtual Private Network
WiMAX Worldwide Interoperability for Microwave Access
WLAN Wireless Local Area Network
WMAN Wireless Metropolitan Area Network
WPAN Wireless Personal Area Network
XML eXtensible Markup Language
XOR eXclusive OR Terminology The terminology used herein is for the purpose of describing particular embodiments only and is not intended to be limiting of the disclosure. For the purposes of the present document, the following terms and definitions are applicable to the examples and embodiments discussed herein.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, PLD, CPLD, HCPLD, SoC, SiP, MCP, DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof.

The term "device" refers to a physical entity embedded inside, or attached to, another physical entity in its vicinity, with capabilities to convey digital information from or to that physical entity.

The term "entity" refers to a distinct component of an architecture or device, or information transferred as a payload.

The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The term "admission control" refers to a validation process in communication systems where a check is performed before a connection is established to see if current resources are sufficient for the proposed connection.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The invention claimed is:

1. One or more non-transitory computer-readable media (NTCRM) having instructions, stored thereon, that when executed by one or more processors cause a user equipment (UE) to:

perform a workload offloading capabilities exchange with a base station (BS);

perform a radio link (RL) establishment with the BS;

initiate workload offloading to the BS, wherein to initiate the workload offloading includes to send a workload migration request to the BS, wherein the workload migration request includes an application on-boarding message, and wherein the application on-boarding message includes information to be used by the BS for the workload offloading; and offload computational tasks to the BS for execution.

2. The one or more NTCRM of claim 1, wherein the performance of the workload offloading capabilities exchange comprises sending a radio resource control (RRC) message to the BS including capabilities supporting the workload offloading and/or computational capabilities.

3. The one or more NTCRM of claim 1, wherein the performance of the workload offloading capabilities exchange comprises receiving BS capabilities related to the workload offloading in an RRC message and/or a system information block (SIB).

4. The one or more NTCRM of claim 1, wherein the performance of the RL establishment comprises sending an RRC message for a radio resource establishment request, and receiving a response from the BS indicating acceptance or rejection of the radio resource establishment request.

5. The one or more NTCRM of claim 4, wherein the initiation of the workload offloading is to be performed over a dedicated data radio bearer (DRB) established during the performance of the RL establishment.

6. The one or more NTCRM of claim 5, wherein the radio resource establishment request for workload migration is piggybacked with the workload migration request, and wherein the response includes information for establishment of the DRB and is piggybacked with a workload migration response.

7. The one or more NTCRM of claim 5, wherein the RRC message is a first RRC message sent to the BS and includes the radio resource request, piggybacked with the computational tasks, and wherein the instructions, when executed, are further to cause the UE to receive a second RRC message from the BS that includes the response piggybacked with workload execution results.

8. The one or more NTCRM of claim 1, wherein the performance of the RL establishment comprises:

receiving an RRC message for a radio resource establishment request from the BS;

determining whether to accept or reject the radio resource establishment request; and sending a response to the BS indicating the acceptance or the rejection of the radio resource establishment request.

9. The one or more NTCRM of claim 1, wherein the application on-boarding message includes a resource of an application image, and the BS is to obtain an application image from a cloud computing service using the resource included in the application on-boarding message.

10. The one or more NTCRM of claim 1, wherein to initiate the workload offloading to the BS further includes to receive a workload migration response from the BS, the workload migration response including an indication of whether the workload migration request was accepted or rejected by the BS, wherein when accepted, the workload migration response includes instructions to prepare for the workload offloading.

11. The one or more NTCRM of claim 1, wherein to offload the computational tasks to the BS for execution comprises to:

send the computational tasks to the BS, wherein the computational tasks include executable code, instructions, and/or data; and receive, from the BS, results of execution of the computational tasks.

12. One or more non-transitory computer-readable media (NTCRM) having instructions, stored thereon, that when executed by one or more processors cause a next generation Node B (gNB) to:

perform a workload offloading capabilities exchange with a user equipment (UE);

perform a radio link (RL) establishment with the UE;

receive a workload migration request from the UE, wherein the workload migration request includes an application on-boarding message, and wherein the application on-boarding message includes information to be used by the gNB for workload offloading; and receive, from the UE, one or more computational tasks for execution.

13. The one or more NTCRM of claim 12, wherein the performance of the workload offloading capabilities exchange comprises receiving, from the UE, a radio resource control (RRC) message including UE capabilities supporting the workload offloading and/or computational capabilities.

14. The one or more NTCRM of claim 12, wherein the performance of the workload offloading capabilities exchange comprises sending, to the UE, gNB capabilities related to the workload offloading.

15. The one or more NTCRM of claim 12, wherein the performance of the RL establishment comprises receiving a radio resource establishment request from the UE, and sending a response to the UE indicating acceptance or rejection of the radio resource establishment request.

16. The one or more NTCRM of claim 15, wherein a workload migration is performed over a dedicated data radio bearer (DRB) established during the RL establishment.

17. The one or more NTCRM of claim 16, wherein the radio resource establishment request for the workload migration is piggybacked with the workload migration request, and wherein the response includes information for establishment of the DRB and is piggybacked with a workload migration response.

18. The one or more NTCRM of claim 16, wherein the radio resource request is piggybacked with the one or more computational tasks, and wherein the instructions, when executed, are further to cause the gNB to send a message to the UE that includes the response piggybacked with workload execution results.

19. The one or more NTCRM of claim 12, wherein the information in the application on-boarding message includes a resource of an application image, and wherein the instructions, when executed, are further to cause the gNB to obtain the application image from a cloud computing service based on the resource.

20. The one or more NTCRM of claim 12, wherein the instructions, when executed, are further to cause the gNB to send, to the UE, a workload migration response that indicates that the workload migration request is accepted, wherein the workload migration response includes instructions to prepare for the workload offloading.

21. The one or more NTCRM of claim 12, wherein the one or more computational tasks include executable code, instructions, and/or data, and wherein the instructions, when executed, are further to cause the gNB to send, to the UE, results of execution of the one or more computational tasks.

* * * * *